United States Patent
Kobayashi et al.

(10) Patent No.: US 8,386,119 B2
(45) Date of Patent: *Feb. 26, 2013

(54) VEHICLE DRIVING OPERATION SUPPORT APPARATUS/PROCESS AND RESTRAINT CONTROL

(75) Inventors: Yosuke Kobayashi, Yokohama (JP); Yoshifumi Takigawa, Isehara (JP); Toshiyuki Murata, Zama (JP); Satoshi Tange, Fujisawa (JP); Tomoaki Oida, Ebina (JP); Taku Suzuki, Isehara (JP); Yuwun Chai, Isehara (JP); Motoaki Hosaka, Ebina (JP); Hironobu Kikuchi, Isehara (JP); Takeshi Kimura, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 41 days.

This patent is subject to a terminal disclaimer.

(21) Appl. No.: 12/710,513

(22) Filed: Feb. 23, 2010

(65) Prior Publication Data
US 2010/0222958 A1 Sep. 2, 2010

(30) Foreign Application Priority Data

| Feb. 27, 2009 | (JP) | 2009-046941 |
| Feb. 27, 2009 | (JP) | 2009-046942 |
| Feb. 27, 2009 | (JP) | 2009-046943 |
| Nov. 12, 2009 | (JP) | 2009-259193 |

(51) Int. Cl.
| G01M 17/00 | (2006.01) |
| G06F 7/00 | (2006.01) |
| G06F 7/70 | (2006.01) |
| G06F 17/10 | (2006.01) |
| A01B 69/00 | (2006.01) |
| B60T 7/12 | (2006.01) |
| B60T 7/16 | (2006.01) |
| G05D 1/02 | (2006.01) |
| F41G 9/00 | (2006.01) |
| B60Q 1/00 | (2006.01) |
| G08B 23/00 | (2006.01) |
| G08G 1/16 | (2006.01) |
| B60K 31/00 | (2006.01) |

(52) U.S. Cl. ........... 701/29.2; 701/1; 701/36; 701/41; 701/65; 701/70; 701/300; 701/301; 701/302; 340/435; 340/436; 340/576; 340/903; 180/167; 180/168; 180/169; 180/170

(58) Field of Classification Search ............ 701/1, 29, 701/36, 41, 65, 70, 96, 300–302; 340/576, 340/435, 436, 903; 180/167–170
See application file for complete search history.

(56) References Cited

U.S. PATENT DOCUMENTS 5,347,457 A 9/1994 Tanaka et al.
(Continued)

FOREIGN PATENT DOCUMENTS

DE 102005024382 A1 12/2006
(Continued)

OTHER PUBLICATIONS

USPTO Office Action, U.S. Appl. No. 12/710,523, Aug. 29, 2012, 12 pages.
(Continued)

*Primary Examiner* — James Trammell
*Assistant Examiner* — Majdi Alsomiri
(74) *Attorney, Agent, or Firm* — Foley & Lardner LLP

(57) ABSTRACT

A vehicle driving operation support apparatus for a vehicle, includes a sensing section to sense a traveling condition of the vehicle including a surrounding condition inclusive of an obstacle around the vehicle, and a control section to calculate a risk potential for the vehicle in accordance with the traveling condition. The control section performs a support control to support the driver in accordance with the risk potential, and performs an assist control to restrain disturbance (such as vibration from a road) transmitted to the driver in accordance with the risk potential.

20 Claims, 30 Drawing Sheets

U.S. PATENT DOCUMENTS

| | | | |
|---|---|---|---|
| 6,917,872 B2 * | 7/2005 | Egami ............................. | 701/96 |
| 6,982,647 B2 * | 1/2006 | Kuge et al. .................... | 340/576 |
| 7,006,917 B2 * | 2/2006 | Hijikata ........................ | 701/301 |
| 7,085,633 B2 * | 8/2006 | Nishira et al. ................. | 701/36 |
| 7,136,755 B2 * | 11/2006 | Yamamura ..................... | 701/301 |
| 7,155,342 B2 * | 12/2006 | Kobayashi et al. ........... | 701/301 |
| 7,167,798 B2 * | 1/2007 | Kondoh et al. ............... | 701/301 |
| 7,403,842 B2 * | 7/2008 | Yamamura et al. ............. | 701/1 |
| 7,457,694 B2 * | 11/2008 | Hijikata .......................... | 701/36 |
| 7,831,314 B2 | 11/2010 | Egami | |
| 2002/0103587 A1 | 8/2002 | Kim | |
| 2004/0080405 A1 | 4/2004 | Hijikata | |
| 2005/0049761 A1 | 3/2005 | Kataoka et al. | |
| 2005/0065687 A1 * | 3/2005 | Hijikata et al. ................ | 701/41 |
| 2005/0090984 A1 | 4/2005 | Kobayashi et al. | |
| 2006/0131093 A1 | 6/2006 | Egami | |
| 2007/0192030 A1 | 8/2007 | Tanimichi et al. | |
| 2007/0219695 A1 | 9/2007 | Chiu et al. | |
| 2007/0272464 A1 | 11/2007 | Takae et al. | |
| 2007/0276577 A1 * | 11/2007 | Kuge et al. ..................... | 701/96 |
| 2009/0024279 A1 * | 1/2009 | Takeda et al. .................. | 701/41 |
| 2009/0222170 A1 | 9/2009 | Scherl et al. | |

FOREIGN PATENT DOCUMENTS

| | | |
|---|---|---|
| EP | 1400435 A2 | 3/2004 |
| EP | 1757507 A1 | 2/2007 |
| JP | 10-211886 A | 8/1998 |
| JP | 2008-162554 A | 7/2008 |

OTHER PUBLICATIONS

USPTO Notice of Allowance, U.S. Appl. No. 12/710,504, 8 pages.
U.S. Appl. No. 12/710,504, filed Feb. 23, 2010, Takeshi Kimura et al.
U.S. Appl. No. 12/710,523, filed Feb. 23, 2010, Toshiyuki Murata et al.
U.S. Appl. No. 12/710,529, filed Feb. 23, 2010, Tomoaki Oida et al.
USPTO Office Action, U.S. Appl. No. 12/710,504, Dec. 22, 2011, 19 pages.
USPTO Office Action, U.S. Appl. No. 12/710,529, May 8, 2012, 18 pages.
USPTO Notice of Allowance, U.S. Appl. No. 12/710,529, Oct. 1, 2012, 5 pages.

* cited by examiner

LONGER RELATIVE DISTANCE

SHORTER RELATIVE DISTANCE

| WIPER CONDITION | OFF | ON | | |
|---|---|---|---|---|
| | | INTERMITTENT | NORMAL SWEEP RATE | HIGH SWEEP RATE |
| Kw | 0.5 | 0.3 | 0 | 0 |
| Kw1 | 0.5 | 0.3 | 0 | 1 |

| ROAD CLASS | URBAN ROAD | SUBURB ROAD | EXPRESSWAY |
|---|---|---|---|
| Kr | 0.5 | 0.3 | 0 |

VEHICLE DRIVING OPERATION SUPPORT APPARATUS/PROCESS AND RESTRAINT CONTROL

BACKGROUND OF THE INVENTION

The present invention relates to apparatus and process for supporting a driver of a vehicle, and a vehicle.

A vehicle driving (operation) support system is arranged to support a driver by controlling steering reaction, accelerator reaction or brake reaction. Japanese patent document JP 10-211886 shows technique of calculating a risk potential from a sensed surrounding condition inclusive of an obstacle around the vehicle, and controlling a steering assist torque in accordance with the calculated risk potential, to support the driver by leading the driver to adequate recognition of the surrounding condition.

SUMMARY OF THE INVENTION

However, in the system in which various control operations for supporting the driver in a longitudinal direction and lateral direction of the vehicle, for example are performed independently, it is difficult to communicate a message for supporting the driver, properly to the driver in some driving situations. Therefore, it is an object of the present invention to provide technique for supporting the driver more adequately.

According to one aspect of the present invention, a vehicle driving operation support (control) apparatus comprises: a vehicle condition sensing section to sense a vehicle condition of a vehicle; an obstacle condition sensing section to monitor a surrounding condition including an obstacle around the vehicle; an operation input section to which a driver's driving operation is inputted by a driver to operate the vehicle; a motion regulating section to regulate a movement of the driver; and a control section to calculate a risk potential to the obstacle in accordance with the vehicle condition and the surrounding condition, to provide an operational reaction to the driving operation in accordance with the risk potential, and to perform an assist control to restrain disturbance transmitted to the driver in accordance with the risk potential by controlling the motion regulating section.

According to another aspect of the invention, a vehicle driving operation support (control) apparatus for a vehicle, comprises: a sensing section to sense a traveling condition of the vehicle including a surrounding condition inclusive of an obstacle around the vehicle; and a control section to calculate a risk potential for the vehicle in accordance with the traveling condition, to perform a support control to support the driver in accordance with the risk potential, and to perform an assist control to restrain disturbance transmitted to the driver in accordance with the risk potential.

According to still another aspect of the present invention, a vehicle driving operation support (control) process for a vehicle, comprises: sensing a traveling condition of the vehicle including a surrounding condition inclusive of an obstacle around the vehicle; calculating a risk potential for the vehicle in accordance with the traveling condition; performing a support control to support the driver in accordance with the risk potential; performing an assist control to restrain disturbance transmitted to the driver in accordance with the risk potential.

DETAILED DESCRIPTION OF THE INVENTION

First Embodiment

Practical Example

Figure 1:
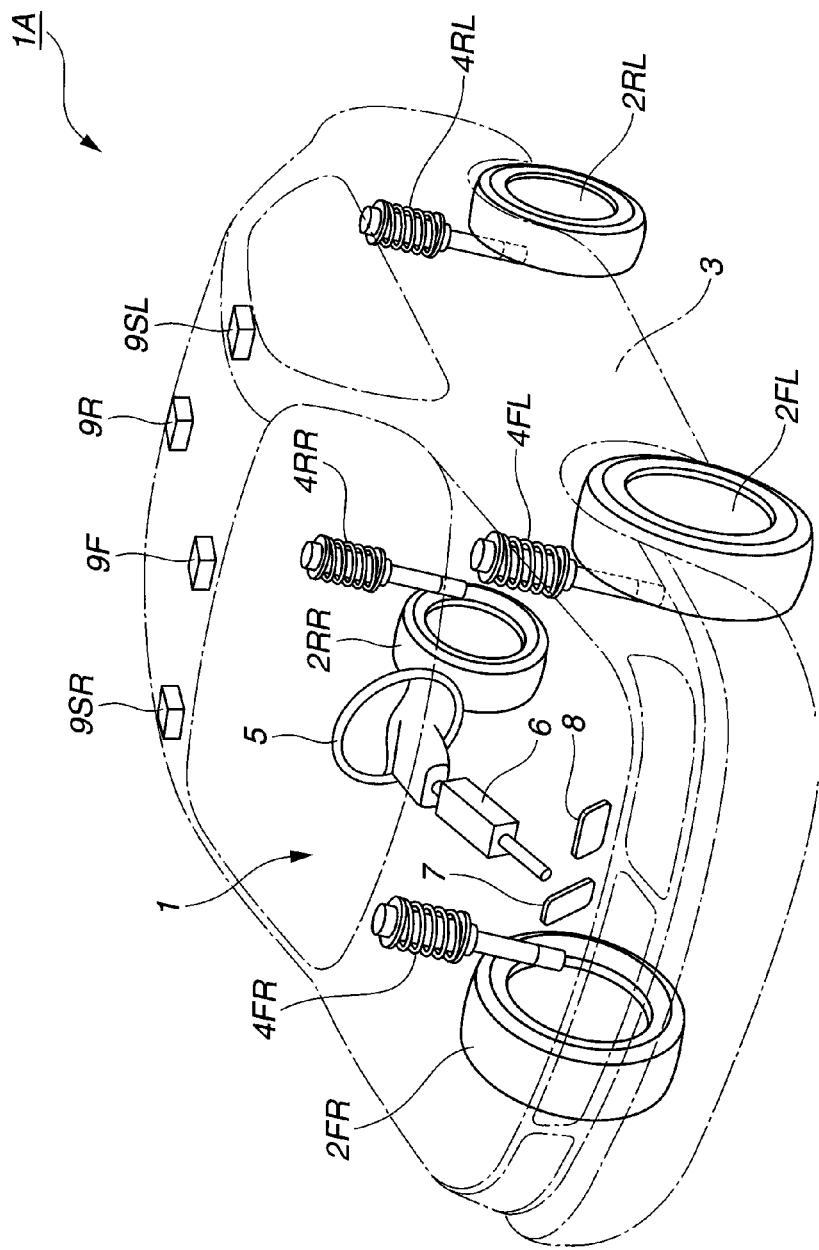
FIG. 1 is a schematic view schematically showing a vehicle (or host vehicle) 1A equipped with a driving operation support (control) system 1 according to a practical example of a first embodiment.

FIG. 1 schematically shows a motor vehicle (host vehicle) 1A equipped with a vehicle driving (operation) support system 1 according to a practical example of a first embodiment of the present invention. Motor vehicle 1A includes: wheels 2FR, 2FL, 2RR and 2RL; a vehicle body 3; an active suspension system (4) including active suspensions 4FR, 4FL, 4RR and 4RL disposed between vehicle body 3 and wheels 2FR, 2FL, 2RR and 2RL, respectively; a steering wheel 5; a steering linkage 6 disposed between steering wheel 5 and steerable wheels 2FR and 2FL; an accelerator pedal 7; a brake pedal 8; and a camera system (9) including cameras 9F, 9R, 9SR and 9SL disposed, respectively, in front, rear, right and left parts of vehicle body 3, and arranged to monitor the surrounding of vehicle 1A by taking imagery. A controller 50 collects information by receiving signals from various components mounted on motor vehicle 1A.

Figure 2:
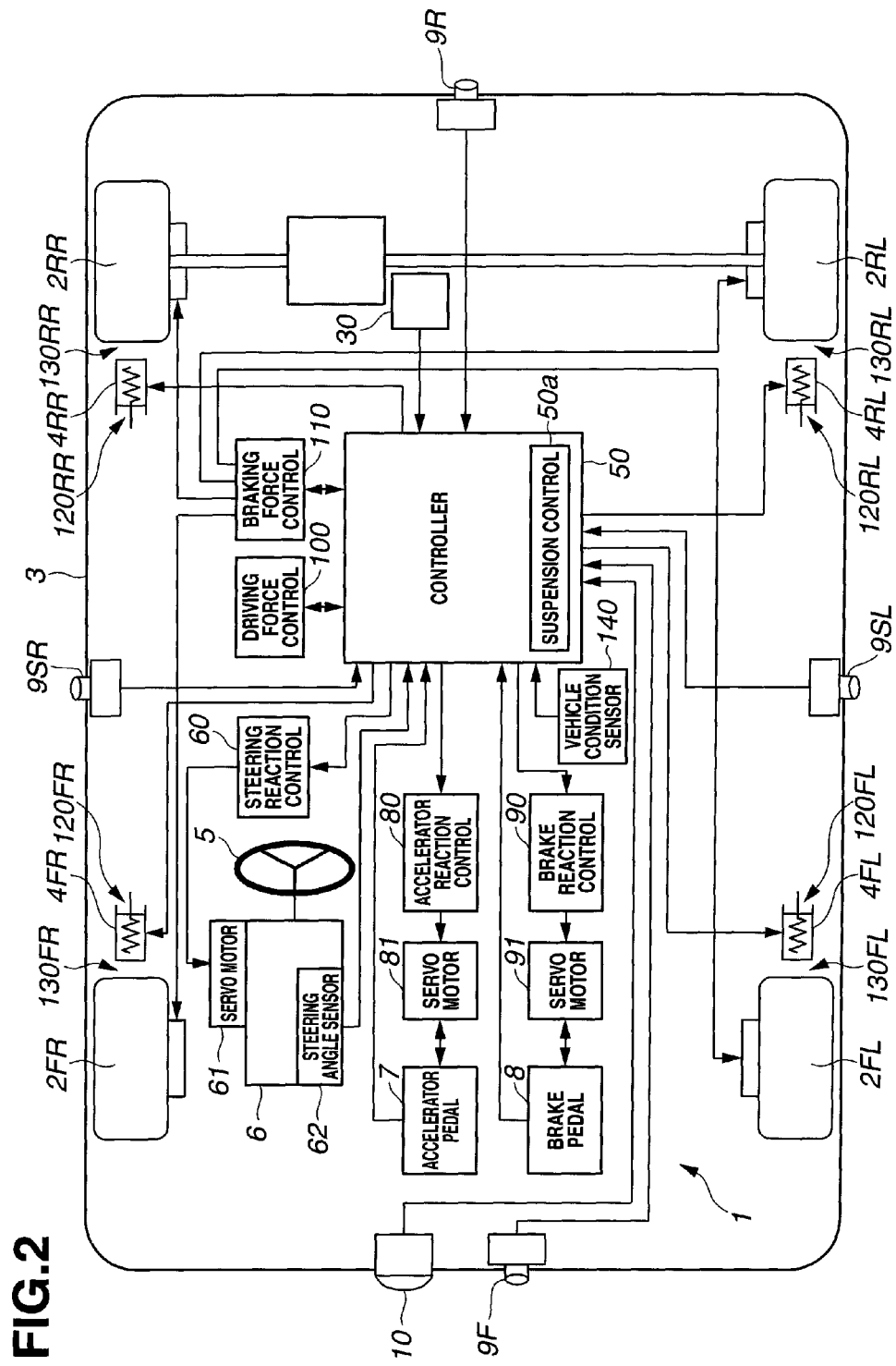
FIG. 2 is a schematic view schematically showing the driving operation support system 1 of the vehicle 1A.

FIG. 2 shows a control system of motor vehicle 1A. The control system shown in FIG. 2 includes: a laser radar 10; cameras 9F, 9R, 9SR and 9SL; a vehicle speed sensor 30; controller 50; steering reaction control unit 60; servo motors 61,81 and 91; a steering angle sensor 62; an accelerator (pedal) reaction control device 80; a brake (pedal) reaction control device 90; a driving force control device 100; a braking force control device 110; actuators 120FR, 120FL, 120RR and 120RL provided, respectively, in active suspensions 4FR, 4FL, 4RR and 4RL; vehicle body normal (or vertical) acceleration sensors 130FR, 130FL, 130RR and 130RL provided, respectively, in or near active suspensions 4FR, 4FL, 4RR and 4RL; and a vehicle condition sensing device 140.

In this example, the laser radar 10; cameras 9F, 9R, 9SR and 9SL; vehicle speed sensor 30; controller 50; steering reaction control device 60; servo motors 61,81 and 91; steering angle sensor 62; accelerator (pedal) reaction control device 80; brake (pedal) reaction control device 90; driving force control device 100; braking force control device 110; actuators 120FR, 120FL, 120RR and 120RL; vehicle body normal acceleration sensors 130FR, 130FL, 130RR and 130RL; and vehicle condition sensing device 140 can serve as components constituting the vehicle driving operation support system 1 according to the practical example of the first embodiment.

Laser radar 10 is attached to a front part of motor vehicle 1A, such as grille or bumper, and arranged to scan horizontally with infrared laser pulses. Laser radar 10 receives reflected waves of infrared laser pulses reflected by forward objects such as the rear ends of forward vehicles, and measures distance and direction from vehicle 1A to each of the forward objects from the time of reception of the reflected waves. The measured distance and direction of each object are supplied to controller 50.

The direction of the forward object is represented by an angle with respect to the forward direction or the longitudinal direction of vehicle 1A. The scanning range of laser radar 10 extends to about ±6 degrees with respect to the forward direction, and laser radar 10 can detect a forward object within this range. The forward object may be a forward vehicle, a pedestrian or some other object.

Front camera 9F is an image pickup device such as a camera of a small size having a CCD or CMOS imager, mounted above the windshield, for example. Camera 9F supplies image data of a forward road to controller 50. Camera 9F has an imaging range extending horizontally about ±30 degrees, and camera 9F can cover a forward road scene in this range.

Side cameras 9SR and 9SL are image pickup devices, such as CCD or CMOS camera, mounted, respectively, above left and right side rear doors, for example. Cameras 9SR and 9SL supply image data of scenes on the left and right sides of vehicle 1A, such as conditions of an adjacent lane, to controller 50. Side cameras 9SR and 9SL have a wider imaging range extending horizontally about ±60 degrees.

Rear camera 9R is an image pickup device such as a small CCD or CMOS camera, mounted above the rear window, for example. Camera 9R supplies image data of a rearward road to controller 50. Camera 9R has an imaging range extending horizontally about ±30 degrees like front camera 9F, and camera 9R can cover a rearward road scene in this range.

Vehicle speed sensor 30 senses the vehicle speed of vehicle 1A from wheel speeds, for example, and supplies the sensed vehicle speed to controller 50.

Controller 50 includes a processing unit such as CPU, and peripheral devices such as ROM and RAM, and serves as a main component of a control section in the vehicle driving operation support control system and other vehicle control systems.

Controller 50 determines an obstacle state around the vehicle, from the vehicle speed from vehicle speed sensor 30, distance information supplied from laser radar 10, and image information of the surrounding supplied from cameras 9F, 9R, 9SR and 9SL. Controller 50 extracts the obstacle condition around the vehicle by processing the image information supplied from the cameras.

The obstacle state includes one or more of obstacle conditions such as the distance to a forward vehicle traveling ahead of the host vehicle 1A, the existence/nonexistence and the degree of approach of another vehicle traveling in an adjacent lane after the host vehicle toward the host vehicle, the left and right position of the host vehicle with respect to a lane marking (white line), that is, the relative position and angle, and the shape of a lane marking. The driving operation support system detects a pedestrian or a two-wheeled vehicle crossing ahead of the host vehicle, as the obstacle condition.

Controller 50 calculates a risk potential to each obstacle (that is, a physical quantity representing the degree of closeness of host vehicle 1A to an obstacle). Moreover, controller 50 calculates a comprehensive risk potential of the surrounding around the host vehicle by synthesizing or integrating or totalizing individual risk potentials of obstacles around the vehicle, and performs a cooperative control for coordinating a lateral control in the vehicle lateral direction (control of a steering reaction and/or a steering angle), a longitudinal control in the vehicle longitudinal direction (control of a longitudinal (driving/braking) force and/or reaction of at least one of the accelerator pedal and brake pedal) and a vertical control in the vehicle vertical or normal direction (control of the fluid pressure and/or suspension strokes of the active suspensions), in accordance with the risk potential, as explained later.

In this embodiment, controller 50 performs the controls in the vehicle longitudinal, lateral and vertical directions in accordance with the comprehensive risk potential (RP). In this case, the controller 50 performs the controls so as to restrain or suppress transmission to the driver, of information (such as road surface condition and vehicle behavior) regarded as noise for the driving operation support control, and to allow transmission of information (such as the road surface condition and vehicle behavior) regarded as useful for leading the drive to proper driving operation.

In this example, controller 50 controls the longitudinal (braking/driving) force of the vehicle, the operational reaction (reaction force) produced in the operation input device operated by the driver, and the damping characteristic of the active suspension system. The operation input device includes any one or more of the accelerator pedal 7 to which a driver's accelerator operation is inputted, the brake pedal 8 to which a driver's brake operation is inputted, and the steering wheel 5 to which a driver's steering operation is inputted.

As to the damping characteristic of the active suspension system, controller 50 controls the pressure of a damper provided in each active suspension 4FR, 4FL, 4RR or 4RL, or the suspension stroke, in accordance with normal acceleration $X''_{2FL} \sim X''_{2RL}$ represented by sensor signals inputted to controller 50, respectively, from vehicle body normal acceleration sensors 130FR, 130FL, 130RR and 130RL.

Controller 50 multiplies the normal acceleration $X''$ by a predetermined gain Km, multiplies the integral $\int dt$ of body normal acceleration $X''$ by a predetermined gain Kn, determines the sum by addition of the products obtained by these multiplications, and determines a control command based on the thus-calculated sum, for controlling each of the pressure control actuators 120FR, 120FL, 120RR and 120RL in dampers of active suspensions 4FR, 4FL, 4RR and 4RL.

Figure 3:
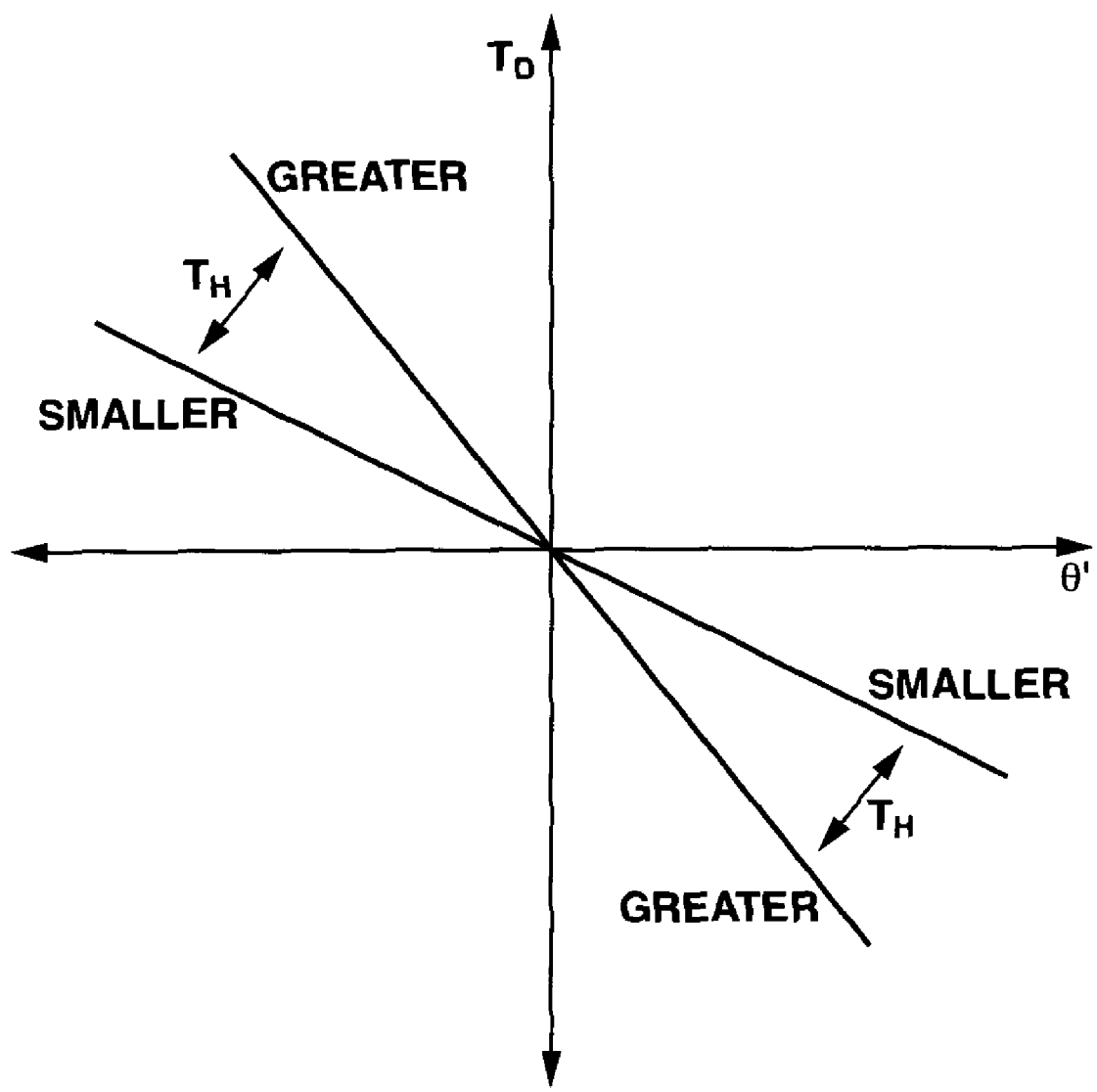
FIG. 3 is a graphic view showing a control map for calculating a damping force used for a steering reaction force control in the support system of FIG. 2.

The steering reaction control device or unit 60 is incorporated in the steering system of the vehicle and arranged to control the torque generated by servo motor 61 in response to a command signal delivered from controller 50. The servo motor 61 varies the output torque in response to a command of steering reaction control device 60. Therefore, controller 50 can control the steering reaction provided to a driver's steering operation, to a desired target value. In this case, controller 50 controls the steering reaction in accordance with the risk potential. In the control for imparting the steering reaction, controller 50 can use a damping force calculation control map as shown in FIG. 3.

A damping force $T_D$ added to a steering reaction $T_R$ is calculated from a steering angular speed $\theta'$ and a generation torque $T_H$. The damping force $T_D$ decreases monotonically or linearly as the steering angular speed $\theta'$ increases, and the rate of decrease of damping force $T_D$ with respect to the steering angular speed $\theta'$ is increased as the generation or production torque $T_H$ increases. In the example shown in FIG. 3, the damping force calculation control map has a horizontal axis expressing the steering angular speed $\theta'$ and a vertical axis expressing the damping force $T_D$, and this control map is set in the following manner. When steering angular speed $\theta'$ increases from zero in the positive direction, the damping force $T_D$ decreases in the negative direction from a value $T_D0$ (zero) in proportion to the steering angular speed $\theta'$. When steering angular speed $\theta'$ decreases from zero in the negative direction, the damping force $T_D$ increases in the positive direction from the value $T_D0$ (zero) in proportion to the steering angular speed $\theta'$. Furthermore, the rate of change (increase or decrease) of the damping force $T_D$ with respect to the steering angular speed $\theta'$ is increased as the generation torque $T_H$ becomes greater.

The steering angle sensor 62 of this example is an angle sensor disposed near the steering column or steering wheel, and arranged to sense the rotational angle of the steering shaft as the steering angle, and to supply the sensed steering angle to controller 50.

There is provided an accelerator operation (or accelerator input) sensor for sensing the driver's accelerator operation quantity. In this example, the accelerator operation sensor is an accelerator pedal stroke sensor (not shown) to sense the accelerator operation quantity in the form of an accelerator pedal depression quantity or degree of accelerator pedal 7. The sensed accelerator operation quantity is supplied to controller 50.

The accelerator reaction control device or unit 80 controls the torque generated by servo motor 81 incorporated in the linkage of accelerator pedal 82, in response to a command signal supplied from controller 50. The servo motor 81 varies the reaction force generated by servo motor 81 in response to a command from accelerator reaction control unit 80, and thereby makes it possible to control the pedal force produced during a driver's accelerator operation of depressing accelerator pedal 82 to a desired target value.

There is provided a brake operation sensor for sensing a driver's brake operation quantity. In this example, the brake operation sensor is a brake pedal stroke sensor (not shown) to sense the brake operation quantity in the form of a brake pedal depression quantity or degree of brake pedal 8. The sensed brake operation quantity is supplied to controller 50.

The brake reaction control device or unit 90 controls a brake assist force generated by a brake booster, in response to a command signal supplied from controller 50. The brake booster varies the brake assist force generated by the brake booster, in response to a command from brake reaction control unit 90, and thereby makes it possible to control the pedal force produced during a driver's brake operation of depressing brake pedal 8 to a desired target value. As the brake assist force is increased, the brake reaction force becomes smaller, and the brake pedal 8 becomes easier to depress.

The driving force control device or unit 100 includes an engine controller, and control the engine torque of the engine of the vehicle in response to a command signal from controller 50.

The braking force control device or unit 110 includes a brake pressure controller, and controls the brake fluid pressure in response to a command signal from controller 50.

The vehicle condition sensing section 140 includes various vehicle condition sensors for sensing vehicle conditions of the host vehicle 1A, such as a lateral acceleration sensor, a yaw rate sensor, an accelerator opening sensor, and a brake pressure sensor, and supplies the sensed vehicle operating conditions such as the sensed lateral acceleration (or lateral G), yaw rate, accelerator opening degree ACC, brake pressure BRK etc., to controller 50.

(Active Suspension Mechanism)

Figure 4:
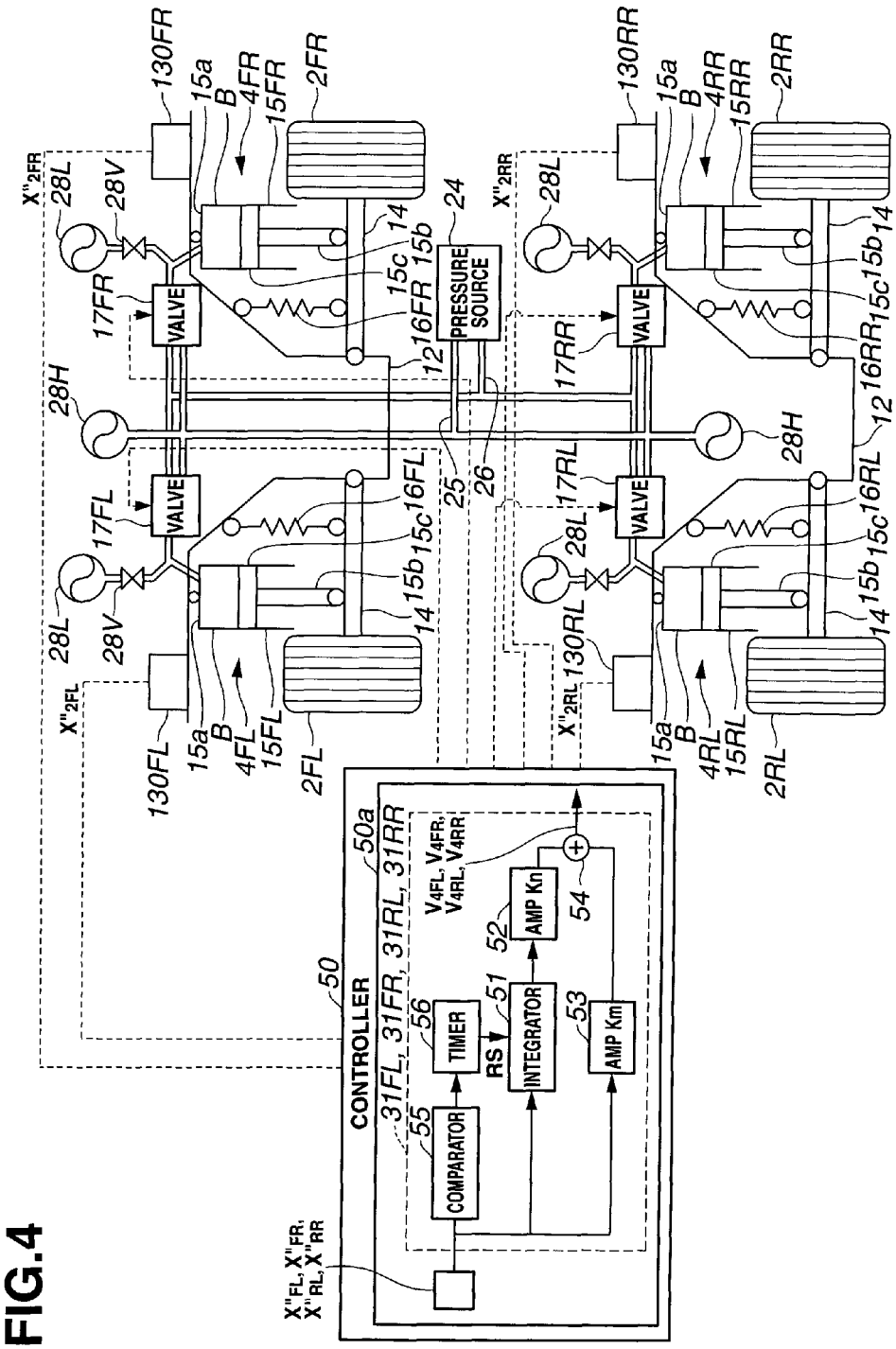
FIG. 4 is a schematic view schematically showing an active suspension system employed in the practical example of the first embodiment.

FIG. 4 shows an active suspension system or mechanism employed in the vehicle 1A of this example. As shown in FIG. 4, each of the active suspensions 4FR, 4FL, 4RR and 4RL is disposed between a body side member 12 of the vehicle body and a wheel side member 14 supporting a corresponding one of the wheels 2FR, 2FL, 2RR and 2RL. Each of the active suspensions 4FR-4RL includes the actuator 120FR, 120FL, 120RR or 120RL, a coil spring 16FR, 16FL, 16RR or 16RL, and a pressure control valve 17FR, 17FL, 17RR or 17RL controlling the operating fluid pressure for the corresponding actuator only in response to a command from controller 50. Pressure control valves 17FL~17RR are connected with a fluid pressure source 24 by a fluid passage 25. At least one high pressure side accumulator 28H is connected with the fluid passage 25. The pressure control valve of each active suspension is connected with a corresponding one of low pressure side accumulator 28L by a fluid passage having a throttling valve 28V. The actuator 120FR, 120FL, 120RR or 120RL of each active suspension includes a hydraulic cylinder 15FR, 15FL, 15RR or 15RL which is connected with the fluid passage connecting the pressure control valve 17FL-17RR and the low pressure side accumulator 28L.

Each of actuators 120FR, 120FL, 120RR and 120RL includes a cylinder tube 15a which is attached to the vehicle body member 12, a piston rod 15b which is attached to the wheel member 14, and a piston 15c closing an upper pressure chamber B receiving the fluid pressure controlled by the corresponding pressure control valve 17FL~17RR. Each of coil springs 16FL~16RR is disposed between the vehicle body member 12 and the wheel member 14, in parallel to the corresponding one of actuators 120FL~120RR, and arranged to support the static load of the vehicle body. As coil springs 16FL~16RR, it is possible to use springs having a low spring constant only for supporting the static load.

The pressure control valve 17 of each wheel functions to decrease the pressure in upper pressure chamber B when the pressure in upper pressure chamber B increases, and to increase the pressure in upper pressure chamber B when the pressure decreases. By so doing, pressure control valve 17 can suppress a pressure increase in upper pressure chamber B due to an upward vibration input, and a pressure decrease in upper pressure chamber B due to a downward vibration input, and reduce vibrations transmitted to the vehicle body side member 12.

Vehicle body normal acceleration sensors 130FL, 130FR, 130RL and 130RR are mounted on vehicle body 3, respectively, at positions just above wheels 2FL, 2FR, 2RL and 2RR, and connected with controller 50 to supply normal acceleration signals representing sensed body normal accelerations $X''_{2FL} \sim X''_{2RR}$.

Controller 50 includes a suspension control section 50a for controlling the pressures of active suspensions 4FL, 4FR, 4RL and 4RR. Suspension control section 50a has a gain adjusting function of multiplying each of body normal accelerations $X''_{2FL} \sim X''_{2RR}$ by a predetermined gain Km, a body normal velocity calculating & gain adjusting function of multiplying an integral $\int dt$ of each of body normal accelerations $X''_{2FL} \sim X''_{2RR}$, by a predetermined gain Kn, and an adding function of determining a sum by adding the outputs of the gain adjusting function and the body normal velocity calculating & gain adjusting function. The sum determined by the adding function is supplied as a command $V_{4FL} \sim V_{4RR}$ to pressure control valve 17(FL~RR).

Suspension control section 50a of controller 50 includes an integrator 51 which receives the sensed body normal accelerations $X''_{2FL} \sim X''_{2RR}$ and determines the respective integrals representing the body normal velocities $X'_{2FL} \sim X'_{2RR}$, and an amplifier 52 which amplifies the body normal velocities $X'_{2FL} \sim X'_{2RR}$ with the predetermined gain Kn, respectively. Suspension control section 50a further includes an amplifier 53 which receives the sensed body normal accelerations $X''_{2FL} \sim X''_{2RR}$ and amplifies the body normal accelerations $X''_{2FL} \sim X''_{2RR}$ with the predetermined gain Km, and an adder 54 which adds the amplifier outputs from amplifiers 52 and 53.

The sensed body normal accelerations $X''_{2FL} \sim X''_{2RR}$ are further inputted to a comparator 55 forming a window comparator, for example. Comparator 55 outputs a comparator output of a logic value 1, for example, when the sensed body normal accelerations $X''_{2FL} \sim X''_{2RR}$ are within a predetermined range between a predetermined upper limit value and a predetermined lower limit value. This comparator output is supplied to a timer circuit 56 for examining whether the comparator output remains continuously at the logic value 1 for a predetermined time duration. When the continuance of the comparator output at the logic value 1 becomes equal to or longer than the predetermined time duration, the timer circuit 56 delivers a reset signal RS (having a logic value 1, for example) to integrator 51, and thereby resets the accumulated data in integrator 51.

By varying the gain Km for the body normal accelerations $X''_{2FL} \sim X''_{2RR}$, and the gain Kn for the body normal velocities $X'_{2FL} \sim X'_{2RR}$, the suspension control section 50a can control the active suspensions 4 (FL~RR) so as to cancel vibrations inputted to vehicle body 3 from the road surface almost entirely, or to allow vibrations to be transmitted directly to vehicle body with no or little suppression. Furthermore, by producing the pressure control valve command signals $V_{4FL} \sim V_{4RR}$ independent from the road surface input, the suspension control section 50a can control the active suspensions in other control modes (such as a control mode to control the rolling motion or the pitching motion of the vehicle body) other than the control mode for suppressing vibrations from the road surface.

(Control Processes in Controller)

The driving support system of this embodiment calculates a risk potential RP of vehicle 1A, varies the degree of reduction of road surface noise that is noise transmitted from the road surface, in accordance with the risk potential RP, and performs a driving support control process for supporting or assisting a driver's operation for vehicle longitudinal motion and vehicle lateral motion in accordance with the risk potential RP.

(Risk Potential Calculation)

Figure 5:
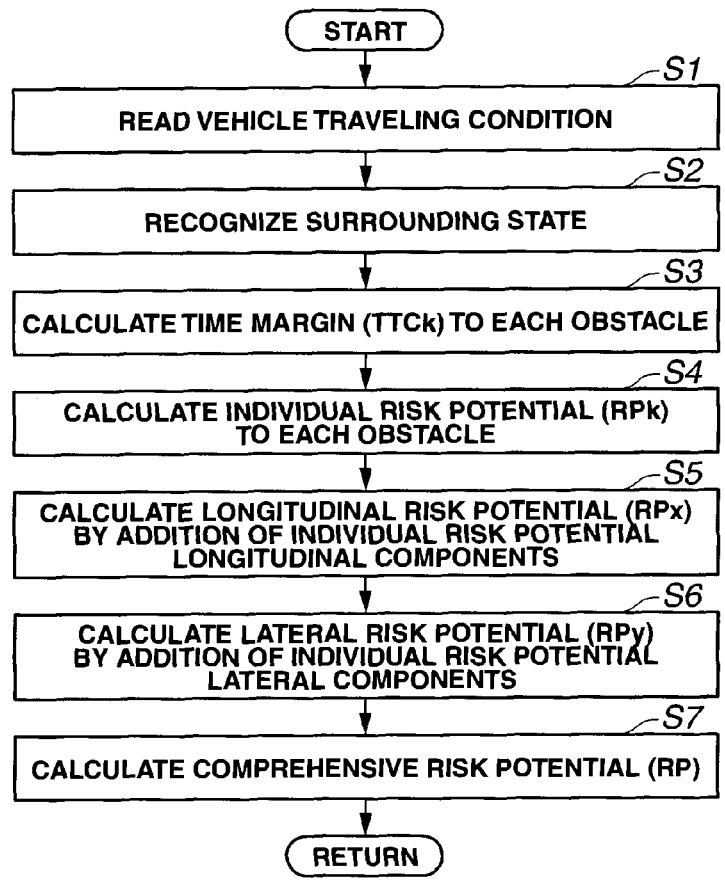
FIG. 5 is a flowchart showing a risk potential calculating process performed by a controller 50 of the support system shown in FIG. 2.

FIG. 5 shows a risk potential calculating process in the form of a flowchart, which is initiated in response to a start command inputted by the driver to start the driving operation support control. Controller 50 first reads the vehicle traveling condition of vehicle 1A at a step S1.

The vehicle traveling condition includes a surrounding condition inclusive of an obstacle condition around vehicle 1A, and other information. In this example, the vehicle traveling condition obtained at S1 includes at least: the relative distance and relative angle to a forward vehicle detected by laser radar 10; information from front camera 9F including the relative position (displacement in the lateral direction and relative angle) and shape of a lane marker, and the relative distance and angle to a forward vehicle; information based on imagery obtained by cameras 9R, 9SR and 9SL, including the relative distance and angle to a rearward vehicle following the vehicle 1A in an adjacent lane; and the vehicle speed sensed by vehicle speed sensor 30. Moreover, from the image data obtained by cameras 9F, 9R, 9SL and 9SR, controller 50 discriminates among four-wheeled vehicle, two-wheeled vehicle, pedestrian and other obstacles and determines the kind of each obstacle by using image data obtained by cameras 9F, 9R, 9SL and 9SR.

Then, at a step S2, controller 50 recognizes the current surrounding state from the data on the vehicle traveling condition obtained at S1. In this example, controller 50 recognizes the current relative position, moving direction, and moving speed of each obstacle relative to vehicle 1A, by using previous data stored in a memory section (such as section 556d shown in FIG. 17 or an external memory device) and current data. For example, the previous data includes the relative position, moving direction and moving speed of each obstacle with respect to vehicle 1A, obtained in a most recent control cycle or a previous control cycle. The current data is the current data on the vehicle traveling condition obtained at S1. Thus, controller 50 can recognize the relative position and movement of each obstacle.

At a next step S3, controller 3 calculates a time margin TTC (time to collision) to each obstacle detected or recognized at S2. The time margin TTCk to an obstacle k is calculated by using the following equation (1).

$$TTCk=(Dk-\sigma(Dk))/(Vrk+\sigma(Vrk)) \quad (1)$$

In this equation: Dk is a relative distance from vehicle 1A to the obstacle k; Vrk is a relative speed of the obstacle k with respect to vehicle 1A; $\sigma(Dk)$ is a dispersion of the relative distance; and $\sigma(Drk)$ is a dispersion of the relative speed.

The dispersions $\sigma(Dk)$ and $\sigma(Drk)$ are determined by the type of the sensor which has detected the obstacle k, and the type of the obstacle k, in consideration of the uncertainty of the sensing device, and the weight of influence of occurrence of unexpected condition. The distance measurement by laser radar 10 is more accurate than the measurement by cameras 9F, 9R, 9SR and 9SL. Therefore, the dispersion $\sigma(Dk)$ of the relative distance is held substantially constant without regard to the value of the relative distance when the relative distance Dk is measured by laser radar 10. When, on the other hand, the relative distance Dk is measured by the use of image data from cameras 9F, 9R, 9SR and 9SL, the dispersion $\sigma(Dk)$ is so set that the dispersion $\sigma(Dk)$ of the relative distance increases exponentially with increase of the relative distance Dk. When the relative distance Dk to the obstacle k is small, the dispersion $\sigma(Dk)$ of the relative distance Dk is set smaller since a smaller relative distance can be measured more accurately by the cameras as compared to laser radar.

It is possible to employ the following setting, for example. When the relative distance Dk is sensed by laser radar 10, the dispersion $\sigma(Drk)$ of the relative speed is increased in proportion to the relative speed Vrk. When the relative distance Dk is sensed by the cameras, the dispersion $\sigma(Drk)$ of the relative speed is increased exponentially with increase of the relative speed Drk. When the object condition is sensed by the cameras, the control system can recognize the type of the obstacle by processing the image data. Therefore, in this case, the dispersions $\sigma(Dk)$ and $\sigma(Drk)$ are set in dependence on the type of the obstacle.

The measurement of relative distance Dk by the cameras is more accurate when the size of the obstacle is greater. Therefore, the dispersion $\sigma(Dk)$ of the relative distance is set smaller for a four-wheeled vehicle than for a two-wheeled vehicle or pedestrian. The dispersion $\sigma(Drk)$ of the relative speed is increased as the estimated speed of the obstacle k becomes higher. Even if the estimated relative speed Vrk is the same, the relative speed dispersion $\sigma(Drk)$ is set greater for a four-wheel vehicle than for a two-wheel vehicle or pedestrian because the moving speed of the four-wheeled vehicle is assumed to be higher than that of a two-wheeled vehicle and a pedestrian. If the obstacle k is sensed both by laser radar 10 and the cameras 9F, 9R, 9SR and 9SL, the controller 50 may be configured to calculate the time margin TTCk by using a greater one of values of dispersion $\sigma(Dk)$ and a greater one of values of dispersion $\sigma(Drk)$.

At a step S4, controller 50 calculates an individual risk potential RPk to each obstacle k by using the time margin TTCk calculated at S3. The following equation (2) is used for this calculation.

$$RPk=(1/TTCk) \times wk \quad (2)$$

In this equation, wk is a weight of an obstacle k. As expressed by the equation (2), the risk potential is expressed as a function of time margin TTCk using the reciprocal of TTCk. Risk potential RPk represents the degree of closeness to the obstacle k, and the risk potential RPk becomes higher as the vehicle 1A approaches the obstacle k.

The weight wk of each obstacle k is determined in accordance with the type of the obstacle k. In this example, the weight wk is set equal to one (wk=1) when the obstacle k is a four-wheeled or two-wheeled vehicle or a pedestrian because the degree of influence or consequence resulting from approach to the obstacle k is high. When the obstacle k is a lane marker or an object which cannot be an object of collision, the weight wk is set equal to 0.5 (wk=0.5).

At a step S5, controller 50 extracts the longitudinal components of the individual risk potentials RPk of the objects calculated at S4 in the longitudinal direction of the vehicle, and calculates a comprehensive or overall longitudinal risk potential RPx (or RPlongitudinal) to all the obstacles around the vehicle, by adding the extracted longitudinal components of the individual risk potentials RPk. The following equation (3) can be used for this calculation.

$$RPx = \Sigma_k (RPk \times \cos \theta k) \quad (3)$$

In this equation, $\theta k$ is an angle represents the direction of a k-th object with respect to host vehicle 1A. The angle $\theta k$ is zero ($\theta k=0$) when the k-th obstacle is located straight ahead of the vehicle 1A in the forward direction. The angle $\theta k$ is 180 ($\theta k=180$) when the k-th obstacle is located behind the vehicle 1A in the rearward direction.

At a step S6, controller 50 extracts the lateral components of the individual risk potentials RPk of the objects calculated at S4 in the lateral direction of the vehicle, and calculates a comprehensive or overall lateral risk potential RPy (or RPlateral) to all the obstacles around the vehicle, by adding the extracted lateral components of the individual risk potentials RPk. The following equation (4) can be used for this calculation.

$$RPy = \Sigma_k (RPk \times \sin \theta k) \quad (4)$$

At a step S7, controller 50 calculates a risk potential RP (or comprehensive or overall risk potential RP), by adding the individual risk potentials RPk to all the obstacles calculated at S4. After S7, controller 50 repeats the risk potential calculating process until a driver's stop command is inputted to terminate the driving support control. The risk potentials and other parameters calculated in this risk potential calculating process are stored by controller 50 in the memory section for later use for other control processes.

(Information Transmission Control)

Figure 6:
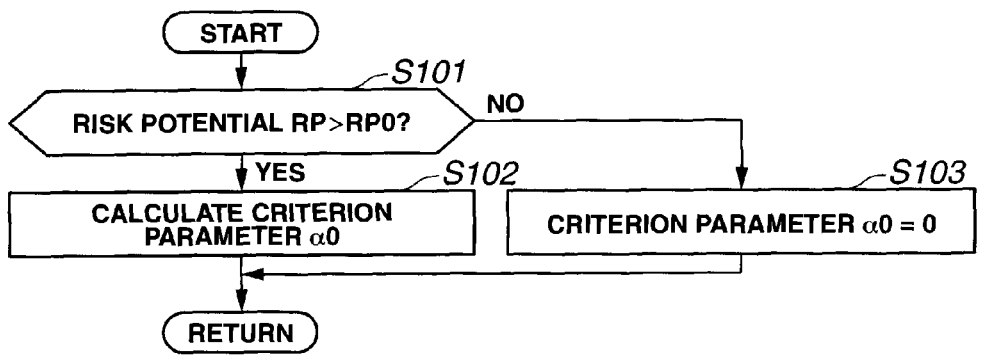
FIG. 6 is a flowchart showing an information transmission control process performed by controller 50.

FIG. 6 shows the information transmission control (restraint control) process performed by controller 50, in the form of flowchart. (At least part of the information transmission control can be regarded as corresponding to the assist control.) The information transmission control process is a process for varying the degree of information transmission (or the degree of noise reduction, or the degree of restraint for restraining disturbance transmitted to the driver) by active suspensions 4FR, 4FL, 4RR and 4RL, in accordance with risk potential RP in the case of the driving support of the vehicle driving support system 1. Controller 50 starts the information transmission control in response to a start command inputted by the driver.

At a first step S101 of FIG. 6, controller 50 compares the risk potential RP calculated by the risk potential calculating process with a predetermined threshold RP0 to determine whether risk potential RP is higher than threshold RP0. When risk potential RP is higher than threshold RP0, then controller 50 proceeds from S101 to a step S102, and calculates an information transmission control criterion parameter $\alpha 0$ at S102.

This information transmission control criterion parameter $\alpha 0$ is a control parameter determined in accordance with risk potential RP. In this example, the information transmission control criterion parameter $\alpha 0$ is a variable between 0~1. The degree of restraint for cancelling vibration from the road is increased as the criterion parameter $\alpha 0$ increases. When criterion parameter $\alpha 0$ is small, the control system transmits vibration from the road surface to the driver with no or little suppression.

Figure 7:
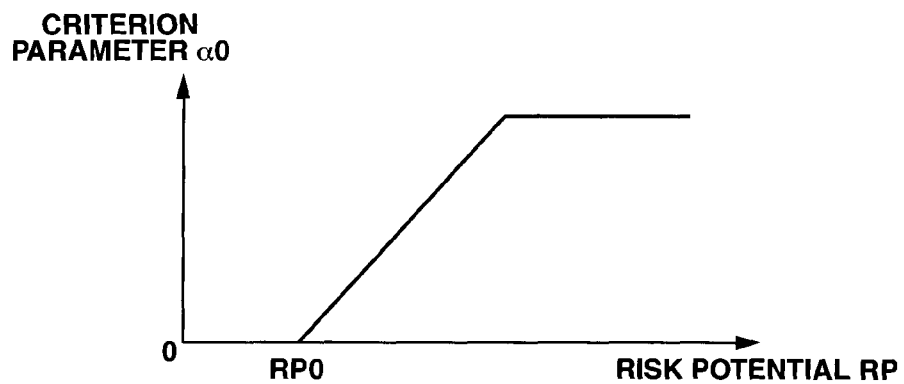
FIG. 7 is a graphic view showing a relationship between the risk potential and an information transmission control criterion parameter $\alpha 0$ used in the information transmission control process.

FIG. 7 shows a relationship between risk potential RP and criterion parameter $\alpha 0$. As shown in FIG. 7, the criterion parameter $\alpha 0$ increases as risk potential RP increases beyond threshold RP0. The maximum value of criterion parameter $\alpha 0$ is set to one. After criterion parameter $\alpha 0$ is increased to one, the criterion parameter $\alpha 0$ remains equal to one without regard to a further increase of risk potential RP. In this example, the relationship of criterion parameter $\alpha 0$ with respect to RP is a monotone increasing function. In the example of FIG. 7, criterion parameter 0 increases linearly from zero to one as RP increases from PR0 to a predetermined potential value. Criterion parameter $\alpha 0$ is constantly equal to one in the region in which risk potential RP is higher than the predetermined potential value at which criterion parameter reaches the maximum of one.

When risk potential RP is lower than or equal to threshold RP0, then controller 50 proceeds from S101 to a step S103, and sets the information transmission control criterion parameter $\alpha 0$ to zero ($\alpha 0=0$) at S103. After S102 or S103, controller 50 repeats the information transmission control process of FIG. 6 until an end command is inputted by the driver.

The information transmission control criterion parameter $\alpha 0$ calculated at S102 or S103 is used, by controller 50, as a parameter representing the degree of addition of an additional control to a normal suspension control of the active suspension system 4 (4FR, 4FL, 4RR, 4RL) normally performed in motor vehicle 1A. In this embodiment, controller 50 controls the active suspension system 4 to reduce vibrations transmitted from the road surface with a predetermined rate or ratio (in this example, the vibrations from the road surface are reduced by 70%, for example) in the normal state in which the information transmission control is not performed.

By performing the information transmission control process, controller 50 varies the vibration reduction rate or ratio from the normal level of the normal state in which the information transmission control process is not performed, to an adjusted level corresponding to the information transmission control criterion parameter $\alpha 0$, and controls the active suspension system 4 to achieve the adjusted level. In this example, controller 50 increases the degree of cancelling the vibrations from the road surface as the information transmission control criterion parameter $\alpha 0$ becomes greater, and controls the suspension system 4 to transmit the vibrations from the road surface with less cancellation, to the driver as the information transmission control criterion parameter $\alpha 0$ becomes smaller.

Information transmission control criterion parameter $\alpha 0$ is set in the form of a monotone function tending to increase monotonically with risk potential RP. Accordingly, the driving support control system controls the suspension system 4 so as to cancel vibrations from the road surface strongly with increase of risk potential RP. In the situation requiring keen attention of the driver to an obstacle around the vehicle, the driving support system cancels the vibrations from the road in this way, and thereby makes it possible to communicate or transmit, to the driver, useful information for the driving support in various forms such as tactile, visual and audible forms effectively. In this example, useful information is communicated to the driver in the form of a reaction added to a driver's steering, accelerating or braking operation.

(Driving Operation Support Control for Vehicle Longitudinal Direction)

Figure 8:
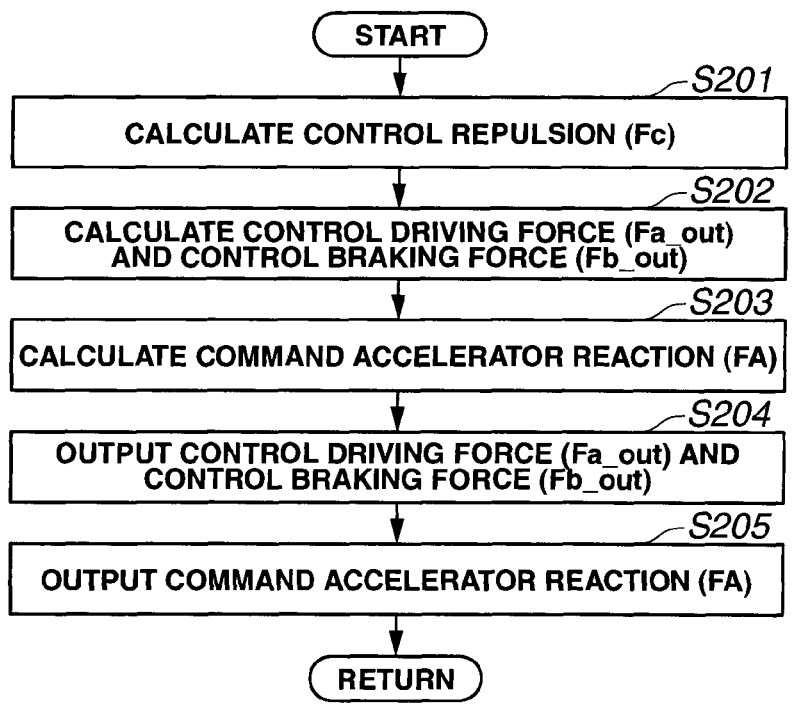
FIG. 8 is a flowchart showing a longitudinal driving operation support control process performed by controller 50.

FIG. 8 shows a longitudinal support control process for the vehicle longitudinal direction. Controller 50 starts the process of FIG. 8 in response to a driver's command to start the driving operation assistance.

At a step S201 of FIG. 8, controller 50 calculates a control repulsion Fc (or repulsive force) from the longitudinal risk potential RPx calculated in the risk potential calculating process. The control repulsion Fc is a variable used for calculating a target longitudinal (driving/braking) force and a command accelerator reaction (FA).

Figure 9A:
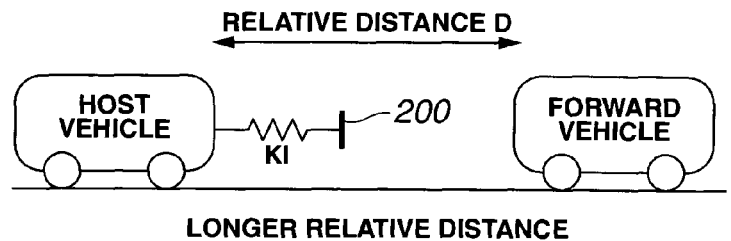
FIGS. 9A and 9B are schematic views illustrating a longitudinal force control.
Figure 9B:
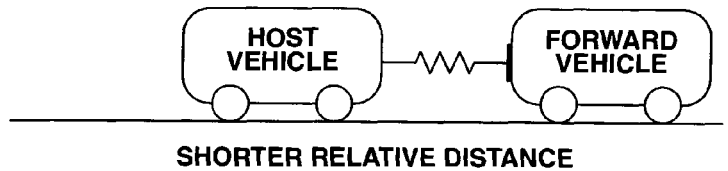

This control repulsion Fc can be defined as a repulsive force in a model shown in FIGS. 9A and 9B. In this model, an imaginary elastic member 200 is attached to the front of a host vehicle, and arranged to produce a pseudo running resistance by being compressed by collision with a forward obstacle. The control repulsion Fc is defined as a repulsive force produced when imaginary elastic member 200 is compressed by the collision with the forward vehicle.

In this example, controller 50 uses a predetermined threshold RPL1 for longitudinal risk potential RPx, and calculates the control repulsion Fc so that control repulsion Fc is proportional to the difference (RPx−RPL1) between RPx and RPL1, according to a following mathematical expression (5) when the longitudinal risk potential RPx is higher than threshold RPL1.

$$Fc = K1 \cdot (RPx - RPL1) \quad (5)$$

This equation has a meaning that the longitudinal risk potential RPx is regarded as a displacement of elastic member 200, and the control repulsion Fc is proportional to the displacement of elastic member 200. Accordingly, K1 is a a coefficient corresponding to a spring constant of imaginary elastic member 200.

At a step S202, controller 50 calculates a desired control driving force Fa_out and a desired control braking force Fb_out by using the control repulsion Fc calculated at S201. The control driving force Fa_out and a control braking force Fb_out are variables used for the control of the longitudinal force. Then, at a step S203, controller 50 calculates a command accelerator (pedal) reaction FA by using the control repulsion Fc calculated at S201. The command accelerator reaction FA is a control quantity for controlling an accelerator (pedal) reaction provided to an operation on accelerator pedal 7.

At a step S204, controller 50 outputs the control driving force Fa_out and control braking force Fb_out calculated at S202, to the driving force control device 100 and the braking force control device 110, respectively. Therefore, the engine controller of driving force control device 100 controls the engine torque in accordance with the command from controller 50, and the brake pressure controller of braking force control device 110 controls the brake fluid pressure in accordance with the command from controller 50.

Then, at a step S205, controller 50 outputs the command accelerator reaction FA calculated at S203, to the accelerator reaction control device 80. Therefore, the accelerator reaction control device 80 controls the accelerator pedal reaction so as to add the reaction corresponding to the command inputted from controller 50, to a base accelerator reaction which is a normal accelerator reaction produced according to a normal accelerator reaction characteristic in response to an accelerating operation quantity SA (or accelerator pedal operation quantity). After S205, controller 50 repeats the longitudinal driving operation support control process until an end command is inputted by the driver.

(Driving Operation Support Control for Vehicle Lateral Direction)

Figure 10:
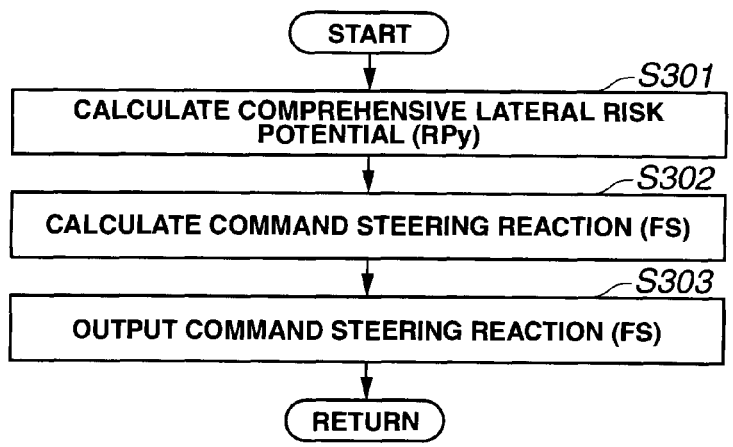
FIG. 10 is a flowchart showing a lateral driving operation support control process.

FIG. 10 shows a lateral support control process for the vehicle lateral direction. Controller 50 starts the process of FIG. 10 in response to a driver's command to start the driving operation support control.

At a step S301, controller 50 ascertain the lateral risk potential RPy calculated by the risk potential calculating process of FIG. 5. It is possible to calculate the comprehensive lateral risk potential to all the obstacle around the vehicle, by adding the lateral components of the individual risk potentials RPk. Moreover, at a step S302, controller 50 calculates a lateral control command that is a command steering reaction FS to be delivered to the steering reaction control device 60, in accordance with the lateral risk potential RPy.

The command steering reaction is increased so as to increase a steering reaction tending to return the steering wheel to the neutral position, and hence to reduce the steering wheel angle as the lateral risk potential RPy becomes higher. At a step S303, controller 50 delivers the command steering reaction FS calculated at S302, to the steering reaction control unit 60. After S303, controller 50 repeats the lateral assist control process of FIG. 10 until a command is inputted by the driver to stop the execution.

(Operations)

In the host vehicle 1A, the driving (operation) support control system according to the practical example of the first embodiment normally controls the active suspensions 4FR, 4FL, 4RR and 4RL in a normal mode to reduce vibrations from the road surface by a predetermined percentage (70%, for example). When the command is inputted by the driver to start the driving operation support control of the support control system 1, then controller 50 calculates the longitudinal risk potential RPx, lateral risk potential RPy and comprehensive risk potential RP by repeating the risk potential calculating process, and performs the control in the vehicle vertical direction, the control in the longitudinal direction and the control in the lateral direction systematically in accordance with the current values of the risk potentials. In this practical example, controller 50 performs the information transmission (restraint) control, as the control in the vertical direction. By performing the information transmission (restraint) control, the control system cancels the vibrations from the road surface to a greater extent when the risk potential RP becomes higher.

In the state in which the information transmission (restraint) control is being performed, the control system performs the driving operation support controls in the longitudinal direction and lateral direction. That is, controller 50 controls the engine torque with the driving force control unit 100 and the brake fluid pressure with the braking force control unit 100 in accordance with the longitudinal risk potential RPx. Moreover, controller 50 controls the accelerator pedal reaction with the accelerator reaction control unit 80 in accordance with longitudinal risk potential RPx. Therefore, the accelerator reaction is increased to increase the difficulty of depressing the accelerator pedal 82 with increase in the longitudinal risk potential RPx.

Furthermore, in accordance with the lateral risk potential RPy, controller 50 controls the steering reaction with the steering reaction control unit 60. When the lateral risk potential RPy becomes higher, the steering reaction is increased to increase the difficulty of the steering operation in the direction toward the obstacle.

During the control for controlling the accelerator reaction and steering reaction, controller 50 varies the degree of restraint for restraining noise from the road in accordance with the risk potential RP. Therefore, the control system can transmit, securely to the driver, useful information about an obstacle in the form of the operational reaction in the longitudinal direction and the lateral direction. In this way, the control system performs the support control for providing the operational reaction in the longitudinal and lateral directions while reducing vibrations from the road in accordance with the risk potential. Therefore, the control system can reduce the noise in the vertical direction in accordance with the obstacle condition around the vehicle, and transmit information about obstacles in the vehicle longitudinal and lateral directions effectively to the driver.

In the practical example of the first embodiment, at least one of steering wheel 5, accelerator pedal 7 and brake pedal 8 corresponds to an operation input section. At least one of vehicle speed sensor 30, vehicle condition sensing device 140, and normal acceleration sensors 130$i$ corresponds to a vehicle condition sensing section. At least one of cameras 9F, 9R, 9SR and 9SR, laser radar 10 and controller 50 corresponds to an obstacle sensing section. Controller 50 can be regarded as corresponding to at least one or risk potential calculating section, and information transmission restraint (assist) controlling section. At least one of steering reaction control unit 60, accelerator reaction control unit 80 and brake reaction control unit 90 corresponds to an operational reaction imparting section. At least one of active suspensions 4$i$(FL~RR) and controller 50 corresponds to motion regulating section and a damping device.

Application Example 1

The condition of the information transmission according to the first embodiment can be set, as an example, in the following manner. As a basic condition, it is desirable to transmit, to the driver, the acceleration and deceleration and pitching during the accelerating or decelerating movement of the vehicle, and the yawing motion and steering reaction during the turning movement of the vehicle. It is not always helpful to transmit other information to the driver. However, some of information may be transmitted to the driver according to the following conditions.

1) Vibrations from the road surface are cut off when the vehicle speed is high or higher than a predetermined speed. When the vehicle speed is low or lower than a predetermined speed, vibrations from the road surface are restrained so as to decrease the absolute quantity, and thereafter transmitted to the driver.

2) Vibrations from the road surface are transmitted to the driver when the field of vision or visibility is extremely bad. When the field of vision is good, vibrations from the road surface are transmitted in a restricted quantity to the driver.

3) Vibrations from the road surface is transmitted to the driver when the environment of the vehicle is dark. When the environment is light, vibrations from the road surface are restricted to reduce the absolute quantity, and transmitted to the driver. In this way, the control system can match the information by the visual sense and the vehicle behavior with each other, and prevent unnatural feeling.

4) Vibrations from the road surface are cut off when the road is an expressway or highway. In the case of ordinary road and urban area, vibrations from the road surface are restrained so as to decrease the absolute quantity, and thereafter transmitted to the driver.

Application Example 2

Figure 11:
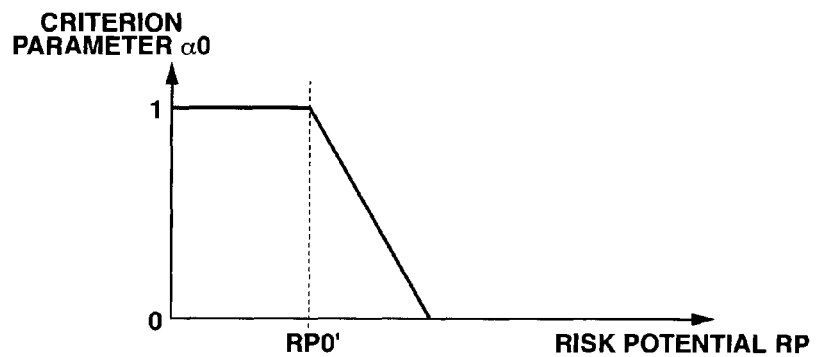
FIG. 11 is a graphic view showing another example of the relationship between the risk potential RP and the information transmission control criterion parameter $\alpha 0$.
Figure 12:
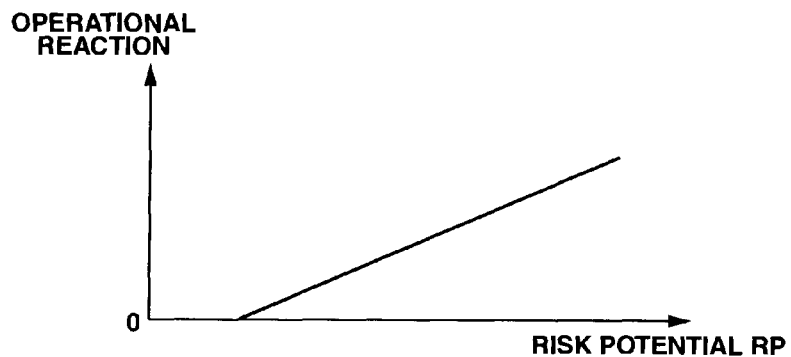
FIG. 12 is a graphic view showing a relationship between the risk potential RP and an operation reaction (the steering reaction and/or the pedal reaction).

FIG. 11 shows the relationship between the information transmission control criterion parameter α0 and risk potential RP in another example which can be used in place of FIG. 7. FIG. 12 schematically shows a relationship of an operational reaction (steering reaction and pedal reaction) with respect to risk potential RP. In the example shown in FIG. 11, when risk potential RP is lower than or equal to a potential threshold RP0', the control system sets the criterion parameter α0 equal to one (α0=1), and thereby holds the degree of restraint for cancelling the transmission of vibration from the road at a high level. When risk potential RP becomes higher than threshold RP0', then the control system decreases the criterion parameter α0 with increase in risk potential RP, and thereby decreases the degree of restraint for cancelling vibrations transmitted from the road. The relationship shown in FIG. 11 is in the form of a monotone decreasing function designed to decrease the criterion parameter α0 as risk potential RP increases, while the relationship shown in FIG. 7 is a monotone increasing function.

Figure 13:
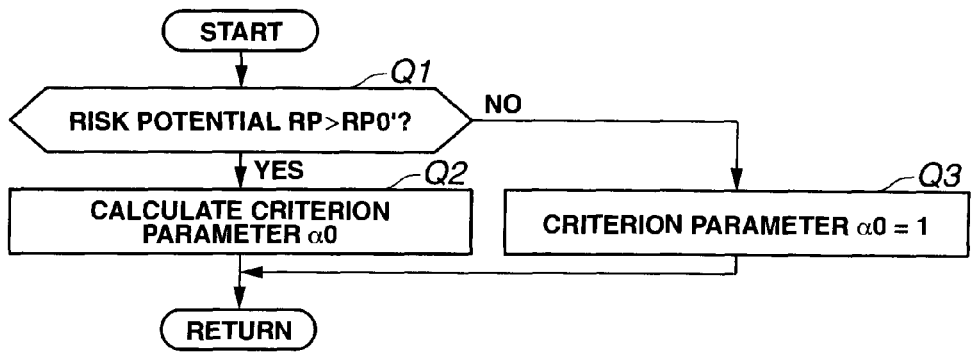
FIG. 13 is a flowchart showing the information transmission control of an application example 2.

FIG. 13 is a flowchart showing an information transmission control process based on the relationship of FIG. 11. Controller 50 starts the control process in response to a driver's command. At a first step Q1 of FIG. 13, controller 50 compares the risk potential RP calculated by the risk potential calculating process with a predetermined threshold RP0' to determine whether risk potential RP is higher than threshold RP0'. When risk potential RP is higher than threshold RP0', then controller 50 proceeds from Q1 to a step Q2, and calculates the information transmission control criterion parameter α0 at Q2, by using the relationship shown in FIG. 11. When risk potential RP is lower than or equal to threshold RP0', then controller 50 proceeds from Q1 to a step Q3, and sets the information transmission control criterion parameter α0 to one (α0=1) at Q3. After Q2 or Q3, controller 50 repeats the information transmission control process of FIG. 13 until an end command is inputted by the driver.

Therefore, by increasing the degree of restraint to cancel vibration from the road surface to a greater extent, the control system can cause the driver to recognize the operational reaction even if the operational reaction is controlled at a weak level in accordance with risk potential RP (as shown in FIG. 12). When, on the other hand, the risk potential RP is high, and hence the operational reaction is increased (as shown in FIG. 12), the control system can cause the driver to recognize the operational reaction while transmitting information on the road surface to the driver by decreasing the degree of restraint for cancelling vibration from the road.

The information transmission control system restrains or suppress a vehicle behavior of the vehicle 1A with a first control quantity when the risk potential is lower than or equal to a first threshold. When the risk potential is higher than the first threshold, the information transmission control system decreases the degree of restraint or suppression as the risk potential increases in the region above the first threshold. Thus, by restraining the vehicle behavior with the first control quantity when the operational reaction is small, the control system can cause the driver to recognize information in the form of the operational reaction even if the operational reaction is small. When the risk potential is high and hence the operational reaction is increased, then the control system can cause the driver to recognize the operational reaction while transmitting information from the outside by decreasing the degree of restraint for restraining the vehicle behavior.

Application Example 3

Figure 14:
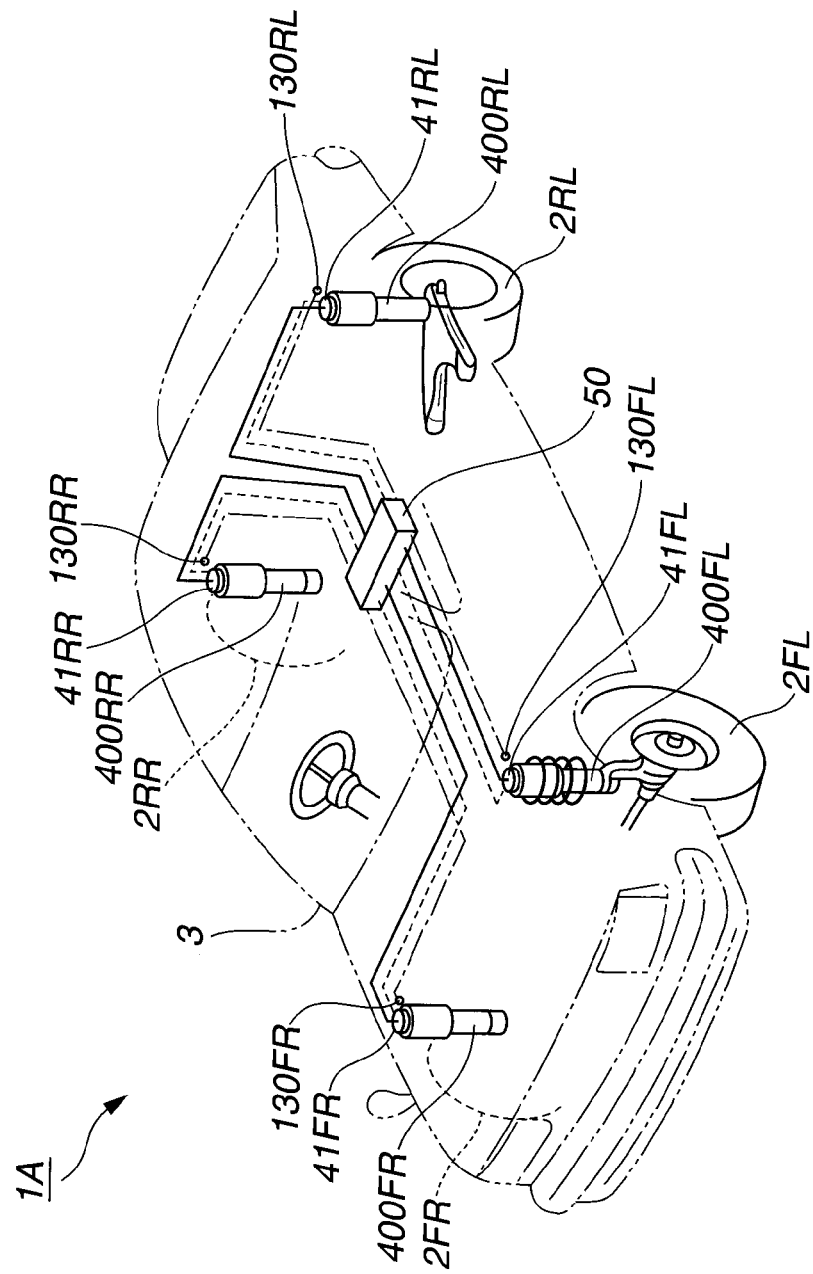
FIG. 14 is a schematic view showing a vehicle equipped with a damping force control system instead of the active suspension system.

FIG. 14 shows a vehicle 1A equipped with a suspension system 400(FL~RR) which can be employed instead of the active suspension system 4(FL~RR) shown FIG. 1. The suspension system shown in FIG. 14 includes a damping force controlling device capable of varying a damping force. More specifically, the suspension system of FIG. 14 includes variable damping force shock absorbers 400FL, 400FR, 400RL and 400RR, respectively, for the four wheels 2FL~2RR. Step motors 41FL~41RR are arranged to vary the damping forces of shock absorbers 400FL~400RR, respectively, under the control of controller 50.

Figure 15:
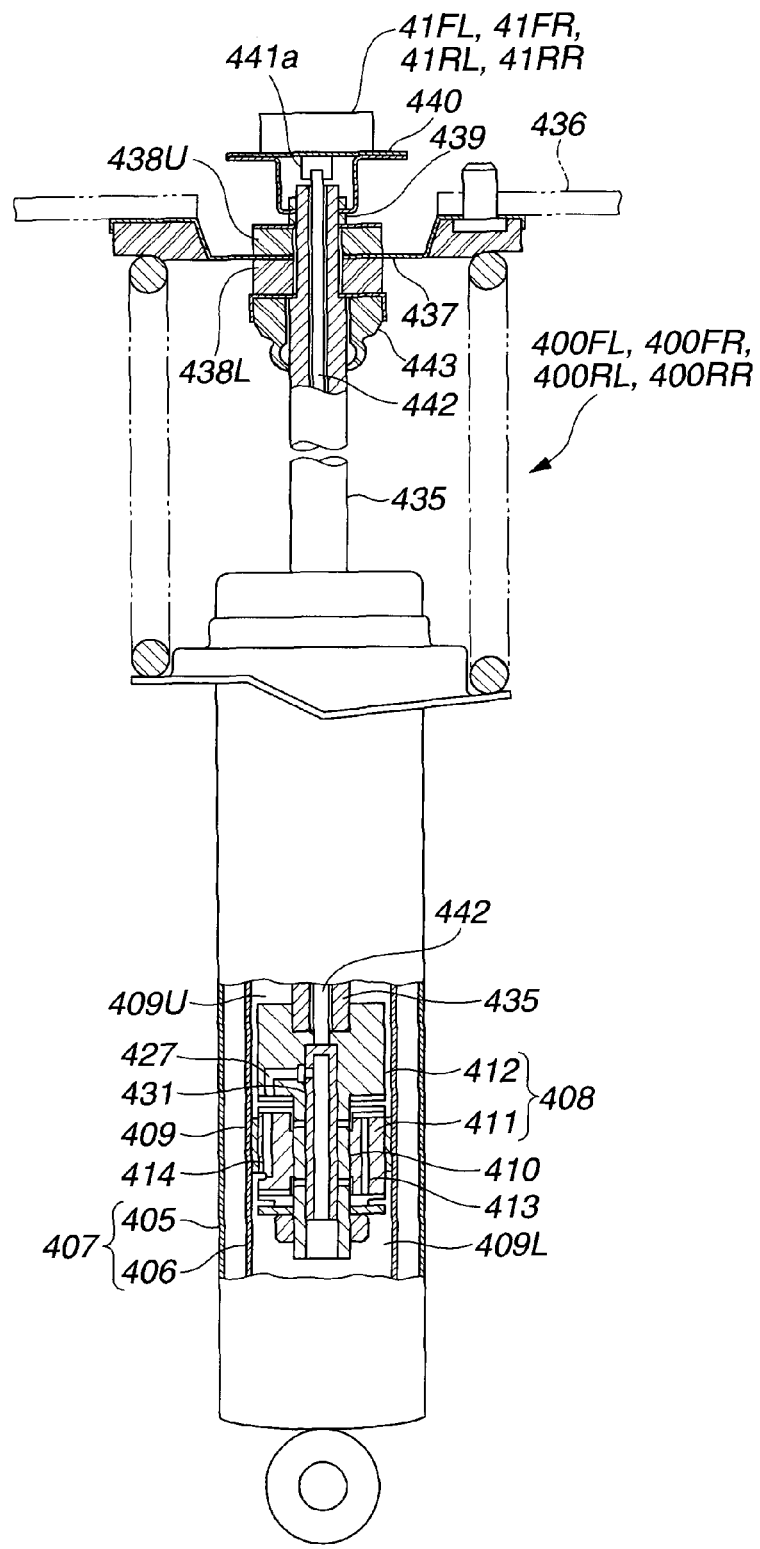
FIG. 15 is a front view partly in section showing, as an example, a damping force control device.

As shown in FIG. 15, each of the shock absorbers 400FL~400RR is a twin tube, gas sealed strut type shock absorber including a cylinder tube composed of an outer tube 405 and an inner tube 406, and a piston 408 which is slidably received in inner tube 406 and which divides the inside bore of inner tube 406 into upper and lower pressure chambers 409U and 409L. Piston 408 includes an outer circumference molded with a seal member 409 for sliding on the inside surface of inner tube 6, and lower and upper half members 411 and 412. Lower half member 411 is a cylindrical member having a center hole 410. Upper half member 412 is fit in lower half member 412. FIG. 15 further shows an extension side fluid passage 413, a hole portion 414, a pressure side or compression side fluid passage 427, a valve member 431, a piston rod 435, a vehicle body member 436, a bracket 437, rubber bushes 438U and 438L, a nut 439, a bracket 440, a rotation shaft 441a, a connecting member 442, and a bumper rubber 443.

The damping force characteristic of each of the variable damping force shock absorber 400FL~400RR is determined by the opening area or size of an orifice formed between valve member 431 and piston 408. The rotational angle of the step motor 41FL~41RR is a control quantity for selecting and determining the fluid flow resistance determined by the flow restriction of the orifice, that is a damping coefficient, and the damping force at a position of the valve member is represented by a produce obtained by multiplying the damping coefficient by the piston speed. Although the control quantity in this application example is the damping coefficient, to be exact, the damping force is regarded as the control quantity hereinafter.

Figure 16:
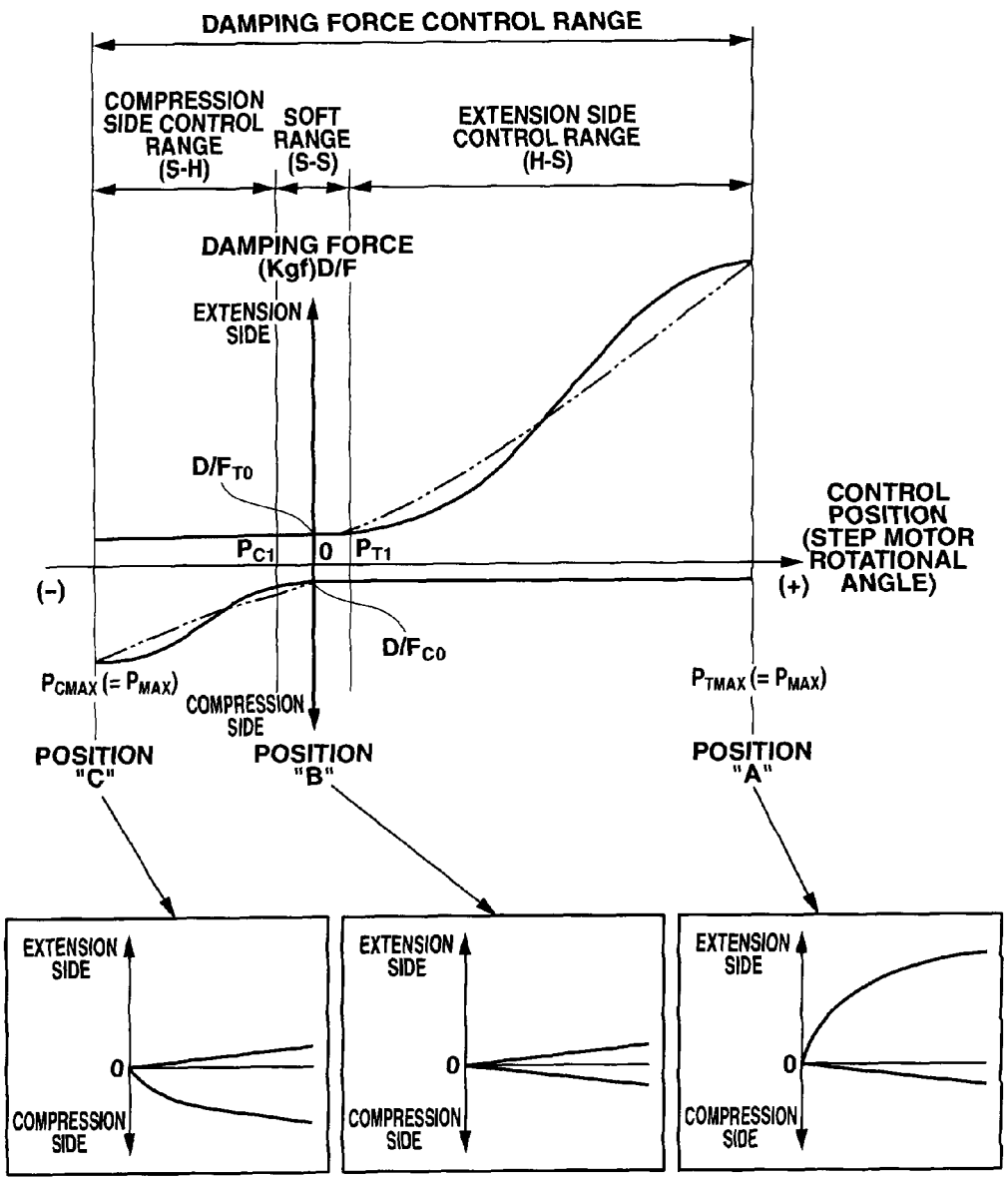
FIG. 16 is a view for illustrating a damping force characteristic with respect to the position of a valve element in a variable damping force shock absorber.

FIG. 16 is a view for illustrating a variation of a damping characteristic with respect to the position of the valve member of each of shock absorbers 400FL~400RR. The rotational angle of the step motor 41FL~41RR is considered as a position P. A position $P_{TMAX}$ shown in FIG. 16 is an extension side maximum position at which the damping force is maximum on the extension side, and a position $P_{CMAX}$ is a compression side maximum position at which the damping force is maximum on the compression side. In the example of FIG. 16, for the sake of convenience, the position P is set equal to "0" at the middle of a range in which the extension side damping force and the compression side damping force are both set low. The position change is positive in the direction increasing the extension side damping force, and the position change is negative in the direction increasing the compression side damping force. In this case, the extension side maximum position $P_{TMAX}$ is represented simply by $P_{MAX}$ without using a plus sign, and the compression side maximum position $P_{CMAX}$ is represented by $-P_{MAX}$ with a negative sign. However, the absolute values |Pmax| of $P_{MAX}$ and $-P_{MAX}$ are not necessarily equal to each other.

The range from the negative compression side maximum position $(-P_{MAX})$ to the positive extension side maximum position $(P_{MAX})$ is an entire damping force control range. This entire damping force control range includes a soft range (also called S-S range), an extension side control range (or H-S range) and a compression side control range (or S-H range). The soft (S-S) range is a range which extends from a positive threshold $P_{T1}$, across the point of "0", to a negative threshold $P_{C1}$, and which is used to achieve a smoothness for a low vehicle speed running state by providing a small extension side damping force $D/F_{TO}$ and a small compression side damping force $D/F_{CO}$. The extension side control (H-S) range extends on the positive side of the soft range, from positive threshold $P_{T1}$ to the positive extension side maximum position $P_{MAX}$, and has a function to provide a greater extension side damping force. The compression side control (S-H) range extends on the negative side of the soft range, from negative threshold $P_{C1}$ to the negative compression side maximum position $(-P_{MAX})$, and has a function to provide a greater compression side damping force.

FIG. 16 further shows a two-dot chain line connecting the position P of "0" and the extension side maximum position $P_{MAX}$ and a two-dot chain line connecting the position P of "0" and the compression side maximum position $(-P_{MAX})$ which are explained later. According to the damping force characteristic (damping coefficient characteristic) of FIG. 16, as to predetermined position values achieving predetermined extension side damping coefficient and predetermined compression side damping coefficient having equal or equivalent absolute values, the absolute value of the predetermined extension side position value is slightly smaller than the absolute value of the predetermined compression side position value.

Figure 17:
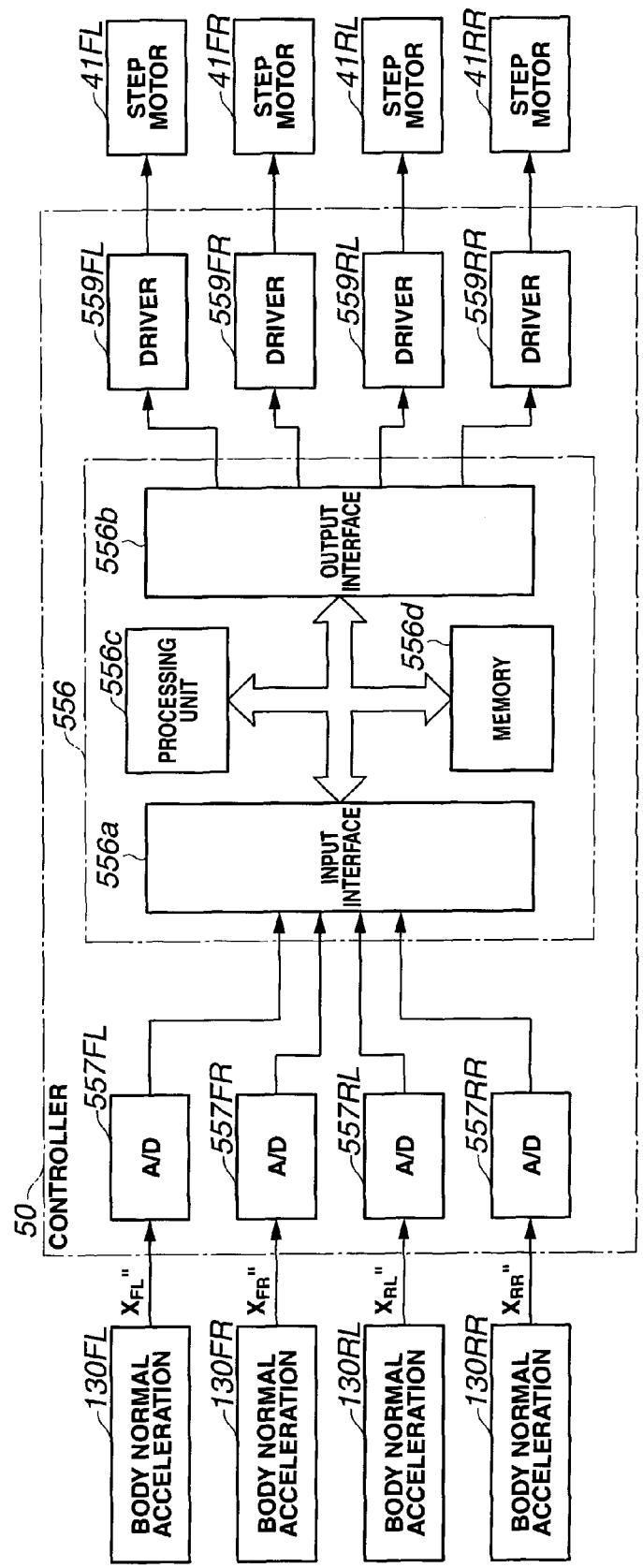
FIG. 17 is a block diagram showing an example of the functional arrangement of the controller 50.

FIG. 17 is a block diagram showing, as an example, a functional structure of controller 50. As shown in FIG. 17, controller 50 is connected, on the input side, with vehicle body normal acceleration sensors 130FL, 130FR, 130RL and 130RR which are provided on the vehicle body's side, respectively at the positions of wheels 2FL~2RR, and which are arranged to produce sensed normal accelerations (also called sprung normal accelerations) $X_{FL}"\sim X_{RR}"$ each in the form of an analog voltage which is positive in the upward direction and negative in the downward direction in accordance with the actual normal (or vertical) acceleration. On the output side, controller 50 is connected with step motors 41FL~41RR for controlling the damping forces of the variable damping force shock absorbers 400FL~400RR.

In the example of FIG. 17, controller 50 includes: a microcomputer 556 having at least an input interface circuit 556a, an output interface circuit 556b, a processing unit 556c and a memory device 556d; A/D converters 557FL~557RR which convert the sensed sprung normal accelerations $X_{FL}"\sim X_{RR}"$ of vehicle body normal acceleration sensors 130FL~130RR into the digital form, respectively, and supply the thus-obtained digital signals to input interface circuit 556a; and motor drive circuits 559FL~559RR which receive step control signals for the step motors 41FL~41RR, from the output interface circuit 556b, which convert the inputted step control signals into the form of a step pulse signal, and thereby drive the step motors 41FL~41RR, respectively.

The processing unit 556c of microcomputer 56 calculates a vehicle body normal velocity (or sprung normal velocity) Xi' by integrating the vehicle body normal acceleration Xi" inputted from each vehicle body normal acceleration sensor 130i (i=FL~RR); further calculates, from the sprung velocity Xi', an upper limit XUi' of a sprung behavior proportional range; and further calculates a control dead-band threshold Xi0' from the upper limit XUi'. Then, processing unit 556c calculates a control position proportional coefficient Ri in accordance with the sprung normal velocity Xi', sprung behavior proportional range upper limit XUi' and control dead-band threshold Xi0'; further calculates a modification proportional coefficient Fri by modifying the control position proportional coefficient Ri by using a modification function;

further calculates a target control position PTi in accordance with the modification proportional coefficient Fri and the base control maximum position PMAX; and performs a limiting operation for limiting the calculated target control position PTi with a maximum value of PTi.

Processing unit 556c calculates a step quantity Si from the target control position PTi obtained by the limiting operation, and controls the step motor 41i by delivering the step quantity Si to motor drive circuit 559i. Moreover, in the case of a zero crossing of the target control position PTi, that is a transition of PTi from one of the extension and compression sides to the other in FIG. 16, the processing unit 556c holds the target control position PTi at the "0" position until the expiration of a predetermined time interval Tα from the time point of the zero crossing.

Memory device 556d stores programs, control maps and other information required for the control processes of processing unit 556c, and further stores data and calculation results during execution of the control processes. With the thus-constructed damping force control device, the control system of the application example 3 can perform the restraint control of restraining vibrations from the road as in the practical example of the first embodiment. In this application example, variable damping force shock absorber 400FL~RR can serve as a variable damping force suspension. The control system of the application example 3 can provide the operational reaction in accordance with the risk potential in the state in which a vehicle behavior is restrained in accordance with the risk potential. Therefore, the control system can communicate information helpful for the driving support, to the driver effectively.

Application Example 4

Figure 18:
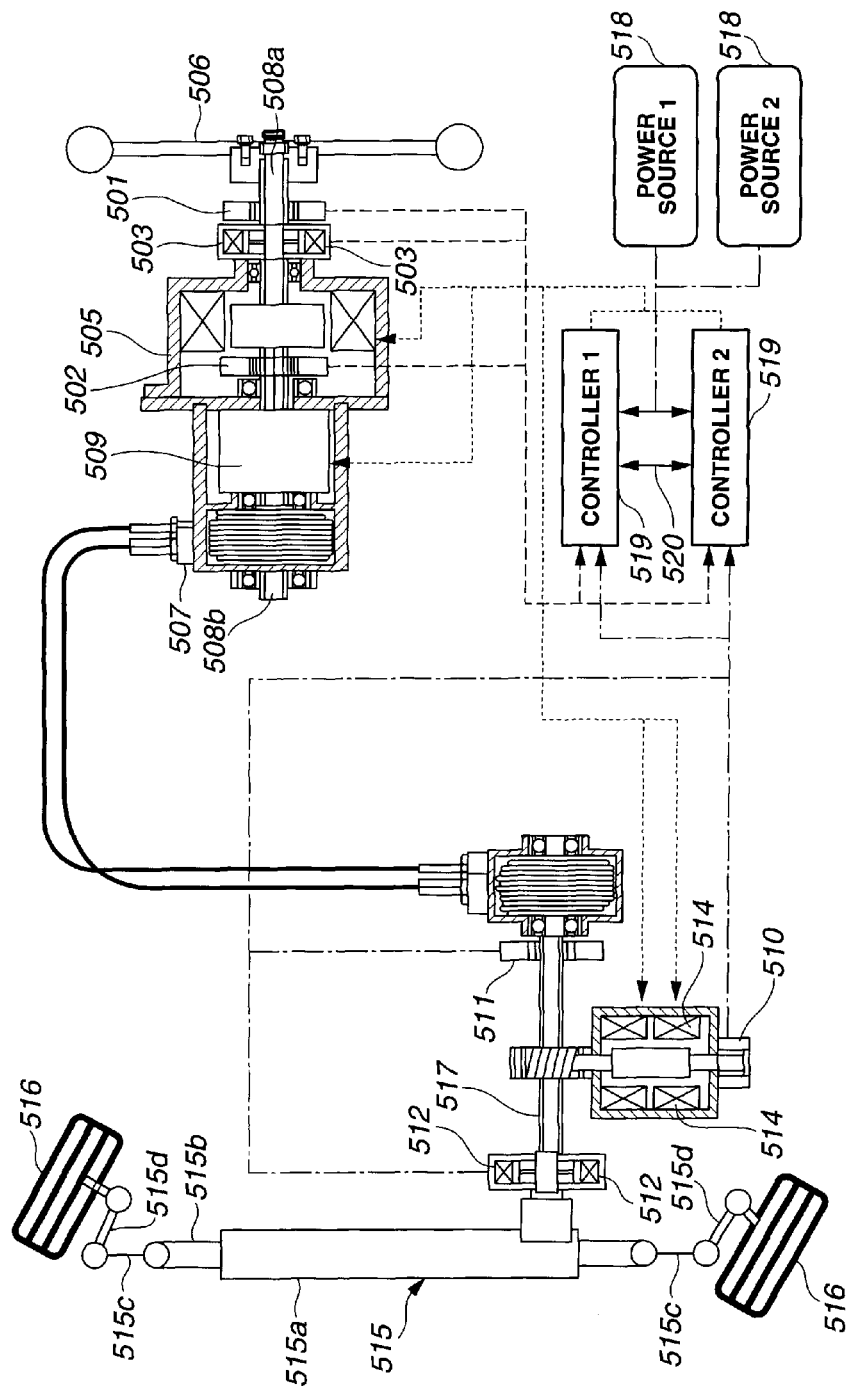
FIG. 18 is a schematic view showing a vehicle 1A in an application example 4.

FIG. 18 shows the vehicle 1A of this application example 4 which is equipped with a steer-by-wire system instead of the mechanical steering linkage. The steer-by-wire steering system employs an actuator for steering the steerable wheels 4FL and 4FR in accordance with a driver's steering operation inputted to the steering wheel 5 which is not linked mechanically with the wheels 4FL and 4FR. The vehicle steering system of the steer-by-wire type shown in FIG. 18 includes a steering input section, a backup device, a steering actuating section and a steering controlling section.

The steering input section includes a steering angle sensor 501, an encoder 502, at least one torque sensor 503 (or 503, 503), and a reaction motor 505. Steering angle sensor 501 is a device for sensing the steering wheel angle of steering wheel 506. Steering angle sensor 501 is provided on a column shaft 508a connecting steering wheel 506 and a cable column 507. Steering angle sensor 501 is disposed between steering wheel 506 and torque sensor 503, and thereby arranged to sense the steering angle without being influenced by an angular change due to torsion of torque sensor 503. It is possible to use an absolute type resolver for the steering angle sensor 501.

Torque sensor 503 of this example is a dual type sensor, and disposed between steering angle sensor 501 and reaction motor 505. Torque sensor 503 includes a torsion bar extending in an axial direction, a first shaft which is connected with a first end of the torsion bar and arranged coaxially with the torsion bar, a second shaft which is connected with a second end of the torsion bar and arranged coaxially with the torsion bar and the first shaft. The toque sensor 503 further includes a first magnetic member fixed to the first shaft, a second magnetic member fixed to the second shaft, a coil confronting the first and second magnetic members, and a third magnetic member surrounding the coil and forming a magnetic circuit together with the first and second magnetic members. The coil is arranged to vary an inductance in accordance with a relative movement between the first and second magnetic members caused by torsion of the torsion bar. The torque sensor produces a torque sensor output signal representing a sensed torque, in accordance with the inductance.

The reaction motor 505 is a reaction actuator for imparting a reaction to steering wheel 506. Reaction motor 505 of this example is an electric motor having one rotor and one stator and using the column shaft 508a as a rotating shaft. A casing of reaction motor 505 is fixed to the vehicle body. Reaction motor 505 of this example is a brushless motor, and accordingly, the encoder 502 and a hall IC (not shown) are added. In this case, it is possible to drive the motor producing a motor torque by using only the hall IC. However, a minute torque fluctuation is produced and the feeling of steering reaction becomes poorer. Therefore, in order to provide more delicate and smooth reaction control performance, this steering system reduces the minute torque fluctuation and improves the feeling of steering reaction by employing encoder 502 mounted on column shaft 508a, and arranged to be used for the motor control. It is optional to employ a resolver instead of encoder 502.

The backup device includes cable column 507 and a clutch 509. Clutch 509 of this example is an electromagnetic clutch connected between column shaft 508a and a pulley shaft 508b. When engaged, the clutch 509 connects the column shaft 508a serving as an input shaft and the pulley shaft 508b serving as an output shaft, and transmits a steering torque applied to steering wheel 506, mechanically to the steering mechanism 515.

The cable column 507 is a mechanical backup arrangement for performing the function of a column shaft to transmit torque in a detouring path to avoid interference with other components located between the steering input section and the steering actuating section in the case of a backup mode in which clutch 509 is engaged. The cable column 507 includes two reels and two inner cables which include ends fixed to the reels and which are wound on the reels in the mutually opposite directions. The two inner cables are enclosed in an outer tube having two ends which are fixed to two reel case.

The steering actuating section includes an encoder 510, a steer angle sensor 511, at least one torque sensor 512 (or 512, 512), at least one steering motor 514 (or 514, 514), steering mechanism 515, and steerable wheels 516 and 516. The steer angle sensor 511 and torque sensor 512 are mounted on a pinion shaft 517 extending from a first end to which one of the pulleys of cable column 507, to a second end formed with a pinion gear. As steer angle sensor 511, it is possible to use an absolute type resolver for sensing a rotational speed of a shaft. As the torque sensor 512, it is possible to employ the dual system arranged to sense torque in the form of inductance variation, as in torque sensor 503. Steer angle sensor 511 is disposed near cable column 507, and torque sensor 512 is disposed near steering mechanism 511, so as to avoid undesired influence from being exerted from an angular change due to a torsion of torque sensor 512 on the sensed steer angle of steer angle sensor 511.

The steering motor 514 (or 514, 514) includes a motor shaft provided with a pinion gear which is engaged with a worm gear provided on pinion shaft 517 at a position axially between the steer angle sensor 511 and torque sensor 512, so that a steering torque is transmitted from steering motor 514 to pinion shaft 517. Steering motor 514 of this example is a dual system brushless motor including a one rotor, two stator structure forming a first steering motor 514 and a second steering motor 514. Like the reaction motor 505, an encoder 510 and a hall IC (not shown) are added for steering motor 514 of the brushless type.

The steering mechanism 515 is arranged to steer the left and right wheels 516 in accordance with rotation of pinion shaft 517. Steering mechanism 515 includes a rack shaft 515b which is received in a rack tube 515a and which is formed with a rack gear engaged with the pinion gear of pinion shaft 517, left and right tie rods 515c, 515c connected, respectively with the left and right ends of laterally extending rack shaft 515b, and left and right knuckle arms 515d, 515d each extending from a first end connected with the mating tie rod 515c, to a second end connected with the mating wheel 516.

The steering controller 519 of this example is a dual type control unit including two controllers 519, 519 operated by the supply of power from two power sources 518, 518. The steering controller 519 receives sensed values from steering angle sensor 501, encoder 502, torque sensor 503, 503, and hall IC of the steering input section, from encoder 510, steer angle sensor 511, torque sensor 512, 512 and hall IC of the steering actuating section and from vehicle speed sensor 520. In accordance with input information supplied from these sensors, the steering controller 519 determines control quantities for reaction motor 505 and steering motor 514, and controls the motors 505 and 514. Furthermore, the steering controller 519 disengages the clutch 509 while the system is operation properly, and engages clutch 509 to make a mechanical connection between steering wheel 506 and the road wheels 516 on the occurrence of an abnormal condition in the system.

Steering controller 519 determines a control quantity Th of reaction motor 505 according to a following equation (6).

$$Th = Kp \times \theta + Kd \times d\theta/dt + Kdd \times d^2\theta/dt^2 + Dd \times Kf \times F \quad (6)$$

In this equation, θ is the steering angle, Kp is a steering angle gain, Kd is a steering angular speed gain, Kdd is a steering angular acceleration gain, Dd is a road surface reaction coefficient, Kf is a road surface reaction gain, and F is a road reaction (that is a reaction force). In equation (6), the first, second and third terms of the right side determine a control quantity of the steering reaction based on steering angle θ, and the fourth term of the right side determines a control quantity based on the road surface reaction F. Therefore, influence of a force applied to a tire from the road surface is reflected in the steering reaction torque. The steering angular acceleration $d^2\theta/dt^2$, and steering angular speed $d\theta/dt$ are calculated from the sensed variable of steering angle sensor 501.

Figure 19:
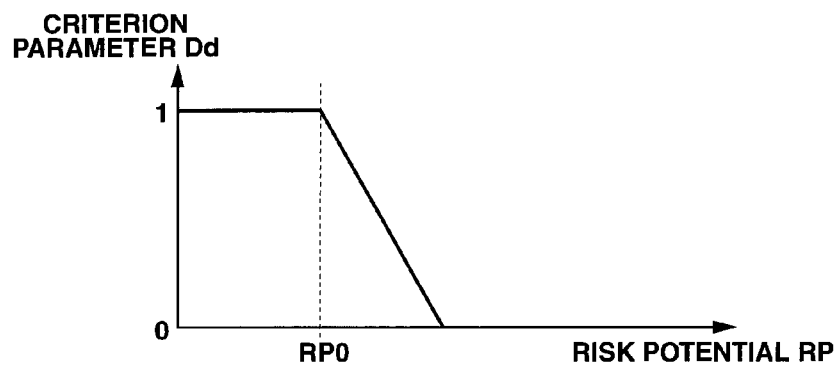
FIG. 19 is a graphic view showing a characteristic between the risk potential RP and a parameter Dd.

In motor vehicle 1A equipped with the thus-constructed steer-by-wire steering system, the control system performs the control of the steering reaction and the steer angle in the normal driving operation, and further performs the control according to the first practical example of the first embodiment. That is, instead of the information transmission control criterion parameter α0, the control system of this application example varies the parameter Dd appearing in equation (6) in accordance with risk potential RP, according to a relationship shown in FIG. 19, for example. FIG. 19 shows the relationship between parameter Dd and risk potential RP, in which parameter Dd decreases monotonically with increase of risk potential as in the relationship of FIG. 11. Thus, the control system of this application example varies the degree of restraint for restraining the transmission of vibration from the road surface, by varying parameter Dd according to the relationship of FIG. 19. Simultaneously with this control in the vehicle vertical direction, the control system further performs the operational reaction control in the vehicle longitudinal direction and vehicle lateral direction in accordance with risk potential RP. Therefore, the control system can reduce noise in the vehicle vertical direction in accordance with the obstacle condition in the surrounding of the vehicle, and at the same time transmit information of the obstacle as to the vehicle longitudinal and lateral directions.

Application Example 5

Figure 20:
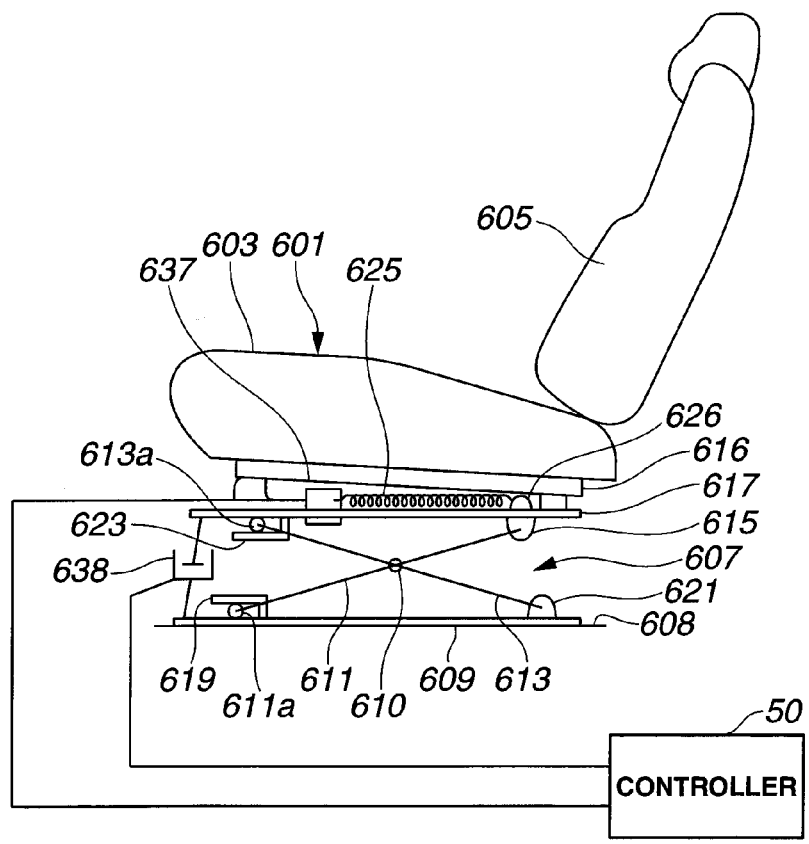
FIG. 20 is a schematic view showing a suspension seat 601.
Figure 21A:
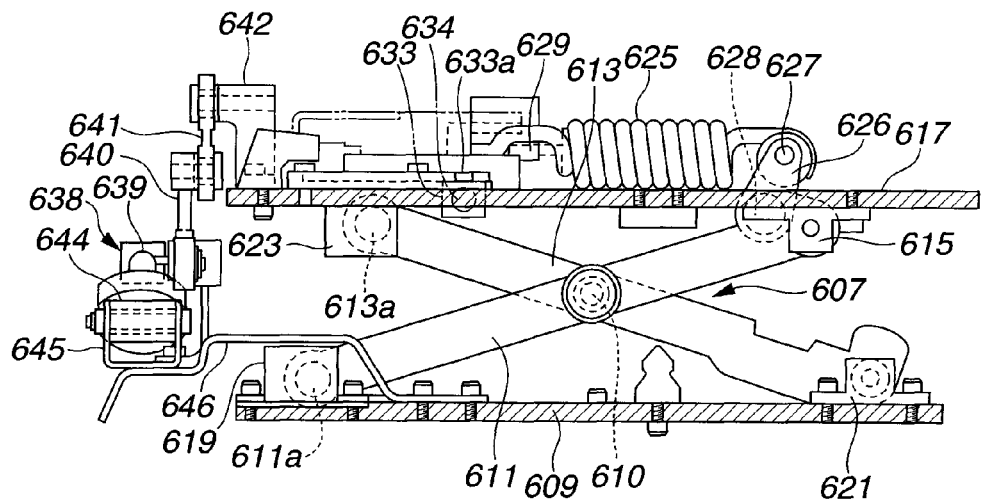
FIG. 21A is an enlarged side view showing a support structure of the seat.
Figure 21B:
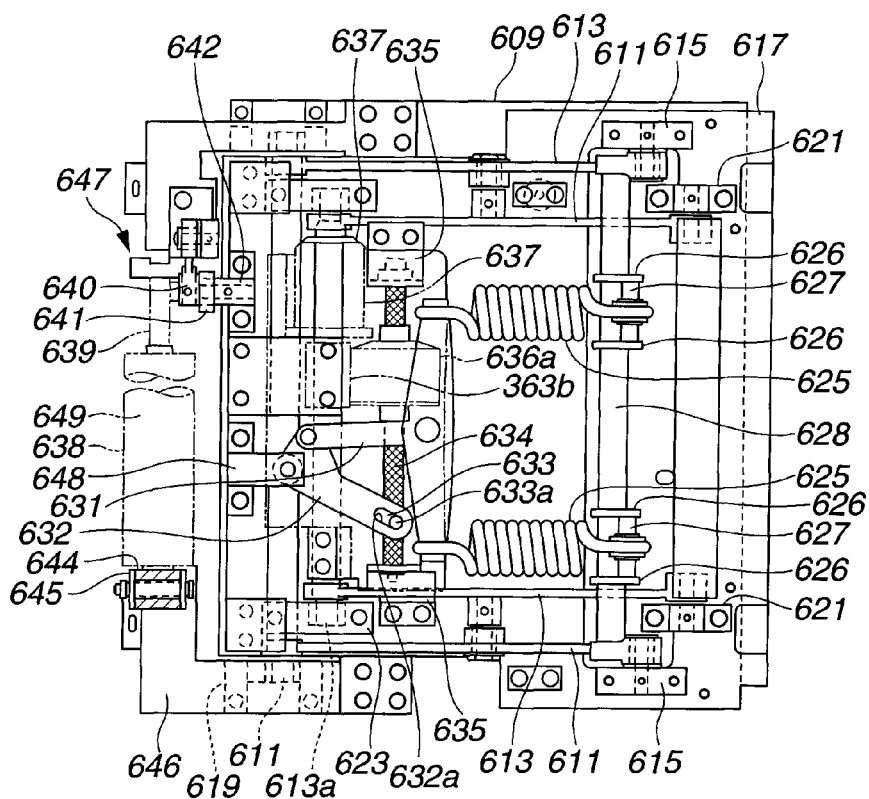
FIG. 21B is a plan view of the support structure of the seat.

FIG. 20 and FIGS. 21A and 21B show a suspension seat 601 employed in an application example 5 in which an active vibration restraining mechanism is disposed between a driver's seat and a vehicle body, for varying the degree of restraint for restraining vibration from the road surface in accordance with the risk potential. FIG. 20 is a schematic view of the suspension seat. FIG. 21A is an enlarged side view of the seat support structure, and FIG. 21B is a plan view of the seat support structure.

Suspension seat 601 includes a seat cushion 603 and a reclining type seat back 605. Suspension seat 601 is supported on a vehicle body floor 608 through a lifter link mechanism 607 for moving suspension seat 601 up and down. This lifter link mechanism 607 includes a left linkage and right linkage spaced from each other in the vehicle lateral direction. Each of the left and right linkages includes a first lever 611 and a second lever 612 which are connected by a pin 610 so as to form an X-shaped arrangement.

First lever 611 extends longitudinally from a rear end connected rotatably through a first support member 615 with seat 601, to a front end connected through a second support member 619 with a mounting plate 609 fixed to floor 608 of the vehicle body. First support member 615 is fixed to a base plate 617 which is fixed to a seat cushion frame 616 of the seat 601. Second support member 619 is constructed to support a roller 611a provided at the front end of first lever 611 so as to allow movement of the roller 611a in the longitudinal (front and rear) direction of the seat 601. Second lever 613 extends longitudinally from a rear end connected rotatably, through a third support member 621 fixed to the mounting plate 609, with mounting plate 609, to a front end connected, through a roller 613a and a fourth support member 623, with the base plate 617 of seat 601. Fourth support member 623 is constructed to support the roller 613a provided at the front end of second lever 613 so as to allow movement of the roller 613a in the longitudinal (front and rear) direction of the seat 601.

Each of springs 625 is a resilient member disposed between seat 601 and floor 608 and arranged to act against a downward load applied onto seat 601. Each spring 625 is a coil spring extending substantially in a horizontal direction on base plate 617. A rear end of spring 625 is attached to a pin 627 supported by a first bracket 626 at the rear end of first lever 611. First bracket 626 is fixed to a cross rod 628 which extends laterally between the rear ends of the left and right first levers 611 and which is fixed at a position eccentric to the rotation axis of the first levers 611. The front ends of springs 625 are connected with both ends of a dual-arm lever 629, respectively. A first connecting link 631 includes a rear end pivotally connected with the middle of dual-arm lever 629, and a front end pivotally connected with a first end of a second connecting link 632. A middle portion of the second connecting link 632 is pivotally supported by a fixed link 648 fixed to the base plate 617. A second end of second connecting link 632 is formed with an elongate hole 632a in which a pin 633a of a movable member 633 is fit. The movable member 633 is screwed on a bidirectional screw member 634 extending in the widthwise direction of seat 601. The bidirectional screw member 634 is supported at both ends by left and right bearings 635 fixed on base plate 617. A middle portion of bidirectional screw member 634 is connected, through speed reducers 636a, 636b, with a drive motor 637 fixed to base plate 617. Drive motor 637 is driven in response to a drive command signal produced by controller 50 to command adjustment of the up and down position of the seat.

A variable damping force shock absorber 638 is disposed between suspension seat 601 and vehicle body floor 608, and arranged to damp vibration of suspension seat 601. This shock absorber 638 is arranged in the widthwise direction of seat 601, at a front portion of seat 601. Shock absorber 638 includes a piston rod 639 connected with seat 601 and a strut tube 649 connected with floor 608. Piston rod 639 is supported rotatably by a first rotational link 640 which is connected rotatably with a second rotational link 641. Second rotational link 641 is rotationally supported by an upright bracket 642 standing from a front end portion of base plate 617 of seat 601. Strut tube 649 is supported rotatably, through a connecting boss 644 fixed to an end of strut tube 649, by a third bracket 645 fixed to mounting plate 609 of floor 608 through a mounting member 646 fixed to mounting plate 609 by screw fasteners.

This shock absorber 638 is constructed to vary the damping force with a driving device 647. Controller 50 can control the damping force of shock absorber 638 by varying the drive command supplied to driving device 647 in accordance with risk potential RP. For example, controller 50 controls the damping force of shock absorber 638 with driving device 647 so as to increase the proportion for reducing vibration from the road surface when risk potential RP increases beyond threshold RP0 as shown in FIG. 7. The proportion to reduce vibration from the road surface is saturated at a predetermined upper limit when risk potential further increases, as in FIG. 7.

The thus-constructed control system can vary the degree of restraint for restraining the transmission of vibration to the driver in accordance with risk potential RP with the suspension seat 601 in the same manner as active suspension system 4i (FL~RR). In this application example, it is possible to consider that suspension seat 601 corresponds to a motion regulating section.

The control system of this application example can provide the same effects as in the practical example of the first embodiment. The control system can restrain vibration (or vibration in the vertical direction) inputted to the driver in accordance with the risk potential, and controls the operational reaction perceptible by the driver in accordance with the risk potential. Therefore, the control system can transmit information properly to the driver, in the form of operational reaction variation in the restrained state suppressing vibration.

Second Embodiment

In a second embodiment of the present invention, the information transmission control criterion parameter α0 is modified in accordance with the stability of the vehicle. The second embodiment is different from the first embodiment only in the information transmission control, so that the following explanation is directed only to the information transmission control.

Practical Example

Figure 22:
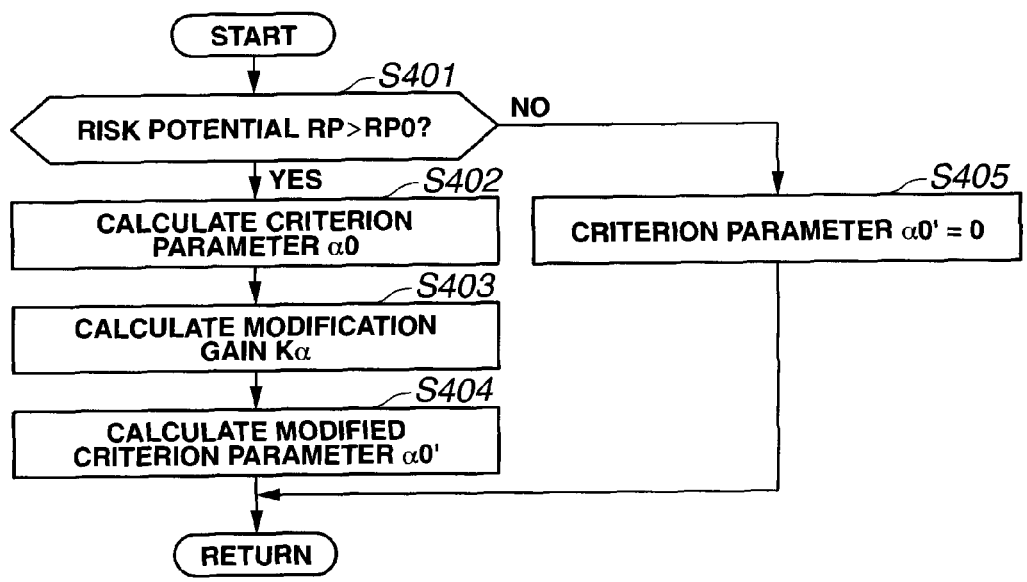
FIG. 22 is a flowchart showing an information transmission control process according to a second embodiment.

FIG. 22 is a flowchart showing the information transmission control in a practical example of the second embodiment. Controller 50 starts the information transmission control in response to a start command inputted by the driver.

At a first step S401 of FIG. 22, controller 50 compares the risk potential RP calculated by the risk potential calculating process (of FIG. 5) with the predetermined threshold RP0 to determine whether risk potential RP is higher than threshold RP0. When risk potential RP is higher than threshold RP0, then controller 50 proceeds from S401 to a step S402, and calculates the information transmission control criterion parameter α0 at S402 in the same manner by using the relationship shown in FIG. 7 as in the practical example of the first embodiment.

Figure 23:
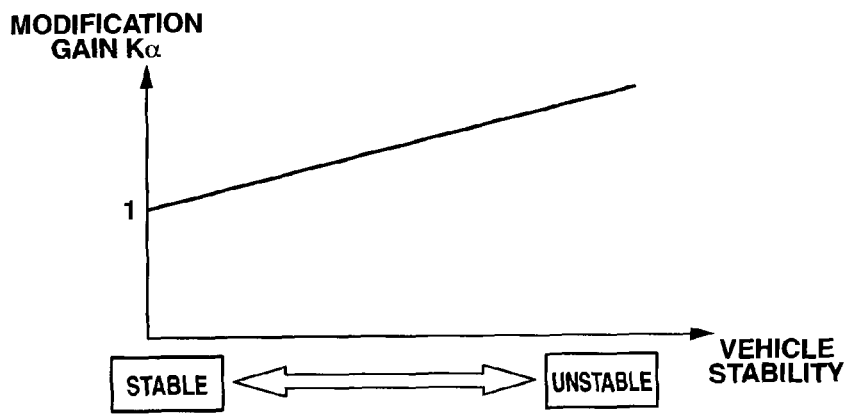
FIG. 23 is a graphic view showing a relationship between of a modification gain $K\alpha$ and a vehicle stability.
Figure 24A:
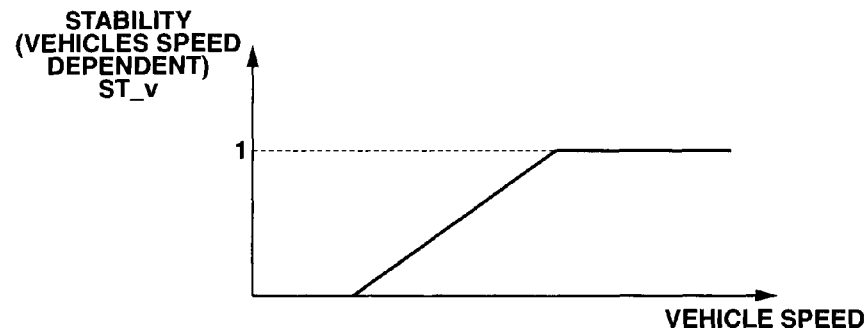
FIGS. 24A, 24B and 24C are graphic views showing vehicle stabilities dependent on various vehicle operating conditions.
Figure 24B:
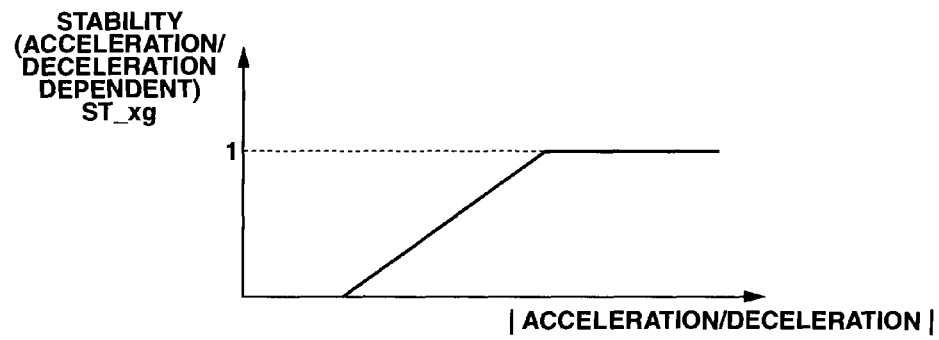
Figure 24C:
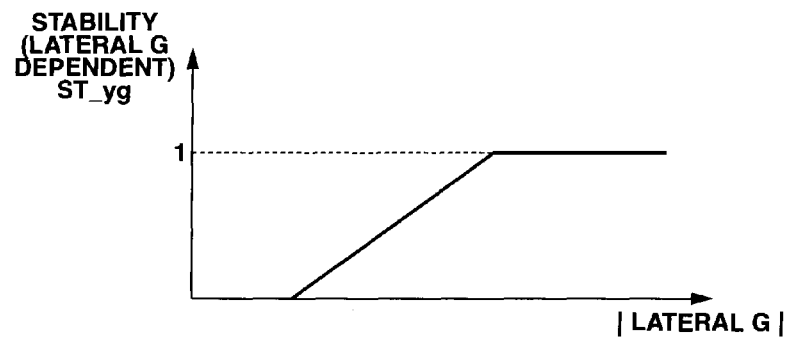

At a step S403, controller 50 calculates a modification gain Kα for modifying the criterion parameter α0, in accordance with the vehicle stability. FIG. 23 shows a relationship between the modification gain Kα and the vehicle stability. This characteristic of modification gain Kα is designed to increase the criterion parameter α0 as the vehicle stability becomes lower. In the example of FIG. 23, modification gain Kα increases monotonically (linearly in this example) with the vehicle stability becomes lower toward the unstable state. FIGS. 24A, 24B and 24C show relationships of the vehicle stability with respect to vehicle conditions. FIG. 24A shows a vehicle stability ST_v dependent on the vehicle speed. FIG. 24BB shows a vehicle stability ST_xg dependent on the vehicle longitudinal acceleration (acceleration/deceleration). FIG. 24C shows a vehicle stability ST_yg dependent on the vehicle lateral acceleration.

In each of FIGS. 24A, 24B and 24C, the vehicle stability ST_v, ST_xg or ST_yg increases from a minimum value to a maximum value with increase in the vehicle condition (vehicle speed, longitudinal acceleration or lateral acceleration) when the vehicle condition is higher than a predetermined first threshold of the condition. In this example, the vehicle stability increases monotonically from the minimum value equaling zero to the maximum value equaling one, for example in the form of a linear function. In this example, the vehicle stability is so defined that the vehicle is unstable when the vehicle stability is equal to the maximum value of one, and the vehicle is stable when the vehicle stability is equal to the minimum value of zero. Controller 50 determines the vehicle speed dependent vehicle stability (or instability) ST_v, the longitudinal acceleration dependent vehicle stability (or instability) ST_xg and the lateral acceleration dependent vehicle stability (or instability) ST_yg by using the relationships of FIGS. 24A, 24B and 24C, respectively, and further calculates a comprehensive vehicle stability (or instability) ST (=ST_v×ST_xg×ST_yg) by multiplying these stabilities ST_v, ST_xg and ST_yg.

At a step S404 following S403, controller 50 modifies the information transmission control criterion parameter α0 by using modification gain Kα. In this example, controller 50 determines a modified criterion parameter α0' by multiplying the criterion parameter α0 determined at S402, by modification gain Kα (α0'=Kα×α0). The thus-calculated parameter α0' is used as the new parameter for the information transmission control. If risk potential RP is lower than or equal to threshold RP0, controller 50 proceeds from S401 to a step S405, and sets the modified criterion parameter α0' equal to zero (α0'=0) at S405. After S404 or S405, controller 50 repeats the information transmission control process of FIG. 22 until an end command is inputted by the driver.

The information transmission control criterion parameter α0' calculated at S404 or S405 is used, by controller 50, as a parameter representing the degree of addition of an additional control to the normal suspension control of the active suspension system 4i (i=FR, FL, RR or RL) normally performed in motor vehicle 1A. In this example, controller 50 controls the active suspension system 4i to reduce vibrations transmitted from the road surface with a predetermined rate or ratio (in this example, the vibrations from the road surface are reduced by 70%) in the normal state in which the information transmission control is not performed.

By performing the information transmission control process, controller 50 varies the vibration reduction rate or ratio from the normal level of the normal state in which the information transmission control process is not performed, to an adjusted level corresponding to the adjusted or modified information transmission control criterion parameter α0', and controls the active suspension system 4i to achieve the adjusted or modified level. In this example, controller 50 increases the degree of cancelling the vibrations from the road surface as the information transmission control criterion parameter α0' becomes greater, and controls the suspension system 4i to transmit the vibrations from the road surface with less cancellation, to the driver as the information transmission control criterion parameter α0' becomes smaller.

Information transmission control criterion parameter α0 is set in the form of a monotone function tending to increase monotonically with increase of risk potential RP. Accordingly, the driving support system controls the suspension system 4i so as to cancel vibrations from the road surface more strongly with increase of risk potential RP. Moreover, in the second embodiment, the control system modifies the information transmission control criterion parameter α0 in accordance with a vehicle condition or parameter relating to the vehicle stability. More specifically, as in the practical example of the second embodiment, the control system modifies the criterion parameter α0 with a modification quantity such as the modification gain Kα determined in dependence on the vehicle stability. The control system increases the criterion parameter α0' as the vehicle stability becomes lower (to the unstable side). Therefore, in the situation requiring keen attention of the driver to an obstacle around the vehicle, the driving support system can cancel the vibrations from the road so that the degree of cancellation or restraint is increased when the vehicle becomes more unstable, and thereby makes it possible to communicate or transmit, to the driver, useful information for the driving support in various forms such as tactile, visual and audible forms effectively. In this example, useful information is communicated to the driver in the form of a reaction added to a driver's steering, accelerating or braking operation. Simultaneously with the control in the vehicle vertical direction performed in accordance with the modified criterion parameter α0' in this way, the control system performs the driving support control in the vehicle longitudinal direction and the driving support control in the vehicle lateral direction as in the practical example of the first embodiment.

In this way, the control system of vehicle 1A in the practical example of the second embodiment restrains the transmission of vibrations from the road to the driver in accordance with the risk potential so that the degree of restraint is increased with increase of the risk potential, and performs the support control to impart an operational reaction in the longitudinal direction and/or lateral direction. In this case, the control system increases the degree of restraint for restraining the transmission of disturbance such as vibrations from the road, to the driver as the vehicle stability becomes lower (to the unstable side), for example by increasing the modification gain Kα. Therefore, the control system can transmit information as to obstacles to the driver adequately in the state in which noises, such as noises in the vehicle vertical direction, are suppressed in dependence of the vehicle stability. According to one of possible interpretations of the second embodiment, at least one of vehicle speed sensor 30, vehicle condition sensing device 140 and controller 50 corresponds to a stability condition sensing section.

Application Example 1

In stead of the multiplication for calculating the (comprehensive) vehicle stability (or instability) ST (=ST_v×ST_xg×ST_yg), it is possible to determine the (comprehensive) vehicle stability (or instability) ST by using a sum of the vehicle speed, the magnitude of the longitudinal acceleration and the magnitude of the lateral acceleration. For example, controller 50 determines a weighted sum of the vehicle speed, longitudinal acceleration and lateral acceleration by using a weight Kv for the vehicle speed, a weight Kxg for the longitudinal acceleration (acceleration/deceleration), and a weight Kyg for the lateral acceleration, and calculates the (comprehensive) vehicle stability (instability) ST according to the following equation: ST=min(1, Kv×vehicle speed+Kxg×|longitudinal acceleration|+Kyg×|lateral G|). In this case, the control system can calculate the vehicle stability by taking account of influences of the vehicle speed, longitudinal acceleration and lateral acceleration adequately.

Third Embodiment

In a third embodiment of the present invention, the information transmission control criterion parameter α0 is modified in accordance with the stability of the vehicle, like the second embodiment. However, in the third embodiment, the information transmission control criterion parameter α0 is decreased as the stability of the vehicle becomes lower (to the unstable side) in the manner opposite to the second embodiment. The third embodiment is different from the first embodiment only in the information transmission control, so that the following explanation is directed only to the information transmission control.

Practical Example

Figure 25:
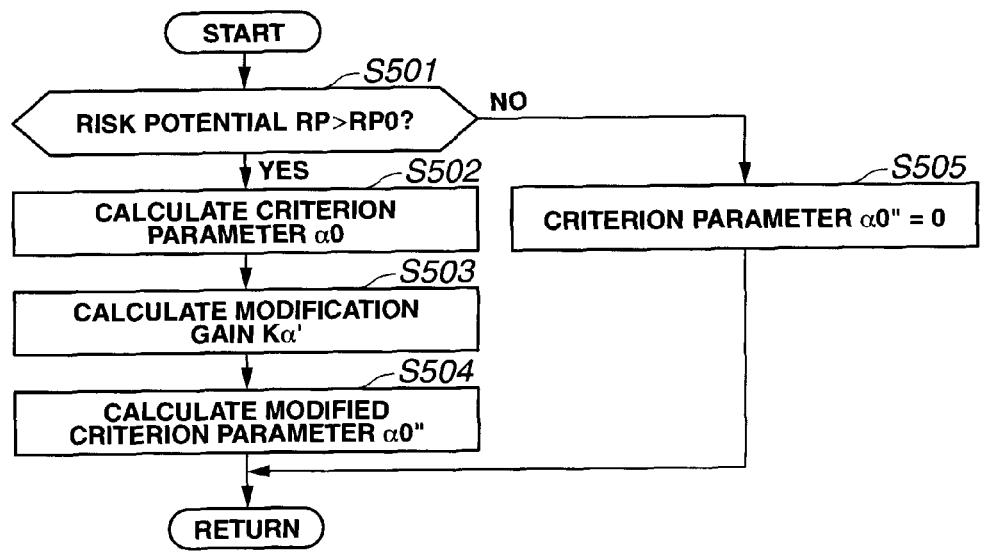
FIG. 25 is a flowchart showing an information transmission control process according to a third embodiment.

FIG. 25 is a flowchart showing the information transmission control in a practical example of the third embodiment. Controller 50 starts the information transmission control in response to a start command inputted by the driver.

At a first step S501 of FIG. 25, controller 50 compares the risk potential RP calculated by the risk potential calculating process (of FIG. 5) with the predetermined threshold RP0 to determine whether risk potential RP is higher than threshold RP0. When risk potential RP is higher than threshold RP0, then controller 50 proceeds from S501 to a step S502, and calculates the information transmission control criterion parameter α0 at S502 in the same manner by using the relationship shown in FIG. 7 as in the practical example of the first embodiment.

Figure 26:
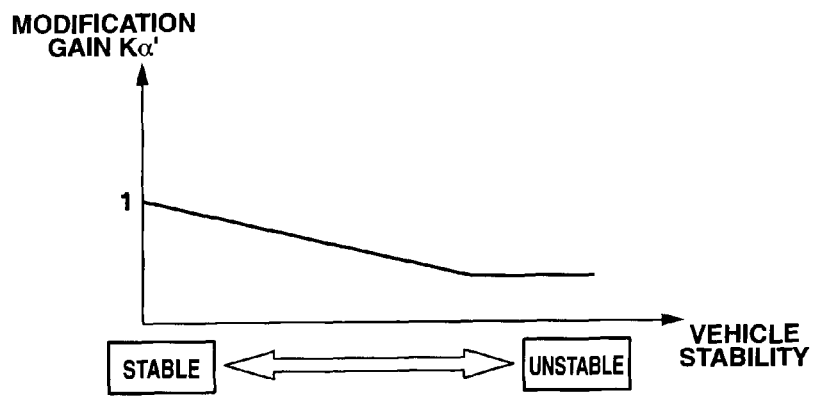
FIG. 26 is a graphic view showing a relationship between a modification gain $K\alpha'$ and the vehicle stability.

At a step S503 following S502, controller 50 calculates a modification gain Kα' for modifying the criterion parameter α0, in accordance with the vehicle stability, as in the practical example of the second embodiment. FIG. 26 shows a relationship between the modification gain Kα' and the vehicle stability. This characteristic of modification gain Kα' is designed to decrease the criterion parameter α0 as the vehicle stability becomes lower. In the example of FIG. 26, modification gain Kα' decreases monotonically (linearly in this example) with the vehicle stability becomes lower to the unstable side.

At a step S504 following S503, controller 50 modifies the information transmission control criterion parameter α0 by using modification gain Kα'. In this example, controller 50 determines a modified criterion parameter α0" by multiplying the criterion parameter α0 determined at S502, by modification gain Kα' (α0"=Kα'×α0). The thus-calculated parameter α0" is used as the new criterion parameter for the information transmission control. If risk potential RP is lower than or equal to threshold RP0, controller 50 proceeds from S501 to a step S505, and sets the modified criterion parameter α0" equal to zero (α0"=0) at S505. After S504 or S505, controller 50 repeats the information transmission control process of FIG. 25 until an end command is inputted by the driver.

The information transmission control criterion parameter α0" calculated at S504 or S505 is used, by controller 50, as a parameter representing the degree of addition of an additional control to the normal suspension control of the active suspension system 4i (i=FR, FL, RR or RL) normally performed in motor vehicle 1A. By performing the information transmission control process, controller 50 varies the vibration reduction rate or ratio from the normal level of the normal state in which the information transmission control process is not performed, to an adjusted or modified level corresponding to the adjusted or modified information transmission control criterion parameter α0", and controls the active suspension system 4i to achieve the adjusted or modified level. In this example, controller 50 increases the degree of cancelling the vibrations from the road surface as the information transmission control criterion parameter α0" becomes greater, and controls the suspension system 4i to transmit the vibrations from the road surface with less cancellation, to the driver as the information transmission control criterion parameter α0" becomes smaller.

Information transmission control criterion parameter α0 is set in the form of a monotone function tending to increase monotonically with increase of risk potential RP. Accordingly, the driving support system controls the suspension system 4i so as to cancel vibrations from the road surface more strongly with increase of risk potential RP. Moreover, in the third embodiment, the control system modifies the information transmission control criterion parameter α0 in accordance with a vehicle condition or parameter relating to the vehicle stability. More specifically, as in the practical example of the second embodiment, the control system modifies the criterion parameter α0 with a modification quantity such as the modification gain Kα' determined in dependence on the vehicle stability. The control system decreases the criterion parameter α0" by decreasing the modification gain Kα' as the vehicle stability becomes lower (to the unstable side). Therefore, in the situation requiring keen attention of the driver to an obstacle around the vehicle, the driving support system can cancel the vibrations from the road so that the degree of cancellation or restraint is increased when the vehicle becomes more stable, and thereby makes it possible to communicate or transmit, to the driver, useful information for the driving support in various forms such as tactile, visual and audible forms effectively. In this example, useful information is communicated to the driver in the form of a reaction added to a driver's steering, accelerating or braking operation. Simultaneously with the control in the vehicle vertical direction performed in accordance with the modified criterion parameter α0" in this way, the control system performs the driving support control in the vehicle longitudinal direction and the driving support control in the vehicle lateral direction as in the practical example of the first embodiment.

In this way, the control system of vehicle 1A in the practical example of the third embodiment restrains the transmission of vibrations from the road to the driver in accordance with the risk potential so that the degree of restraint is increased with increase of the risk potential, and performs the support control to impart an operational reaction in the longitudinal direction and/or lateral direction. In this case, the control system increases the degree of restraint for restraining the transmission of disturbance such as vibrations from the road, to the driver as the vehicle stability becomes higher, for example by increasing the modification gain Kα'. The information transmission control according to the third embodiment is effective especially when the driver has an ability to perform an adequate driving operation even if the stability of the vehicle becomes lower. The control system can transmit information adequately to a skilled driver when the vehicle is in an unstable state. The control system according to the third embodiment decreases the degree of restraint for restraining disturbing movement of the vehicle as the vehicle becomes more unstable. Therefore, the control system can transmit information on the road surface effectively to the drive when the risk potential is high.

Fourth Embodiment

Practical Example

FIGS. 27~52 are views for illustrating a motor vehicle equipped with a vehicle driving operation support system according to a fourth embodiment which is different in a control algorithm of controller 50 from the preceding embodiments. The vehicle is substantially identical in construction to the vehicle 1A shown in FIG. 1. Accordingly, the following explanation is directed to processes performed in controller 50 according to the fourth embodiment.

(Vehicle Condition Transmission Quantity Determination)

Figure 27:
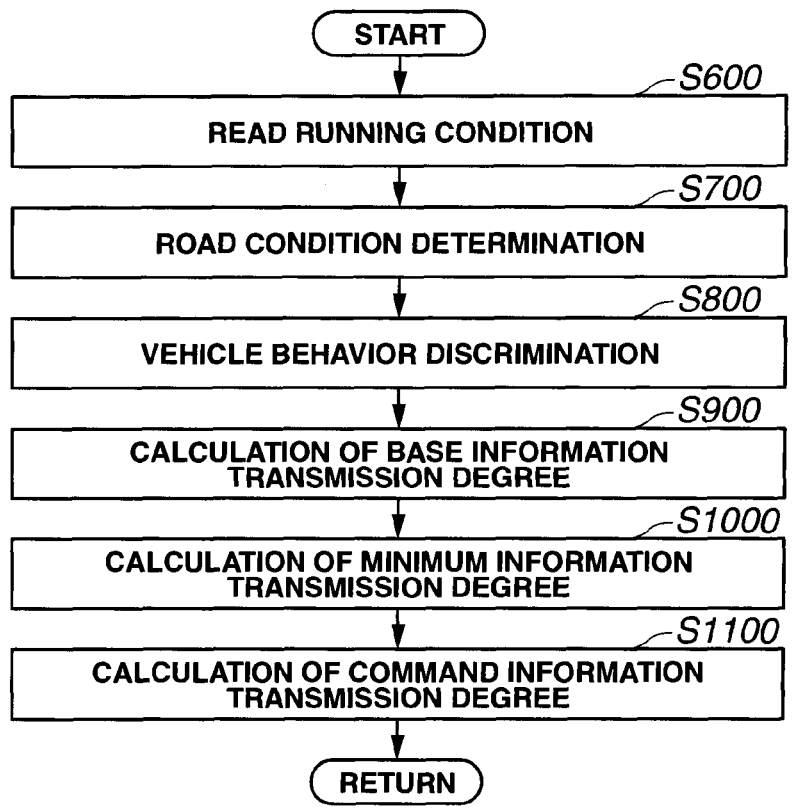
FIG. 27 is a flowchart showing a vehicle state transmission quantity determining process according to a fourth embodiment.

FIG. 27 is a flowchart showing a vehicle condition transmission quantity determining process performed by controller 50. Controller 50 starts this process in response to a driver's command to perform the process.

At a first step S600, controller 50 collects information on the vehicle running condition. In this example, the information collected at S600 includes the driver's operation quantity (such as the accelerator operation quantity, the braking operation quantity, and the steering wheel angle), sensor outputs (such as outputs of the vehicle speed sensor, the unsprung (non-suspended) acceleration sensors, the vehicle body vertical or normal acceleration sensors), information from a car navigation system, operating condition of a wiper system, the on/off condition of headlight or fog lamp, and the outside air temperature.

At a next step S700, controller 50 performs a road condition determining process to judge the road surface condition. In this example, controller 50 discriminates an inferior road (or bad road) by monitoring a variation of a predetermined monitored vehicle operating condition such as the output of the unsprung acceleration sensor, the strokes of active suspensions 4i (i=FR, FL, RR, RL) and/or the wheel speeds. For example, controller 50 judges that the vehicle is running on an inferior road when a frequency variation and/or an amplitude variation of the monitored condition is greater than a predetermined threshold.

At a step S800, controller 50 performs a vehicle behavior discrimination process for judging the vehicle behavior of the host vehicle 1A.

At a step S900, controller 50 performs a base information transmission quantity calculating process for calculating a base information transmission quantity or degree used as a base control value for transmitting information to the driver. In this example, at S900, controller 50 calculates a plurality of base information transmission quantities for longitudinal, lateral and vertical vehicle motions, and an operational reaction to driver's driving operation.

At a step S1000, controller 50 performs a minimum information transmission quantity calculating process for calculating a minimum information transmission quantity or degree used as a parameter representing a vehicle condition of the host vehicle in the information transmission to the driver.

At a step S1100, controller 50 performs a process for calculating a command information transmission quantity or degree representing the degree of transmitting information to the driver. In this example, at S1100, controller 50 calculates a plurality of command information transmission degrees for the longitudinal, lateral and vertical vehicle motions, and the operational reaction to driver's driving operation.

In accordance with the command information transmission degrees calculated at S1100, controller 50 controls the actuating section including the active suspension system 4i, the steering reaction control unit 60 etc., by delivering control commands based on the command information transmission degrees, to various portions of the actuating section. After S1100, the vehicle condition transmission quantity determining process of FIG. 27 is repeated until a command is inputted by the driver to terminate the execution.

(Vehicle Behavior Discriminating Process)

Figure 28:
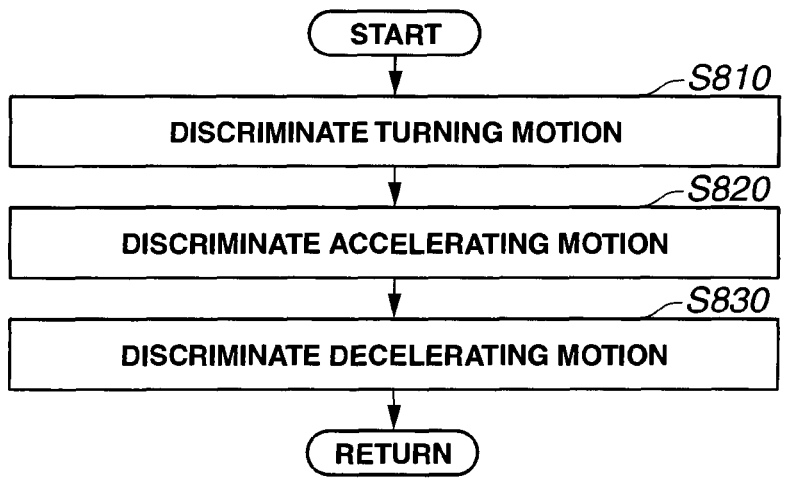
FIG. 28 is a flowchart showing a vehicle behavior discriminating process at a step S800 of FIG. 27.

FIG. 28 shows the vehicle behavior discriminating process performed at S800 by controller 50, in the form of a flowchart. In this process, controller 50 performs: a turning motion discriminating process at a step S810, an accelerating motion discriminating process at a step S820; and a decelerating motion discriminating process at a step S830. Thereafter, controller 50 returns to the vehicle condition transmission quantity determining process.

(Turning Motion Discriminating Process)

Figure 29:
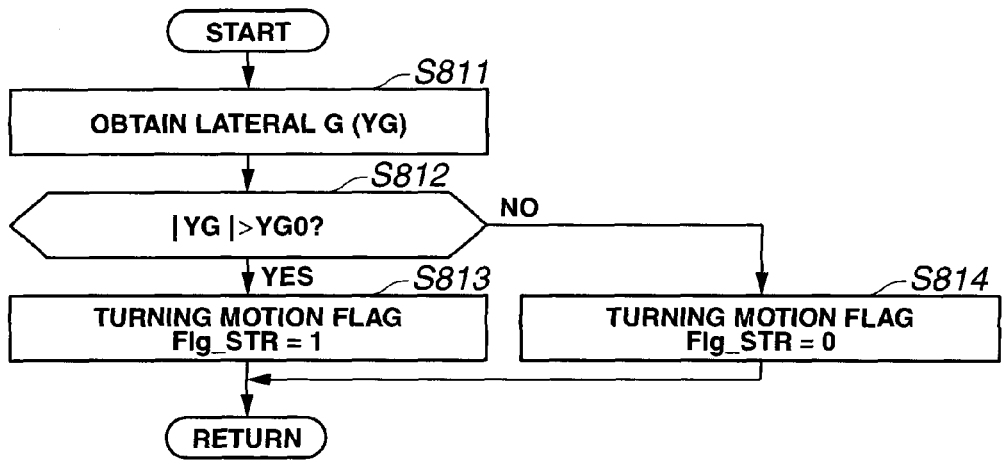
FIG. 29 is a flowchart showing a turning motion discriminating process at a step S810 of FIG. 28.

FIG. 29 is a flowchart showing the turning motion discriminating process of S810. In the process of FIG. 29, controller 50 obtains the lateral acceleration YG at a step S811, and examines whether the magnitude of lateral acceleration YG is higher than a predetermined threshold YG0, at a step S812. Then, controller 50 sets a turning motion flag Flg_STR for representing the period of a vehicle turning motion, to one (Flg_STR=1) at a step S813 when the magnitude of lateral acceleration YG is higher than threshold YG0 (|YG|>YG0), and controller 50 resets the turning motion flag Flg_STR to zero (Flg_STR=0) at a step S814 when the magnitude of lateral acceleration YG is lower than or equal to threshold YG0 (|YG|≦YG0). After S813 or S814, controller 50 returns to the vehicle behavior discriminating process.

(Accelerating Motion Discriminating Process)

Figure 30:
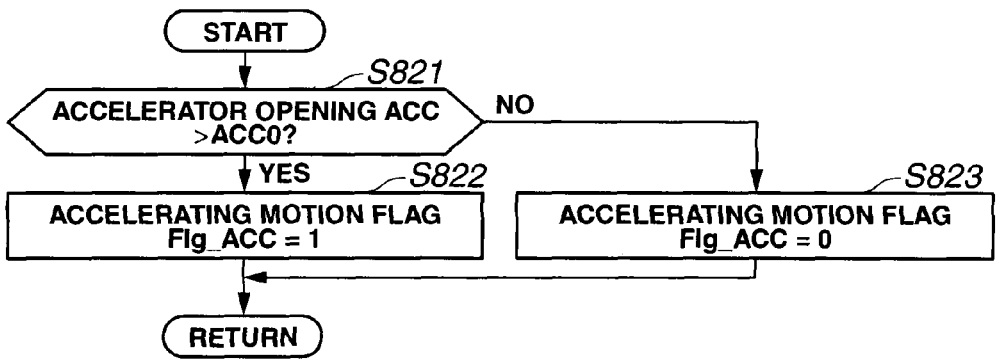
FIG. 30 is a flowchart showing an accelerating motion discriminating process at a step S820 of FIG. 28.

FIG. 30 is a flowchart showing the accelerating motion discriminating process of S820. In the process of FIG. 30, controller 50 examines whether the accelerator opening (degree) ACC is greater than a predetermined threshold ACC0, at a step S821. Then, controller 50 sets an accelerating motion flag Flg_ACC for representing the period of a vehicle accelerating motion, to one (Flg_ACC=1) at a step S822 when accelerator opening ACC is greater than threshold ACC0 (ACC>ACC0), and controller 50 resets the accelerating motion flag Flg_ACC to zero (Flg_ACC=0) at a step S823 when the accelerator opening ACC is smaller than or equal to threshold ACC0 (ACC≦ACC0). After S822 or S823, controller 50 returns to the vehicle behavior discriminating process.

Figure 31:
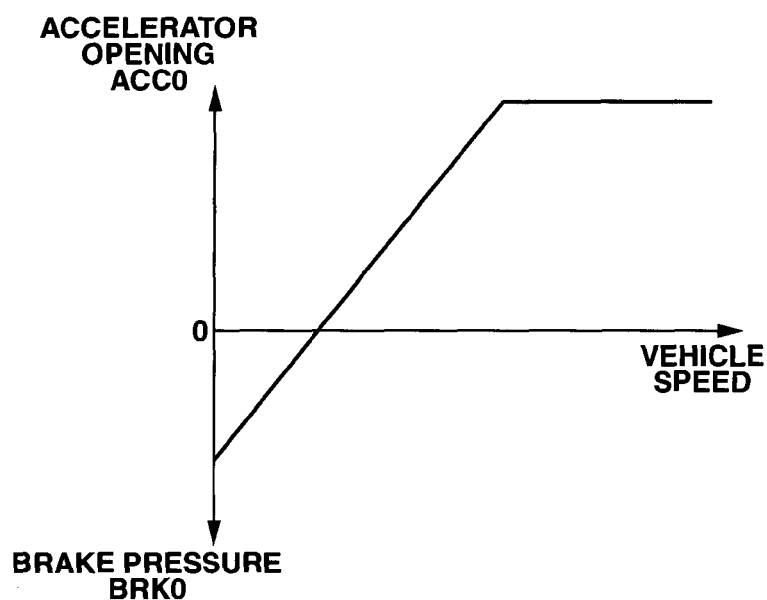
FIG. 31 is a graphic view showing a characteristic of an accelerator opening and a brake pressure with respect to a vehicle speed, to hold the vehicle speed constant.

In this example, the accelerator opening threshold ACC0 is determined according to a relationship between the vehicle speed and the accelerator opening or brake pressure required for holding the vehicle speed constant, as shown in FIG. 31. FIG. 31 shows the accelerator opening and brake pressure required for holding the vehicle speed constant. If a value of the vehicle speed is determined, the control system can determine the value of accelerator opening ACC to hold the vehicle speed at that value by using the relationship of FIG. 31, and set the threshold ACC0 of S821, equal to the thus-determined value of accelerator opening ACC.

(Decelerating Motion Discriminating Process)

Figure 32:
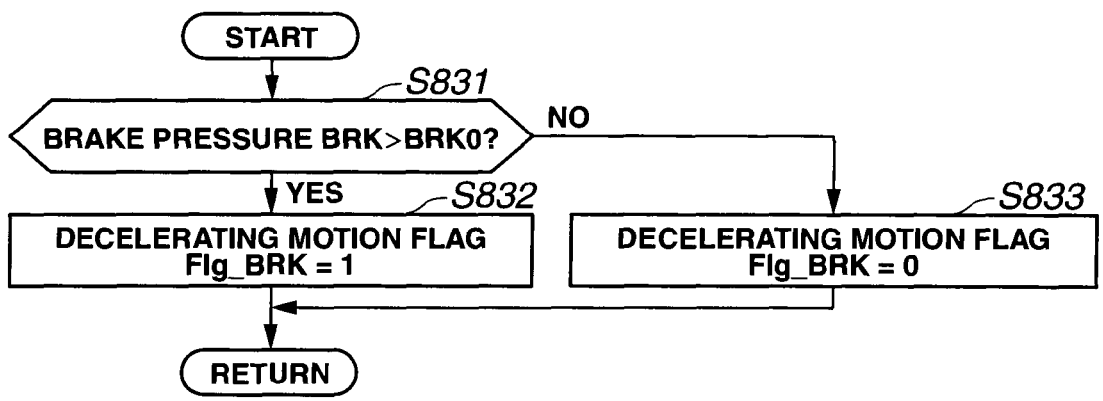
FIG. 32 is a flowchart showing a decelerating motion discriminating process at a step S830 of FIG. 28.

FIG. 32 is a flowchart showing the deceleration motion discriminating process of S830. In the process of FIG. 32, controller 50 examines whether the brake pressure BRK is greater than a predetermined brake pressure threshold BRK0, at a step S831. Then, controller 50 sets a decelerating motion flag Flg_BRK for representing the period of a vehicle decelerating motion, to one (Flg_BRK=1) at a step S832 when brake pressure BRK is greater than threshold BRK0 (BRK>BRK0), and controller 50 resets the decelerating motion flag Flg_BRK to zero (Flg_BRK=0) at a step S833 when the brake pressure BRK is lower than or equal to threshold BRK0 (BRK≦BRK0). After S832 or S833, controller 50 returns to the vehicle behavior discriminating process.

In this example, the brake pressure threshold BRK0 can be determined in the same manner as the accelerator opening threshold ACC0 of FIG. 30. The control system determines a speed value of the vehicle speed, then determines the value of brake pressure BRK to hold the vehicle speed at that speed value by using the relationship of FIG. 31, and sets the threshold BRKC0 of S831, equal to the thus-determined value of brake pressure BRK.

(Base Information Transmission Quantity Calculating Process)

Figure 33:
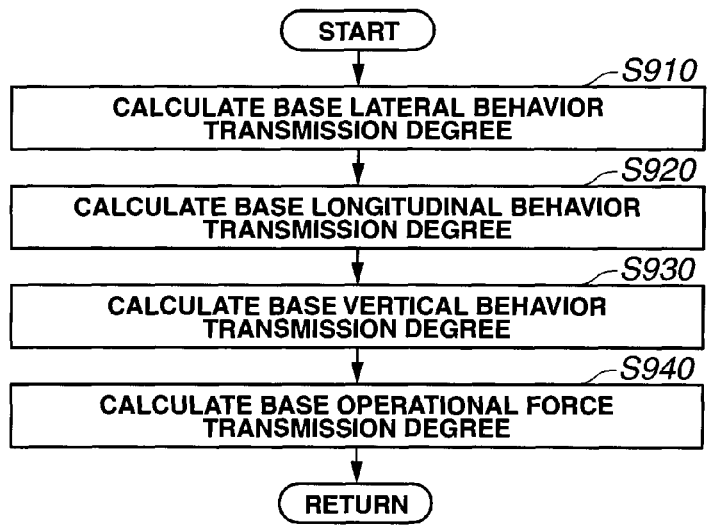
FIG. 33 is a flowchart showing a base information transmission quantity calculating process at a step S900 of FIG. 27.
Figure 40:
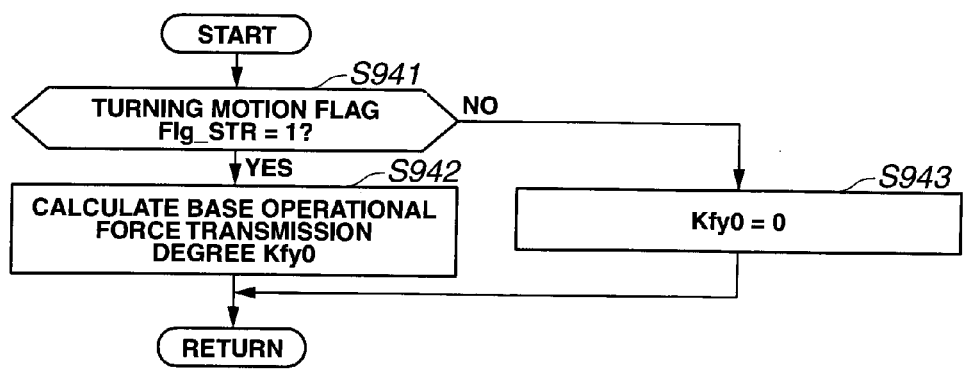
FIG. 40 is a flowchart showing a base operational force transmission degree calculating process at a step S940 of FIG. 33.

FIG. 33 shows the base information transmission quantity calculating process performed at S900 by controller 50. In this process, controller 50 performs: a base lateral behavior transmission degree calculating process for calculating a base lateral behavior transmission quantity or degree Kgy0 at a first step S910 (FIG. 34); a base longitudinal behavior transmission degree calculating process for calculating a base longitudinal behavior transmission quantity or degree Kgx0 at a second step S920 (FIG. 36); a base vertical behavior transmission degree calculating process for calculating a base vertical behavior transmission quantity or degree Kgz0 at a third step S930 (FIG. 38); and a base operational force transmission degree calculating process for calculating a base operational force transmission quantity or degree Kfy0 at a fourth step S940 (FIG. 40). After S940, controller 50 returns to the vehicle condition transmission quantity determining process.

(Base Lateral Behavior Transmission Degree Calculating Process)

Figure 34:
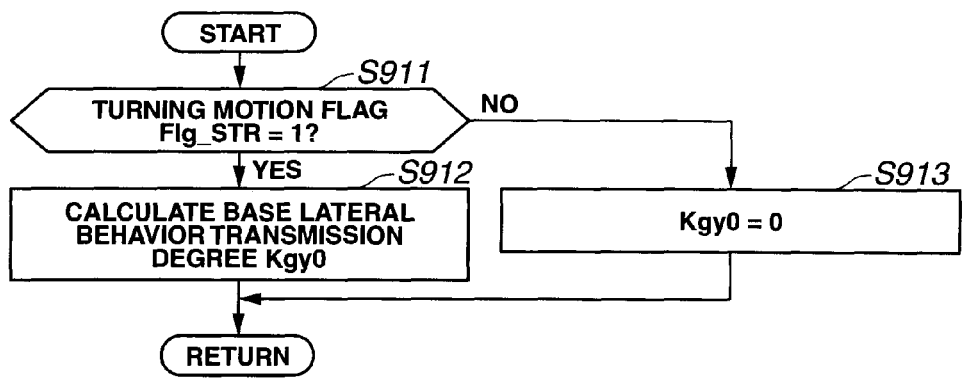
FIG. 34 is a flowchart showing a base lateral behavior transmission degree calculating process at a step S910 of FIG. 33.

FIG. 34 is a flowchart showing the base lateral behavior transmission degree calculating process of S910. In this process, controller 50 examines, at a step S911, whether turning motion flag Flg_STR is equal to one or not; calculates the base lateral behavior transmission degree Kgy0 in accordance with the absolute value of the lateral acceleration at a step S912 when turning motion flag Flg_STR is equal to one; and sets the base lateral behavior transmission degree Kgy0 equal to zero at a step S913 when turning motion flag Flg_STR is not equal to one. After S912 or S913, controller 50 returns to the base information transmission degree calculating process.

Figure 35:
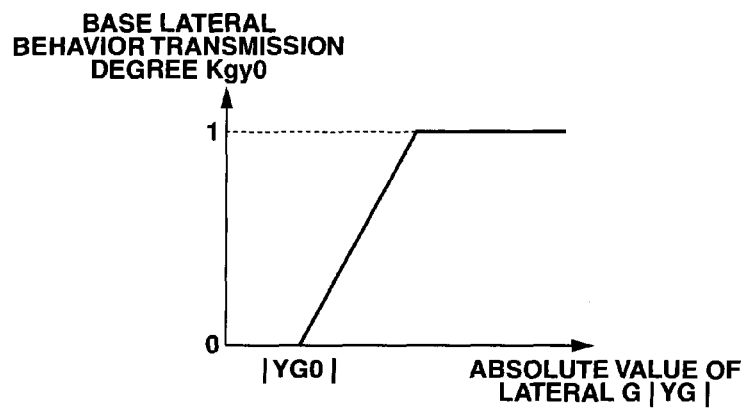
FIG. 35 is a graphic view showing a relationship of a base lateral behavior transmission degree Kgy0 with respect to the absolute value of the lateral acceleration.

FIG. 35 shows a relationship of the base lateral behavior transmission degree Kgy0 with respect to the absolute value of the lateral acceleration, which can be used in S912. Base lateral behavior transmission degree Kgy0 is increased with increase in the absolute value of the lateral acceleration. In the example shown in FIG. 35, the base lateral behavior transmission degree Kgy0 is equal to zero in the region in which the absolute value of lateral acceleration |YG| is smaller than or equal to a predetermined first threshold |YG0|; increased from zero linearly to one in the region in which |YG| is greater than |YG0|; and held constantly equal to one in the region in which |YG| is greater than a value at which Kgy0 reaches one.

(Base Longitudinal Behavior Transmission Degree Calculating Process)

Figure 36:
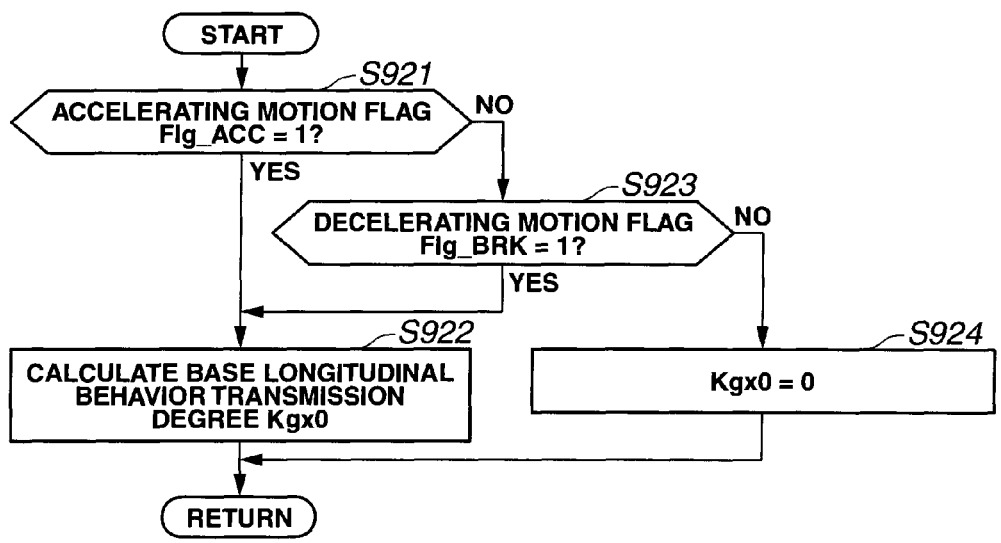
FIG. 36 is a flowchart showing a base longitudinal behavior transmission degree calculating process at a step S920 of FIG. 33.

FIG. 36 is a flowchart showing the base longitudinal behavior transmission degree calculating process of S920. In this process, controller 50 examines, at a step S921, whether accelerating motion flag Flg_ACC is equal to one or not, and calculates the base longitudinal behavior transmission degree Kgx0 in accordance with the accelerator opening ACC at a step S922 when accelerating motion flag Flg_ACC is equal to one. When accelerating motion flag Flg_ACC is not equal to one, controller 50 examines, at a step S923 whether the decelerating motion flag Flg_BRK is equal to one or not; proceeds from S923 to the before-mentioned step S922 when decelerating motion flag Flg_BRK is equal to one; and sets the base longitudinal behavior transmission degree Kgx0 equal to zero (Kgx0=0) at a step S924 when decelerating motion flag Flg_BRK is not equal to one. After S922 or S924, controller 50 returns to the base information transmission degree calculating process.

Figure 37:
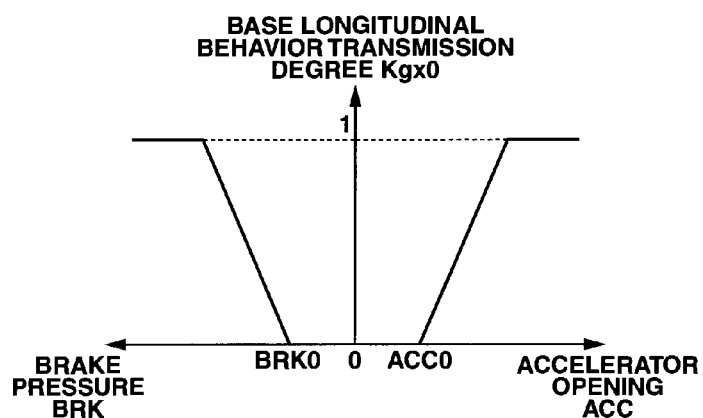
FIG. 37 is a graphic view showing a relationship of a base longitudinal behavior transmission degree Kgx0 with respect to the accelerator opening ACC and brake pressure BRK.

FIG. 37 shows a relationship of the base longitudinal behavior transmission degree Kgx0 with respect to the accelerator opening ACC and brake pressure BRK, which can be used in S922. Base longitudinal behavior transmission degree Kgx0 is increased with increase in the accelerator opening ACC or brake pressure BRK. In the example shown in FIG. 37, the base longitudinal behavior transmission degree Kgx0 is equal to zero in the region in which the independent variable which is the accelerator opening ACC or brake pressure BRK is smaller than or equal to a predetermined first threshold ACC0 or BRK0, and increased from zero linearly to one in the region in which the variable (ACC or BRK) is greater than the threshold (ACC0 or BRK0). The base longitudinal behavior transmission degree Kgx0 is held constantly equal to one when the variable (ACC or BRK) is further increased after Kgx0 becomes equal to a maximum value of one.

(Base Vertical Behavior Transmission Degree Calculating Process)

Figure 38:
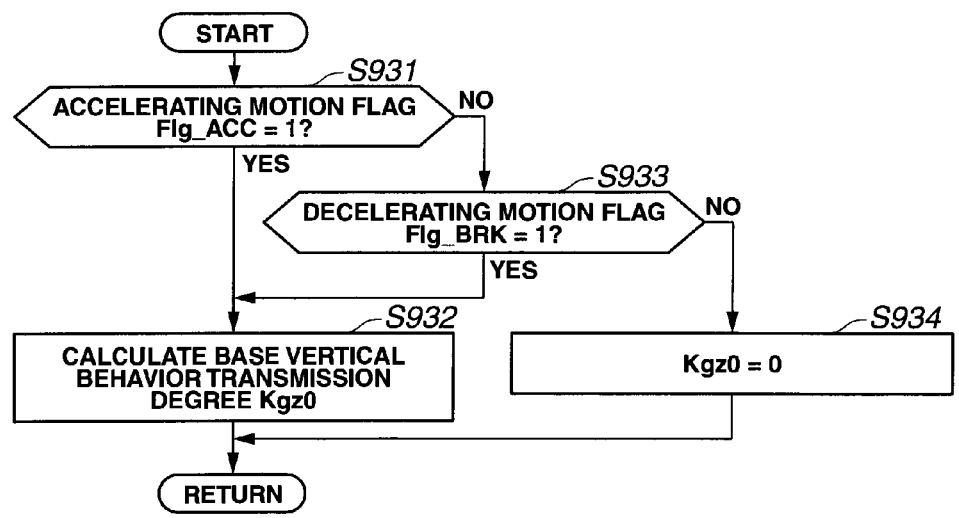
FIG. 38 is a flowchart showing a base vertical behavior transmission degree calculating process at a step S930 of FIG. 33.

FIG. 38 is a flowchart showing the base vertical behavior transmission degree calculating process of S930. In this process, controller 50 examines, at a step S931, whether accelerating motion flag Flg_ACC is equal to one or not, and calculates the base vertical behavior transmission degree Kgz0 in accordance with the accelerator opening ACC at a step S932 when accelerating motion flag Flg_ACC is equal to one. When accelerating motion flag Flg_ACC is not equal to one, controller 50 examines, at a step S933 whether the decelerating motion flag Flg_BRK is equal to one or not; proceeds from S933 to the before-mentioned step S932 when decelerating motion flag Flg_BRK is equal to one; and sets the base vertical behavior transmission degree Kgz0 equal to zero (Kgz0=0) at a step S934 when decelerating motion flag Flg_BRK is not equal to one. After S932 or S934, controller 50 returns to the base information transmission degree calculating process.

Figure 39:
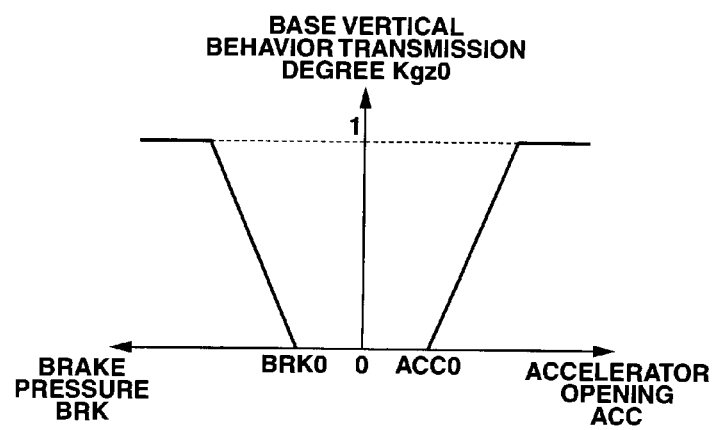
FIG. 39 is a graphic view showing a relationship of a base vertical behavior transmission degree Kgz0 with respect to the accelerator opening ACC and brake pressure BRK.

FIG. 39 shows a relationship of the base vertical behavior transmission degree Kgz0 with respect to the accelerator opening ACC and brake pressure BRK, which can be used in S932. Base vertical behavior transmission degree Kgz0 is increased with increase in the accelerator opening ACC or brake pressure BRK. In the example shown in FIG. 39, the base vertical behavior transmission degree Kgz0 is equal to zero in the region in which the independent variable which is the accelerator opening ACC or brake pressure BRK is smaller than or equal to a predetermined first threshold ACC0 or BRK0, and increased from zero linearly to one in the region in which the variable (ACC or BRK) is greater than the threshold (ACC0 or BRK0). The base vertical behavior transmission degree Kgz0 is held constantly equal to one when the variable (ACC or BRK) is further increased after Kgz0 becomes equal to the maximum value of one.

(Base Operational Force Transmission Degree Calculating Process)

FIG. 40 is a flowchart showing the base operational force transmission degree calculating process of S940. In this process, controller 50 examines, at a step S941, whether turning motion flag Flg_STR is equal to one or not; calculates the base operational force transmission degree Kfy0 in accordance with the absolute value of the lateral acceleration at a step S942 when turning motion flag Flg_STR is equal to one; and sets the base lateral behavior transmission degree Kfy0 equal to zero (Kfy0=0) at a step S943 when turning motion flag Flg_STR is not equal to one. After S942 or S943, controller 50 returns to the base information transmission degree calculating process.

Figure 41:
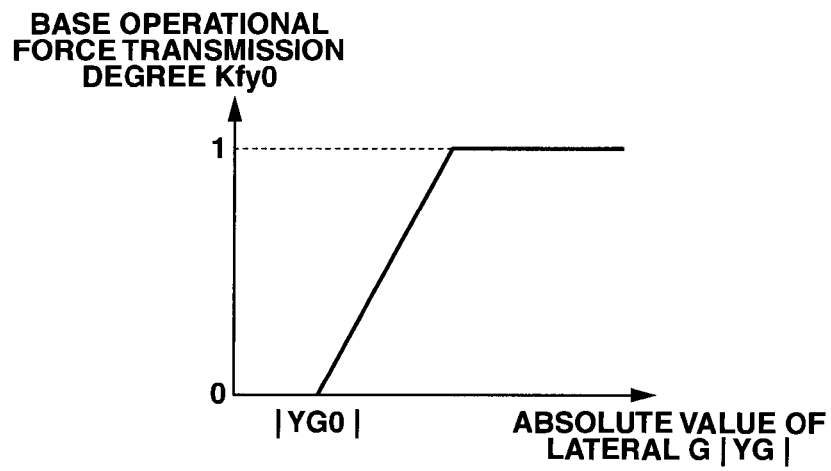
FIG. 41 is a graphic view showing a relationship of a base operational force transmission degree Kfy0 with respect to the absolute value of the lateral acceleration YG.

FIG. 41 shows a relationship of the base operational force transmission degree Kfy0 with respect to the absolute value of the lateral acceleration, which can be used in S942. Base operational force transmission degree Kfy0 is increased with increase in the absolute value of the lateral acceleration. In the example shown in FIG. 41, the base operational force transmission degree Kfy0 is equal to zero in the region in which the absolute value of lateral acceleration |YG| is smaller than or equal to a predetermined first threshold |YG0|; increased from zero linearly to one in the region in which |YG| is greater than |YG0|; and held constantly equal to one in the region in which |YG| is greater than a value at which Kfy0 reaches one.

(Minimum Information Transmission Degree Calculating Process)

Figure 42:
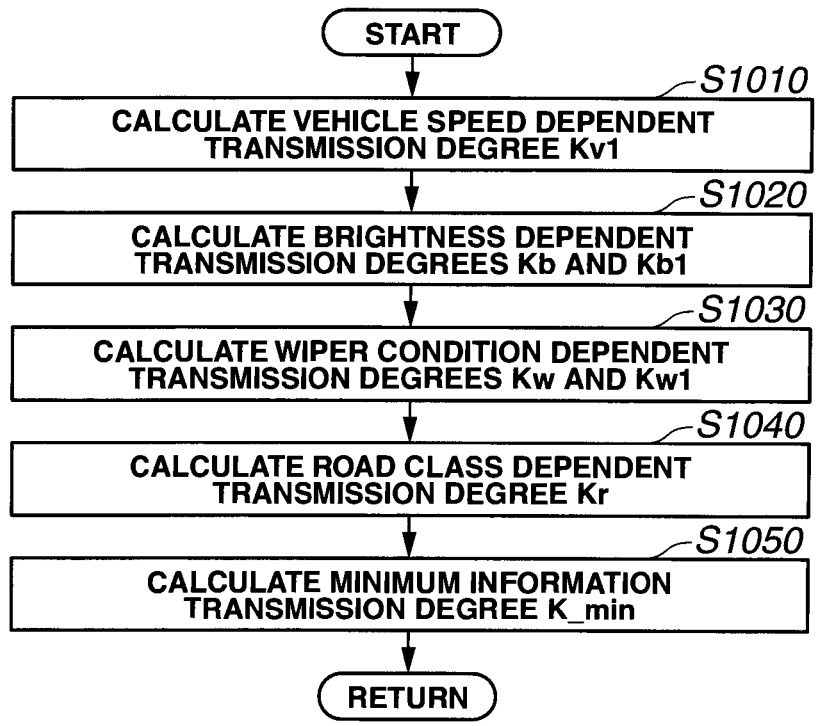
FIG. 42 is a flowchart showing a minimum information transmission quantity calculating process at a step S1000 of FIG. 27.

FIG. 42 shows the minimum information transmission degree calculating process performed at S1000 of the vehicle state information transmission quantity determining process of FIG. 27, by controller 50.

Figure 43:
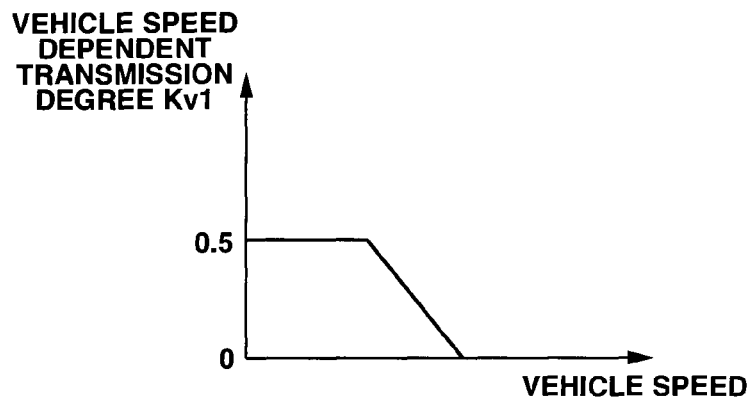
FIG. 43 is a graphic view showing a relationship of a vehicle speed dependent information transmission degree Kv1 with respect to the vehicle speed.

At a step S1010 of FIG. 42, controller 50 calculates a vehicle speed dependent information transmission degree Kv1 which is dependent on the vehicle speed as shown in FIG. 43. Transmission degree Kv1 decreases with increase of the vehicle speed. In the example of FIG. 43, the vehicle speed dependent transmission degree Kv1 is held constantly equal to 0.5 in the region in which the vehicle speed is from 0 to a first speed value; decreased (linearly) from 0.5 to a minimum value of 0 in the region in which the vehicle speed increases from the first speed value to a second speed value; and held equal to the minimum value of zero in the region in which the vehicle speed is higher than the second speed value.

Figure 44:
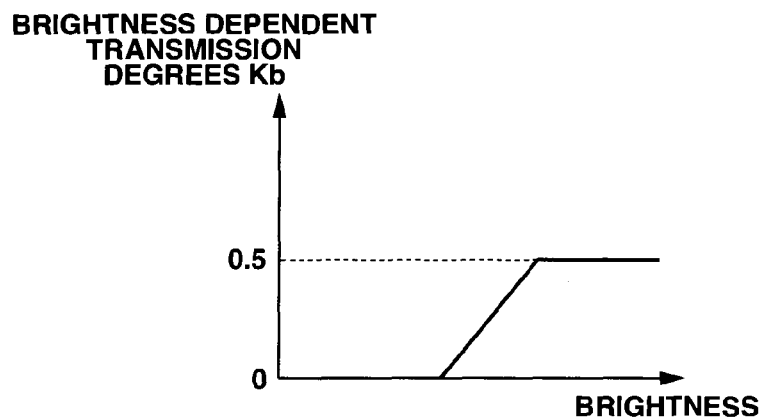
FIG. 44 is a graphic view showing a relationship of a brightness dependent information transmission degree Kb with respect to the brightness outside the vehicle.
Figure 45:
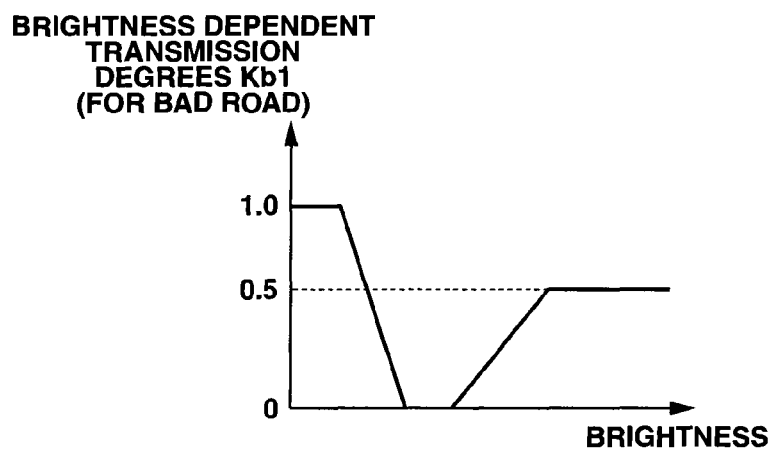
FIG. 45 is a graphic view showing a relationship of a second brightness dependent information transmission degree Kb1 with respect to the brightness outside the vehicle.

At a step S1020, controller 50 calculates a brightness dependent information transmission degree Kb which is dependent on the brightness around the vehicle. In this example, controller calculates a first (or normal) brightness dependent information transmission degree Kb dependent on the brightness as shown in FIG. 44, and a second (or rough road) brightness dependent information transmission degree Kb1 dependent on the brightness as shown in FIG. 45. The normal brightness dependent information transmission degree Kb is used normally, and the second degree Kb1 is used when the road is bad or not normal.

The first brightness dependent transmission degree Kb increases with increase in the brightness. In the example of FIG. 44, this transmission degree Kb is equal to zero in the region in which the brightness is from zero to a predetermined first value, increases from zero to a maximum value of 0.5 when the brightness increases from a first value to a second value, and is held constantly at 0.5 in the region in which the brightness is greater than the second value. As shown in FIG. 45, the second brightness dependent transmission degree Kb1 is first decreased and then increased when the brightness increases. In the example of FIG. 45, this transmission degree Kb1 is held constant at a maximum value of one in a first region in which the brightness increases from zero to a first value, decreased linearly from 1.0 to a minimum value of 0 with increase in the brightness in a second region between the first value and a second value of the brightness, held at zero in a region between the second value and a third value greater than the second value, increased from zero to an intermediate value of 0.5 with increase of the brightness in a fourth region between the third value and a fourth value, and held constant at 0.5 in a fifth region in which the brightness is greater than the fourth value. At step S1020, controller 50 calculates the first brightness dependent information transmission degree Kb by using the relationship of FIG. 44 when the road on which the vehicle 1A is running is not a bad road, and calculates the second brightness dependent information transmission degree Kb1 by using the relationship of FIG. 45 when the road is a bad road.

At a step S1030, controller 50 calculates a wiper condition dependent information transmission degree Kw which is dependent on the wiper condition of the vehicle. In this example, controller calculates a first (or normal) wiper condition dependent information transmission degree Kw, and a second (or rough road) wiper condition dependent information transmission degree Kw1. The normal wiper condition dependent information transmission degree Kw is used normally, and the second degree Kw1 is used when the road is bad or not normal.

Figures 46, 47, 48:
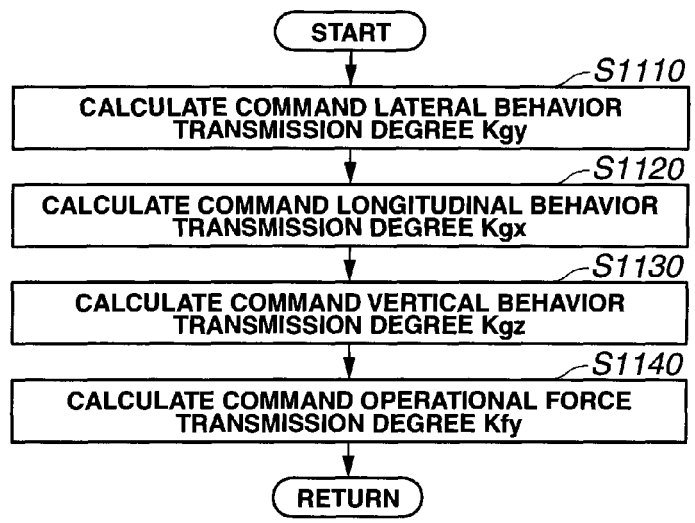
FIG. 46 is a table showing values of first and second wiper condition dependent information transmission degrees Kw and Kw1.
FIG. 47 is a table showing values of a road class dependent information transmission degrees Kr.
FIG. 48 is a flowchart showing a command information transmission quantity calculating process at a step S1100 of FIG. 48.

The normal wiper condition dependent information transmission degree Kw and the second degree Kw1 are determined, as shown in FIG. 46, in dependence on the operating condition of the wiper system which may be in an off state, an intermittent operation state, a normal sweep rate operation state or a high sweep rate operating state.

In this example, controller 50 discriminates a bad road by monitoring a variation of a vehicle operating condition such as the output of unsprung acceleration sensor, the strokes of active suspensions 4i and the wheel speeds, and judges that the road is bad when a frequency variation and/or amplitude variation of the monitored vehicle operating condition is greater than a predetermined threshold.

At a step S1040, controller 50 calculates a road class dependent information transmission degree Kr which is dependent on the classification of the road as shown in FIG. 47. In the example shown in FIG. 47, the road class dependent information transmission degree Kr is determined for each of the urban road, suburb road and expressway or highway. For example, controller 50 can discriminate among the urban road, suburb road and expressway by using the current vehicle position and map data obtained from a car navigation system and the number of stoplights.

At a step S1050, controller 50 performs a process for calculating a minimum information transmission degree K_min which is a smallest one among the vehicle speed dependent information transmission degree Kv1, brightness dependent information transmission degree Kb or Kb1, wiper condition dependent information transmission degree Kw or Kw1, and road class dependent information transmission degree Kr. After S1050, controller 50 returns to the vehicle condition transmission quantity calculating process of FIG. 27.

(Command Information Transmission Degree Calculating Process)

FIG. 48 shows a command information transmission degree calculating process performed at S1100 by controller 50.

At a step S1110 of FIG. 48, controller 50 performs a process for calculating a command lateral behavior transmission degree Kgy representing the degree of transmission of the vehicle lateral behavior.

At a step S1120, controller 50 performs a process for calculating a command longitudinal behavior transmission degree Kgx representing the degree of transmission of the vehicle longitudinal behavior.

At a step S1130, controller 50 performs a process for calculating a command vertical behavior transmission degree Kgz representing the degree of transmission of the vehicle vertical behavior.

At a step S1140, controller 50 performs a process for calculating a command operational force transmission degree Kfy representing the degree of transmission of an operational force inputted from the road surface to the steering wheel 5.

After S1140, controller 50 returns to the vehicle condition transmission quantity determining process of FIG. 27.

(Command Lateral Behavior Transmission Degree Calculating Process)

Figure 49:
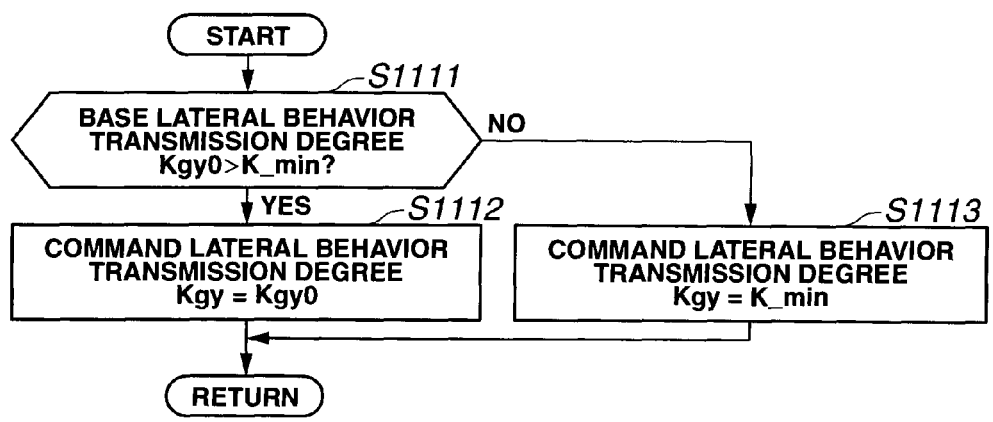
FIG. 49 is a flowchart showing a command lateral behavior transmission quantity calculating process at a step S1110 of FIG. 48.

FIG. 49 shows the command lateral behavior transmission degree calculating process of S1110. In this process, controller 50 examines, at a step S1111, whether the base lateral behavior transmission degree Kgy0 is greater than the minimum information transmission degree K_min, sets the command lateral behavior transmission degree Kgy equal to base lateral behavior transmission degree Kgy0 (Kgy=Kgy0) at a step S1112 when Kgy0>K_min and hence the answer of S1111 is Yes, and sets the command lateral behavior transmission degree Kgy equal to minimum transmission degree K_min (Kgy=K_min) at a step S1113 when Kgy0≦K_min and hence the answer of S1111 is No. After S1112 or S1113, controller 50 returns to the command information transmission degree calculating process.

(Command Longitudinal Behavior Transmission Degree Calculating Process)

Figure 50:
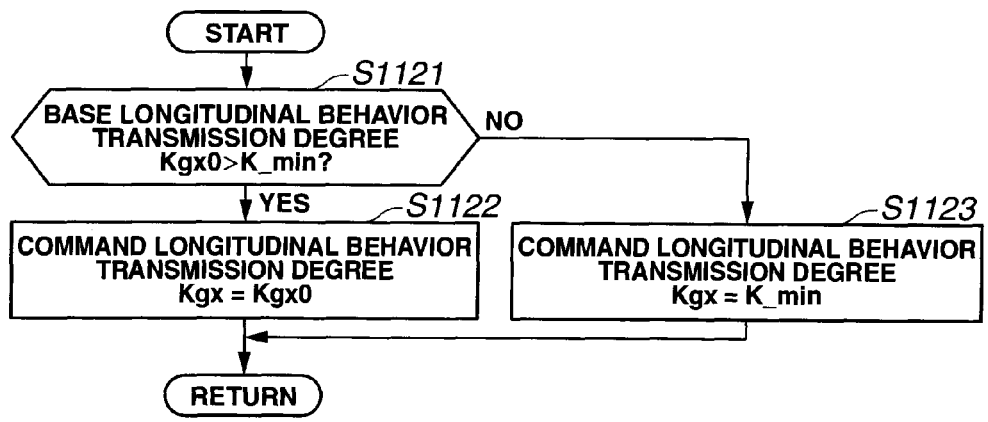
FIG. 50 is a flowchart showing a command longitudinal behavior transmission quantity calculating process at a step S1120 of FIG. 48.

FIG. 50 shows the command longitudinal behavior transmission degree calculating process of S1120. In this process, controller 50 examines, at a step S1121, whether the base longitudinal behavior transmission degree Kgx0 is greater than the minimum information transmission degree K_min, sets the command longitudinal behavior transmission degree Kgx equal to base longitudinal behavior transmission degree Kgx0 (Kgx=Kgx0) at a step S1122 when Kgx0>K_min and hence the answer of S1121 is Yes, and sets the command longitudinal behavior transmission degree Kgx equal to minimum transmission degree K_min (Kgx=K_min) at a step S1123 when Kgx0_≦K_min and hence the answer of S1121 is No. After S1122 or S1123, controller 50 returns to the command information transmission degree calculating process.

(Command Vertical Behavior Transmission Degree Calculating Process)

Figure 51:
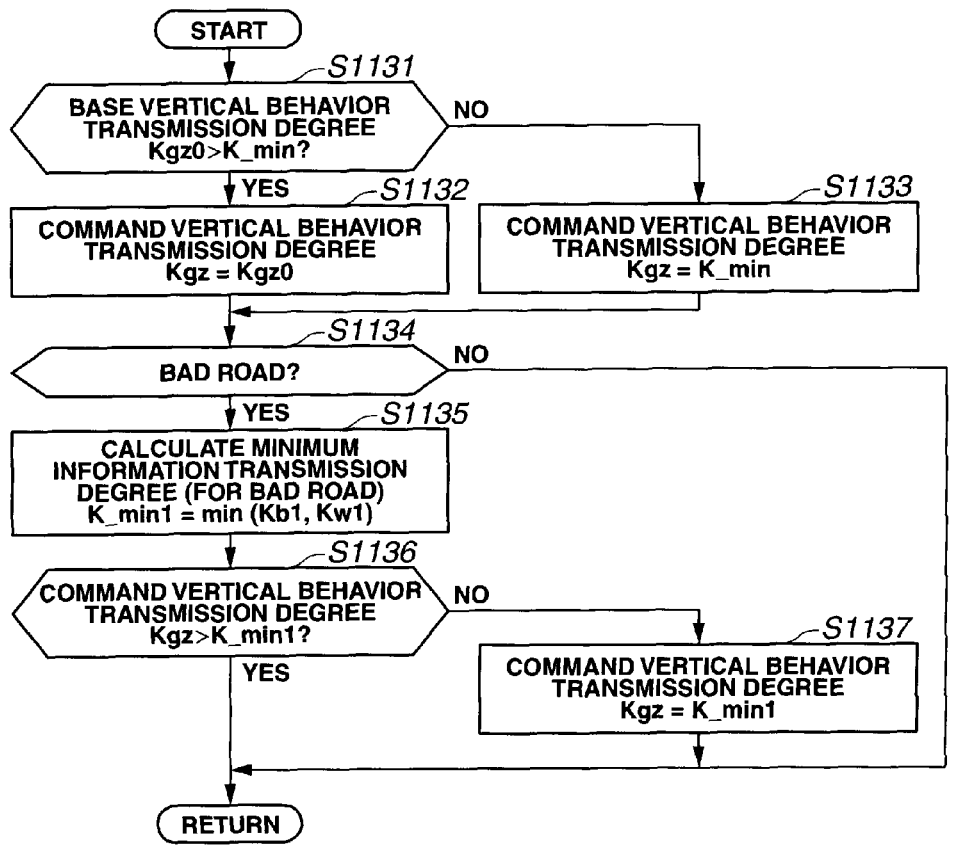
FIG. 51 is a flowchart showing a command vertical behavior transmission quantity calculating process at a step S1130 of FIG. 48.

FIG. 51 shows the vertical behavior transmission degree calculating process of S1130. In this process, controller 50 examines, at a step S1131, whether the base vertical behavior transmission degree Kgz0 is greater than the minimum information transmission degree K_min, sets the command vertical behavior transmission degree Kgz equal to base vertical behavior transmission degree Kgz0 (Kgz=Kgz0) at a step S1132 when Kgz0>K_min and hence the answer of S1131 is Yes, and sets the command vertical behavior transmission degree Kgz equal to minimum transmission degree K_min (Kgz=K_min) at a step S1133 when Kgz0≦K_min and hence the answer of S1131 is No.

After S1132 or S1133, controller 50 examines, at a step S1134, whether the road condition is bad or not, and returns to the command information transmission degree calculating process when the road condition is not bad. When the road condition is bad and the answer of S1134 is Yes, then controller 50 proceeds from S1134 to a step S1135, and calculates a minimum information transmission degree K_min1 for a bad road, at S1135. At S1135, the minimum bad road information transmission degree K_min1 is set equal to a smaller one of the second brightness dependent information transmission degree Kb1 and the second wiper condition dependent information transmission degree Kw1. At a step S1136 following S1135, controller 50 examines whether the command vertical behavior transmission degree Kgz is greater than the minimum bad road information transmission degree K_min1. When Kgz>K_min1, and hence the answer of S1136 is Yes, then controller 50 returns to the command information transmission degree calculating process. When Kgz≦K_min1 and hence the answer of S1136 is No, then controller 50 proceeds from S1136 to a step S1137, and sets the command vertical behavior transmission degree Kgz equal to the minimum bad road information transmission degree K_min 1 (Kgz=K_min1), at S1137. After S1137, controller 50 returns to the command information transmission degree calculating process.

(Command Operational Force Transmission Degree Calculating Process)

Figure 52:
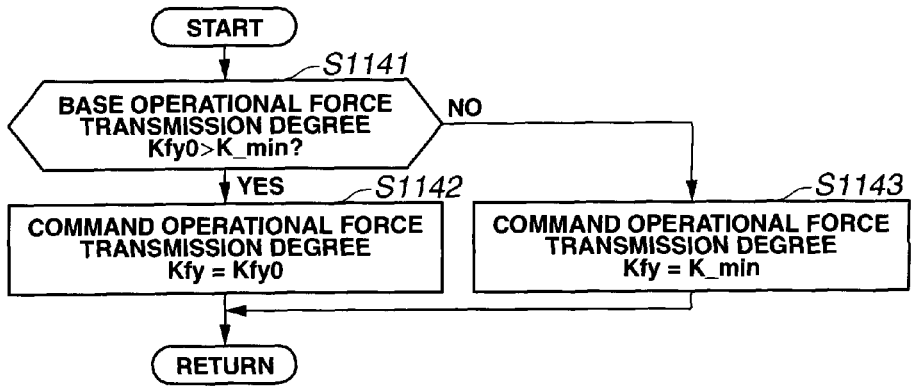
FIG. 52 is a flowchart showing a command operational force transmission quantity calculating process at a step S1140 of FIG. 48.

FIG. 52 shows the operational force transmission degree calculating process of S1140. In this process, controller 50 examines, at a step S1141, whether the base operational force transmission degree Kfy0 is greater than the minimum information transmission degree K_min, sets the command operational force transmission degree Kfy equal to base operational force transmission degree Kfy0 (Kfy=Kfy0) at a step S1142 when Kfy0>K_min and hence the answer of S1141 is Yes, and sets the command operational force transmission degree Kfy equal to minimum transmission degree K_min (Kfy=K_min) at a step S1143 when Kfy0≦K_min and hence the answer of S1141 is No. After S1142 or S1143, controller 50 returns to the command information transmission degree calculating process. By performing these control processes, the control system of the practical example of the fourth embodiment can control the vehicle 1A to support the driver and control the degree of restraint for restraining vibration from the road with the active suspensions 4i(FL~RR), for example, in accordance with the road condition and vehicle behavior.

The control system according to the fourth embodiment can provide information properly to the driver to support the driver by transmitting vehicle behavior with the controlled degree controlled in accordance with various conditions such as the vehicle condition and surrounding condition including the obstacle condition, and by controlling the reaction of the vehicle such as the operational reaction to support the driving operation of the driver in accordance with the various conditions such as the vehicle condition and surrounding condition.

Application Example

In the base vertical behavior transmission degree calculating process of FIG. 38, the base vertical behavior transmission degree Kgz0 is determined in dependence on the acceleration motion flag Flg_ACC and the decelerating motion flag Flg_BRK. Instead, it is possible to determine the base vertical behavior transmission degree Kgz0 in dependence on the road condition as to whether the road is a bad road or not. For example, when the road condition is not good or bad, the basic control quantity for controlling the active suspensions 4i during the accelerating/decelerating operation is set equal to a greater value (so as to increase the degree of transmission of transmitting a vehicle vertical behavior due to the accelerating/decelerating operation) than a normal value. In this case, in the process of FIG. 51, controller 50 determines the command vertical behavior transmission degree Kgz without discriminating the road condition as to whether the road is a bad road or not. The control system of this application example can transmit the vehicle vertical behavior due to the acceleration/deceleration adequately to the driver even when greater vibrations are inputted from the road of a bad surface condition.

According to one of various possible interpretations of the disclosed embodiments and examples, it is possible to consider the following techniques.

(Z1) A vehicle driving (operation) support technique (apparatus or process) for a vehicle (1A), comprises the following elements which are elements of the apparatus such as sections or means, or elements of the process such as steps. A sensing element is an element to sense a traveling condition of the vehicle including a surrounding condition inclusive of an obstacle around the vehicle. A control element is an element to calculate a risk potential for the vehicle in accordance with the traveling condition, to perform a support control to support the driver in accordance with the risk potential, to perform an assist control to restrain disturbance transmitted to the drive in accordance with the risk potential.

(Z2) The technique as recited in Z1, wherein the technique further comprises an actuating element to control the vehicle for supporting the driver of the vehicle in accordance with the traveling condition, and the control element is configured to perform the assist control to restrain movement (or disturbing movement) transmitted to the driver by controlling the actuating element in accordance with the risk potential.

(Z3) The technique as recited in one of Z1-Z2, wherein the control element is configured: to perform the support control of producing a reaction of the vehicle influencing the driver in response to a change in the risk potential; and to perform the assist control of varying a degree of restraint for restraining transmission of the disturbance to the driver.

(Z4) The technique as recited in one of Z1-Z3, wherein the actuating element includes a reaction regulating element to produce a reaction of the vehicle, and a motion regulating element to regulate a movement (such as vibration) transmitted to the driver, and the control element is configured to perform the support control by producing a reaction of the vehicle influencing the driver in response to an increase in the risk potential by controlling the reaction regulating element, and to perform the assist control of varying the degree of restraint for restraining transmission of the movement to the driver by controlling the motion regulating element.

(Z5) The technique as recited in Z4, wherein the motion regulating element is arranged to regulate the movement in a vertical direction. (Z6) The technique as recited in Z4 or Z5, wherein the reaction regulating element includes an operational reaction imparting element to impart an operational reaction to a driver's driving operation inputted to a driving operation input device. (Z7) The technique as recited in one of Z4~Z6, wherein the reaction regulating element includes a longitudinal regulating element to regulate a longitudinal behavior of the vehicle. (Z8) The technique as recited in one of Z4~Z7, wherein the reaction regulating element includes a lateral regulating element to regulating a lateral behavior of the vehicle. (Z9) The technique as recited in one of Z1~Z8, wherein the control element comprises: a risk potential calculating element to calculate the risk potential to the obstacle in accordance with the traveling condition including the surrounding condition and a vehicle condition of the vehicle, a support controlling element to control a reaction of the vehicle, in accordance with the risk potential by controlling the actuating element; and an assist controlling element to perform the assist control to restrain the movement transmitted to the driver, in accordance with the risk potential by controlling the actuating element.

(Z10) The technique as recited in one of Z1-Z9, wherein the actuating element includes an assist actuating element (or subelement) to restrain transmission of disturbing information to the driver in response to a first assist control signal produced by the first assist control. (Z11) The technique as recited in Z10, wherein the assist actuating element is arranged to restrain transmission of vibration to the driver.

(Z12) The technique as recited in one of Z1~Z11, wherein the control element (or the assist (restraint) controlling element) is configured to restrain the movement transmitted to the driver, in accordance with the risk potential by controlling at least one of the operational reaction imparting element (or the reaction regulating element) and the motion regulating element. In this case, the assist controlling element (or the control element) may be configured to restrain the vehicle behavior of the vehicle transmitted to the driver by controlling at least one of the operational reaction in the vehicle longitudinal direction and the operational reaction in the vehicle lateral direction provided by the operational reaction imparting element and the motion regulating element in accordance with the risk potential. (Z13) The technique as recited in one of Z1~Z12, wherein the control element (or the assist (restraint) controlling element) is configured to restrain the movement transmitted to the driver, to a greater degree as the risk potential becomes higher.

(Z14) The technique as recited in Z13 or one of Z1~Z13, wherein the technique further comprises a stability condition sensing element to sense a stability condition of the vehicle, and the control element (or the assist controlling element) is configured to vary the degree of restraint for restraining the movement transmitted to the driver, in accordance with the stability condition. (Z15) The technique as recited in Z14 or one of Z1~Z14, wherein the control element (or the assist (restraint) controlling element) is configured to increase the degree of restraint for restraining the movement transmitted to the driver as a stability of the vehicle determined by the stability condition become lower. (Z16) The technique as recited in Z14 or one of Z1~Z14, wherein the control element (or the assist (restraint) controlling element) is configured to decrease the degree of restraining the movement transmitted to the driver as a stability of the vehicle determined by the stability condition become lower.

(Z17) The apparatus as recited in one of Z1~Z16, wherein the control element (or the assist controlling element) is configured to restrain a vehicle behavior of the vehicle with a first control quantity when the risk potential is lower than or equal to a first threshold and to decrease the degree of restraint for restraining the vehicle behavior, with increase in the risk potential when the risk potential is higher than the first threshold.

(Z18) The technique as recited in one of Z1~Z17, wherein the motion regulating element includes an active suspension disposed between a wheel and a vehicle body of the vehicle.

(Z19) The technique as recited in one of Z1~Z17, wherein the motion regulating element includes a damping force varying device or variable damping force device.

(Z20) The technique as recited in one of Z1~Z19, wherein the control element or the assist (restraint) controlling element is configured to increase the degree of restraint ($\alpha 0$) for restraining the disturbance transmitted to the driver with increase of the risk potential when the risk potential is higher than a first potential threshold (PR0). (Z21) The technique as recited in one of Z1~Z19, wherein the control element or the assist (restraint) controlling element is configured to decrease the degree of restraint ($\alpha 0$) for restraining the disturbance transmitted to the driver with increase of the risk potential when the risk potential is higher than a first potential threshold (PR0'). The control element may be configured to set the degree of restraint ($\alpha 0$) equal to a higher value (one, for example) in a lower risk region in which the risk potential is lower than or equal to the first potential threshold (PR0'), and to decrease the degree of restraint ($\alpha 0$) from the higher value to a lower value (zero, for example) in a higher risk region in which the risk potential is higher the first potential threshold (PR0').

(Z22) The technique as recited in one of Z1~Z21, wherein the motion regulating section or the actuating section includes a control type suspension device disposed between a driver's seat and a vehicle body.

(Z23) A vehicle driving (operation) support technique which is a process comprising a process element of performing an information transmission control to restrain transmission of a vehicle movement in accordance with a vehicle traveling condition including a vehicle operating condition of a vehicle and a surrounding condition around the vehicle, and to provide an operational reaction which is a reaction force imparted to at least one of a steering operation, an accelerating operation and a braking operation of a driver, in accordance with the vehicle traveling condition. (Z24) A vehicle (or a motor vehicle) provided with the driving (operation) support technique recited in one of Z1~Z45. (Z25) A vehicle (or motor vehicle) comprising: a vehicle body; an operating element for performing a driving operation or for receiving a driver's driving operation such as a steering, accelerating or braking operation; a road condition sensing element for sensing a road condition; a vehicle condition sensing element for sensing a vehicle condition of the vehicle; an obstacle sensing element for sensing an obstacle around the vehicle; a risk potential calculating element for calculating a risk potential to an obstacle in accordance with sensed conditions of the vehicle condition sensing element and the obstacle condition sensing element; an operational reaction imparting element for providing an operational reaction in the operating element, in accordance with the risk potential; a motion regulating element for controlling a vertical movement of the driver; and an information transmission controlling element for controlling the motion regulating element in accordance with the sensed conditions of the road condition sensing element and the vehicle condition sensing element, restraining vehicle behavior occurring in the vehicle in accordance with the risk potential, and transmitting disturbance information to the driver.

(Z26) The vehicle driving (operation) support technique as recited in one of Z1~Z25, wherein the control element (or the risk potential calculating element) is configured to calculate a comprehensive risk potential of a surrounding of the vehicle in accordance with the traveling condition, and the control element is configured to perform the assist control in accordance with the comprehensive risk potential.

(Z27) The vehicle driving (operation) support technique as recited in one of Z1~Z26, wherein the support technique comprises an actuating element including a damping device (such as a suspension device 4i or 400i) to transmit movement or disturbing movement from a road (or a vehicle body) to the driver with a variable damping characteristic, and the control element is configured to control the damping characteristic in accordance with the risk potential. (Z28) The vehicle driving support technique as recited in one of Z1~Z27, wherein the control element (or the assist controlling element) is configured to restrain vehicle behavior of the vehicle by controlling the operational reaction imparting element and the motion regulating element, and thereby to restrain behavior in the vehicle longitudinal, lateral and vertical directions, transmitted to the driver. (Z29) The vehicle driving operation support technique as recited in one of Z1~Z28, wherein the control element (or the risk potential calculating element) is configured to calculate a longitudinal risk potential (RPx) in accordance with the traveling condition, and the control element (or the support controlling element) is configured to perform the support control in a longitudinal direction of the vehicle in accordance with the longitudinal risk potential (RPx). (Z30) The vehicle driving operation support technique as recited in one of Z1~Z29, wherein the control element (or the risk potential calculating element) is configured to calculate a lateral risk potential (RPy) in accordance with the traveling condition, and the control element (or the support controlling element) is configured to perform the support control in a lateral direction of the vehicle in accordance with the lateral risk potential (RPy). (Z31) The vehicle driving operation support technique as recited in one of Z1~Z30, wherein the control element (or the risk potential calculating element) is configured to calculate the longitudinal risk potential (RPx) from a sum (RPx=$\Sigma_k$(RPk×cos θk)) of longitudinal components of risk potentials of obstacles around the vehicle. (Z32) The vehicle driving operation support technique as recited in one of Z29~Z31, wherein the control element (or the risk potential calculating section) is configured to calculate the lateral risk potential (RPy) from a sum (RPy=$\Sigma_k$(RPk×sin θk)) of lateral components of individual risk potentials (RPk) of obstacles (k) around the vehicle. (Z33) The vehicle driving operation support technique as recited in one of Z1~Z32, wherein the control element (or the support controlling element) is configured to perform the support control in the longitudinal direction (S201~S205) by controlling at least one of an accelerator reaction, a driving force and a braking force in accordance with the longitudinal risk potential (RPx) (or a repulsive force (Fc=K1·(RPx−RPL1)) proportional to a difference between the longitudinal risk potential (RPx) and a predetermined value (RPL1)). (Z34) The vehicle driving operation support technique as recited in one of Z1~Z33, wherein the control element (or the support controlling element) is configured to perform the support control in the lateral direction (S301~S303) by controlling a steering reaction in accordance with the lateral risk potential (RPy). In Z1~Z34, reference numerals and other items in parentheses are items having more or less relevance, enumerated merely as an example, without meaning of limiting the scope of the technique recited in each of Z1~Z34.

This application is based on a prior Japanese Patent Application No. 2009-259193 filed on Nov. 12, 2009, 2009, a prior Japanese Patent Application No. 2009-46941 filed on Feb. 27, 2009, a prior Japanese Patent Application No. 2009-46942 filed on Feb. 27, 2009, and a prior Japanese Patent Application No. 2009-46943 filed on Feb. 27, 2009. The entire contents of these Japanese Patent Applications are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle driving operation support apparatus comprising:
   a vehicle condition sensing section configured to sense a vehicle condition of a vehicle;
   an obstacle condition sensing section configured to monitor a surrounding condition including an obstacle around the vehicle;
   an operation input section configured to allow a driver to input a driving operation to operate the vehicle;
   a motion regulating section configured to regulate a movement transmitted to the driver; and
   a control section configured to:
     calculate a risk potential for the obstacle in accordance with the vehicle condition and the surrounding condition,
     provide an operational reaction to the driving operation in accordance with the risk potential, and
     perform an assist control to restrain transmission of disturbances to the driver in accordance with the risk potential by controlling the motion regulating section.

2. The vehicle driving operation support apparatus as claimed in claim 1, further comprising:
   a road condition sensing section configured to sense a road condition,
   wherein the motion regulating section is configured to regulate a vertical movement transmitted to the driver, and
   wherein the control section is configured to perform the assist control to selectively transmit and suppress transmission of disturbances to the driver in accordance with the risk potential and the road condition.

3. The vehicle driving operation support apparatus as claimed in claim 1, further comprising:
   an operational reaction imparting section configured to impart the operational reaction to the driving operation of the driver,
   wherein the control section comprises:
     a risk potential calculating section configured to calculate the risk potential for the obstacle in accordance with the vehicle condition and the surrounding condition,
     a support controlling section configured to control the operational reaction to the driving operation in accordance with the risk potential by controlling the operational reaction imparting section, and
     an assist controlling section configured to perform the assist control to control transmission of movement caused by vehicle behavior to the driver in accordance with the risk potential by controlling the motion regulating section.

4. The vehicle driving operation support apparatus as claimed in claim 3, wherein the control section is configured to restrain transmission of a vehicle behavior to the driver, by controlling at least one of (i) an operational reaction in a vehicle longitudinal direction and (ii) an operational reaction in a vehicle lateral direction, in the operational reaction imparting section and the motion regulating section, in accordance with the risk potential.

5. The vehicle driving operation support apparatus as claimed in claim 1, wherein the control section is configured to increase a degree of restraint for restraining a transmission of vehicle behavior to the driver as the risk potential becomes higher.

6. The vehicle driving operation support apparatus as claimed in claim 1, wherein the control section is configured to vary a degree of restraint for restraining a transmission of vehicle behavior to the driver in accordance with a stability of the vehicle.

7. The vehicle driving operation support apparatus as claimed in claim 6, wherein the control section is configured to increase the degree of restraint for restraining the transmission of vehicle behavior to the driver as the stability of the vehicle decreases.

8. The vehicle driving operation support apparatus as claimed in claim 6, wherein the control section is configured to decrease the degree of restraint for restraining the transmission of vehicle behavior to the driver as the stability of the vehicle decreases.

9. The vehicle driving operation support apparatus as claimed in claim 1, wherein the control section is configured to increase the degree of restraint for restraining the disturbance transmitted to the driver with increase of the risk potential when the risk potential is higher than a first risk potential threshold.

10. The vehicle driving operation support apparatus as claimed in claim 1, wherein the control section is configured to decrease the degree of restraint for restraining the disturbance transmitted to the driver from a higher value with increase of the risk potential when the risk potential is higher than a first risk potential threshold.

11. The vehicle driving operation support apparatus as claimed in claim 1, wherein the motion regulating section includes a suspension device, and the control section is configured to perform the assist control to restrain transmission of disturbances to the driver in accordance with the risk potential by controlling the suspension device.

12. The vehicle driving operation support apparatus as claimed in claim 11, wherein the suspension device is disposed between a vehicle body and a wheel of the vehicle.

13. The vehicle driving operation support apparatus as claimed in claim 11, wherein the suspension device is disposed between a driver's seat and a vehicle body.

14. A vehicle comprising the vehicle driving operation support apparatus as claimed in claim 1.

15. A vehicle driving operation support apparatus for a vehicle, comprising:
a sensing section configured to sense a traveling condition of the vehicle including a surrounding condition inclusive of an obstacle around the vehicle; and
a control section configured to:
calculate a risk potential for the vehicle in accordance with the traveling condition,
perform a support control to support the driver in accordance with the risk potential, and
perform an assist control to restrain transmission of disturbances to the driver in accordance with the risk potential.

16. The vehicle driving operation support apparatus as claimed in claim 15, further comprising:
an actuating section to control the vehicle for supporting the driver of the vehicle in accordance with the traveling condition,
wherein the control section is configured to perform the assist control to restrain movement transmitted to the driver by controlling the actuating section in accordance with the risk potential.

17. The apparatus as claimed in claim 16, wherein:
as a part of the support control, the control section produces a reaction of the vehicle influencing the driver in response to a change in the risk potential, by controlling the actuating section, and
as a part of the assist control, the control section varies a degree of restraint for restraining transmission of the disturbance to the driver.

18. The vehicle driving operation support apparatus as claimed in claim 16, wherein:
the actuating section includes a reaction regulating section configured to produce a reaction of the vehicle, and a motion regulating section configured to regulate a movement transmitted to the driver, and
the control section is configured to (i) perform the support control by producing a reaction of the vehicle influencing the driver in response to an increase in the risk potential by controlling the reaction regulating section of the actuating section, and (ii) perform the assist control of varying the degree of restraint for restraining transmission of the movement to the driver by controlling the motion regulating section of the actuating section.

19. A vehicle driving operation support process for a vehicle, comprising:
sensing a traveling condition of the vehicle including a surrounding condition inclusive of an obstacle around the vehicle;
calculating a risk potential for the vehicle in accordance with the traveling condition;
performing a support control to support the driver in accordance with the risk potential; and
performing an assist control to restrain transmission of disturbances to the driver in accordance with the risk potential.

20. The vehicle driving operation support apparatus as claimed in claim 1, wherein the motion regulating section is configured to regulate vibration in a vertical direction of the vehicle, and the control section is configured to restrain vibration transmitted to the driver by controlling the motion regulating section in accordance with the risk potential.

* * * * *